(12) United States Patent
Takehara et al.

(10) Patent No.: US 10,863,079 B2
(45) Date of Patent: Dec. 8, 2020

(54) CONTROL APPARATUS, IMAGE CAPTURING APPARATUS, AND NON-TRANSITORY COMPUTER-READABLE STORAGE MEDIUM

(71) Applicant: CANON KABUSHIKI KAISHA, Tokyo (JP)

(72) Inventors: Takumi Takehara, Tokyo (JP); Yasuyuki Suzuki, Tokyo (JP); Kuniaki Sugitani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 102 days.

(21) Appl. No.: 16/031,456

(22) Filed: Jul. 10, 2018

(65) Prior Publication Data
US 2019/0020826 A1    Jan. 17, 2019

(30) Foreign Application Priority Data

Jul. 13, 2017 (JP) ................... 2017-136956
Jun. 25, 2018 (JP) ................... 2018-120078

(51) Int. Cl.
*H04N 5/232* (2006.01)
*G06T 7/571* (2017.01)
*H04N 5/365* (2011.01)
*G06T 7/20* (2017.01)

(52) U.S. Cl.
CPC ......... *H04N 5/232127* (2018.08); *G06T 7/20* (2013.01); *G06T 7/571* (2017.01); *H04N 5/23216* (2013.01); *H04N 5/23219* (2013.01); *H04N 5/23222* (2013.01); *H04N 5/23245* (2013.01); *H04N 5/3656* (2013.01)

(58) Field of Classification Search
None
See application file for complete search history.

(56) References Cited

U.S. PATENT DOCUMENTS

| 5,239,330 A | * | 8/1993 | Uenaka | G02B 7/28 396/95 |
| RE36,546 E | * | 2/2000 | Uenaka | G02B 7/28 396/102 |

(Continued)

FOREIGN PATENT DOCUMENTS

| CN | 102369729 A | 3/2012 |
| CN | 106101565 A | 11/2016 |

(Continued)

OTHER PUBLICATIONS

Notification of First Office Action issued by the China National Intellectual Property Administration dated May 28, 2020 in corresponding CN Patent Application No. 201810770324.1, with English translation.

*Primary Examiner* — Cynthia Segura
(74) *Attorney, Agent, or Firm* — Carter, DeLuca & Farrell LLP

(57) ABSTRACT

A control apparatus (100) includes a focus detection unit (101) that detects a defocus amount, a control unit (102) that automatically changes a parameter relating to a tracking operation during the tracking operation depending on an image capturing state, and a focusing unit (103) that preforms focusing based on the defocus amount and the parameter.

20 Claims, 35 Drawing Sheets

(56) References Cited

U.S. PATENT DOCUMENTS

| | | | |
|---|---|---|---|
| 2008/0080739 A1* | 4/2008 | Muramatsu | G03B 35/18 382/103 |
| 2009/0022486 A1* | 1/2009 | Muramatsu | G02B 7/08 396/104 |
| 2012/0020524 A1* | 1/2012 | Ishikawa | H04N 7/183 382/103 |
| 2013/0258168 A1* | 10/2013 | Aoki | G02B 7/34 348/349 |
| 2014/0253737 A1* | 9/2014 | Kempinski | G06T 7/20 348/169 |
| 2015/0222806 A1* | 8/2015 | Akamatsu | G02B 7/34 348/341 |
| 2016/0337579 A1 | 11/2016 | Tanaka | |
| 2017/0134649 A1* | 5/2017 | Wakamatsu | H04N 5/23229 |
| 2017/0223261 A1* | 8/2017 | Shimizu | G06K 9/00335 |
| 2017/0228887 A1* | 8/2017 | Sekimoto | H04N 5/23216 |
| 2019/0281207 A1* | 9/2019 | Takahara | G02B 7/346 |

FOREIGN PATENT DOCUMENTS

| | | |
|---|---|---|
| CN | 106470317 A | 3/2017 |
| JP | 2013003471 A | 1/2013 |

* cited by examiner

CONTROL APPARATUS, IMAGE CAPTURING APPARATUS, AND NON-TRANSITORY COMPUTER-READABLE STORAGE MEDIUM

BACKGROUND OF THE INVENTION

Field of the Invention

The present invention relates to an image capturing apparatus that performs focusing on an object.

Description of the Related Art

Conventionally, there is a camera having an image capturing mode for automatically setting an optimal image capturing operation collectively according to an image capturing environment. This type of camera has a sports mode suitable for capturing a moving object, a portrait image capturing mode suitable for capturing a person, a landscape image capturing mode suitable for capturing a landscape, a night scene image capturing mode suitable for capturing a night scene, and the like. A user selects the image capturing mode suitable for the image capturing environment such that various set values of a shutter velocity value, an aperture value, and an exposure correction value are automatically set at a time. By using the camera having the image capturing mode in this manner, the user can set various set values according to the image capturing environment without requiring expert knowledge.

However, with respect to the image capturing environment that can be selected in the image capturing mode, various set values are adopted so that an image capturing operation is generally suitable. Therefore, in more specific image capturing in the selected image capturing mode, an optimum image capturing operation is not necessarily always performed. In particular, with respect to the image capturing mode suitable for capturing a moving object, there are monotonically approaching movements, sudden movement and stoppage, and movement to move largely up and down, left and right, and the like. That is, when there is no image capturing mode in which the image capturing operation is suitable for the image capturing environment, it is not possible to realize the optimum image capturing operation according to movements of various objects.

Japanese Patent Laid-open No. 2013-3471 discloses an image capturing apparatus that extracts a feature amount of a motion of an object from continuous captured images and changes a set value of a setting item relating to a tracking operation based on the feature amount of the motion of the object to set an optimum set value according to the motion of the object.

However, in the image capturing apparatus disclosed in Japanese Patent Laid-open No. 2013-3471, it is not possible to determine the optimum set value of the setting item relating to the tracking operation until the end of the image capturing. Therefore, the setting item relating to the tracking operation is not changed when the tracking operation without photographing is being performed (so-called during a half-press operation of a release button) or the motion of the object is greatly changed during a continuous photographing. For example, in a scene of abrupt deceleration like a corner in velocity skating, or a scene where an object moves largely upward, downward, leftward, rightward or the like on a screen as in figure skating, there is a case where the setting item relating to the tracking operation is not appropriately set and accordingly the tracking operation cannot be appropriately performed.

BRIEF SUMMARY OF THE INVENTION

The present invention provides a control apparatus, an image capturing apparatus, and a non-transitory computer-readable storage medium capable of continuing to track an object appropriately during a tracking operation.

A control apparatus as one aspect of the present invention includes a focus detection unit configured to detect a defocus amount, a control unit configured to automatically change a parameter relating to a tracking operation during the tracking operation depending on an image capturing state, and a focusing unit configured to preform focusing based on the defocus amount and the parameter.

An image capturing apparatus as another aspect of the present invention includes an image sensor configured to photoelectrically convert an optical image formed via an image capturing optical system, and the control apparatus.

A non-transitory computer-readable storage medium as another aspect of the present invention stores a program which causes a computer to execute a process including the steps of detecting a defocus amount, changing a parameter relating to a tracking operation automatically during the tracking operation depending on an image capturing state, and preforming focusing based on the defocus amount and the parameter.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 1:
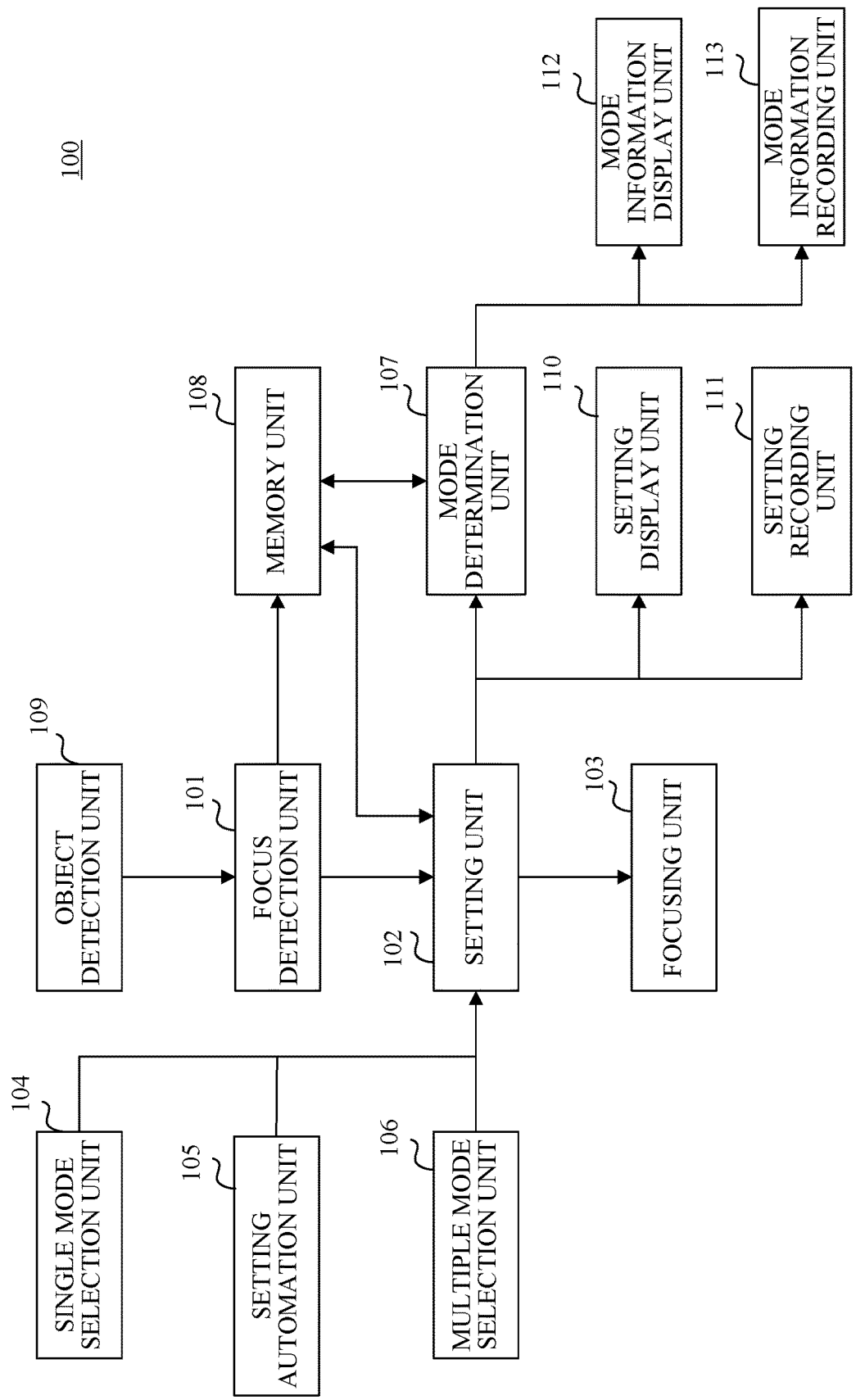
FIG. 1 is a block diagram of a focusing apparatus in each of first to third embodiments.

First, referring to FIG. 1, a focusing apparatus in a first embodiment will be described. FIG. 1 is a block diagram of a focusing apparatus (control apparatus) 100. Each part in FIG. 1 is realized by the cooperation of the hardware and software illustrated in FIG. 2 under the control of a microcomputer 221 described below with reference to FIG. 2.

In FIG. 1, a focus detection unit (focus detector) 101 performs focus detection in a plurality of focus detection areas (distance measuring points) set in a screen (in an image), and it detects a defocus amount (focal state) in the respective focus detection areas. A setting unit (control unit) 102 sets set values of a plurality of setting items (a plurality of items) relating to a tracking operation (following operation). A focusing unit (focus controller) 103 performs focusing based on the set values of the plurality of setting items relating to the tracking operation set by the setting unit 102. A single mode selection unit (control unit) 104 selects either one of an automatic mode in which the set values of the plurality of setting items relating to the tracking operation are automatically set, or a manual mode in which the set values (fixed values) of the plurality of setting items are manually set. At this time, when the single mode selection unit 104 selects the manual mode, the setting unit 102 can set predetermined set values corresponding to the manual mode as the set values of the plurality of setting items relating to the tracking operation. On the other hand, when the single mode selection unit 104 selects the automatic mode, the setting unit 102 can automatically set the set values of the plurality of setting items relating to the tracking operation.

A setting automation unit (control unit) 105 controls the setting unit 102 to automatically set at least one set value among the plurality of setting items relating to the tracking operation. At this time, the setting unit 102 can automatically set at least one set value among the plurality of setting items relating to the tracking operation.

A multiple mode selection unit 106 selects M (2≤M≤N) operation modes from among N (2≤N) operation modes in which the set values of the plurality of setting items relating to the tracking operation are fixed to predetermined set values. Based on the set values of the plurality of setting items relating to the tracking operation automatically set by the setting unit 102, a mode determination unit 107 determines one of the operation modes from among the M operation modes selected by the multiple mode selection unit 106. That is, the mode determination unit 107 determines one operation mode associated with the set value that matches the set value automatically set by the setting unit 102. At this time, the setting unit 102 can set a predetermined set value corresponding to the operation mode determined by the mode determination unit 107 as the set values of the plurality of setting items relating to the tracking operation.

A memory unit 108 stores image plane positions calculated from the detection time of the defocus amount and the defocus amount detected by the focus detection unit 101 over a plurality of times in the past. In addition, the memory unit 108 stores the set values of the plurality of setting items relating to the tracking operation set by the setting unit 102 and mode information on the operation mode determined by the mode determination unit 107 over the plurality of times in the past. An object detection unit 109 detects a coordinate position of the object on the screen based on luminance information. A setting display unit 110 displays the set values of the plurality of setting items relating to the tracking operation set by the setting unit 102 in a finder screen and a liquid crystal monitor screen. A setting recording unit 111 records the set values of the plurality of setting items relating to the tracking operation set by the setting unit 102 in the captured image. A mode information display unit 112 displays mode information on the operation mode determined by the mode determination unit 107 in the finder screen and the liquid crystal monitor screen. A mode information recording unit 113 records the mode information on the operation mode determined by the mode determination unit 107 in the captured image.

Figure 2:
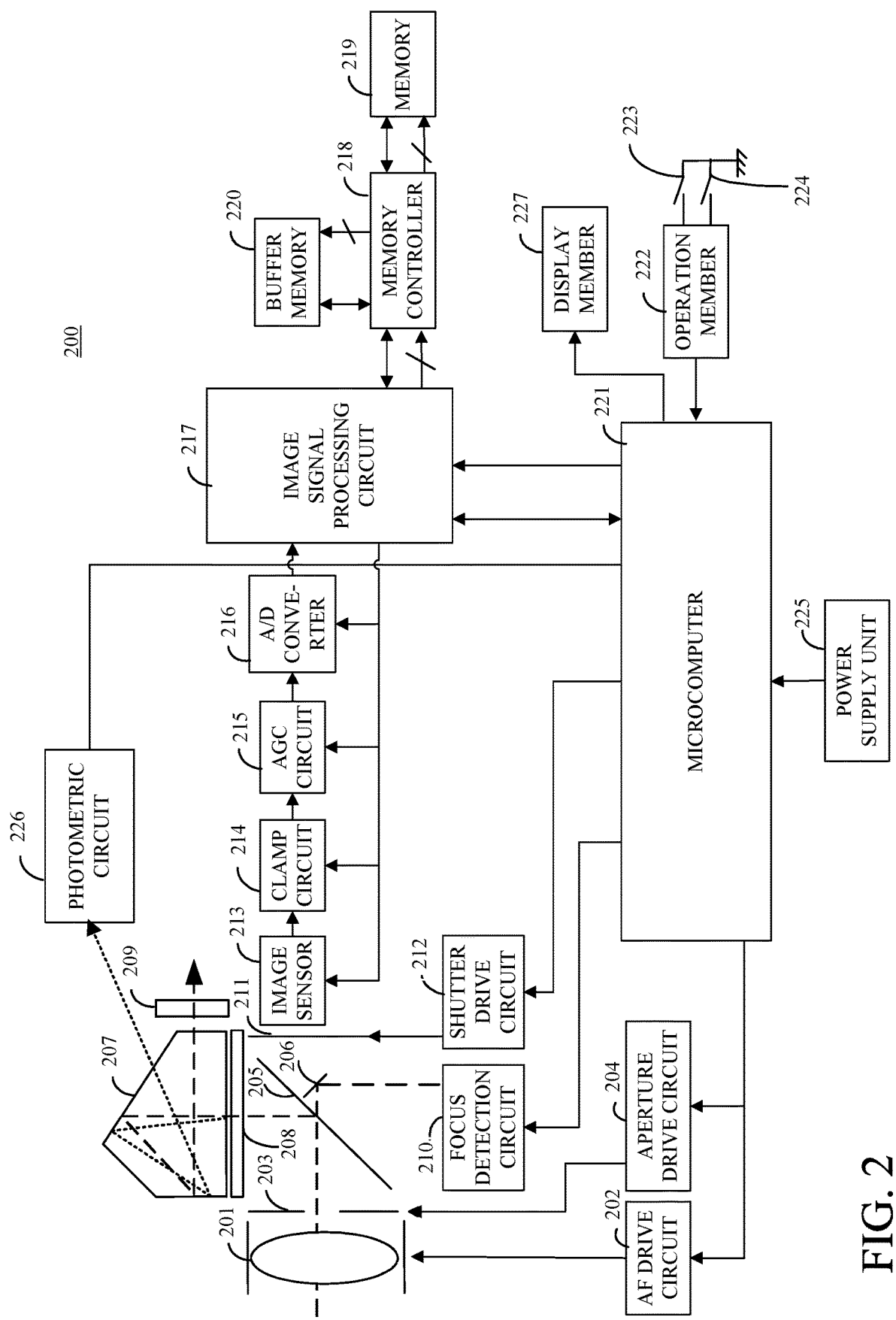
FIG. 2 is a block diagram of an image capturing apparatus in each embodiment.

Next, referring to FIG. 2, an image capturing apparatus in this embodiment will be described. FIG. 2 is a block diagram of an image capturing apparatus (single lens reflex digital camera) 200. In this embodiment, the image capturing apparatus 200 includes a camera body including an image sensor 213 and an interchangeable lens (lens apparatus) detachably attached to the camera body. However, this embodiment is not limited to this, and the present invention is also applicable to an image capturing apparatus in which a camera body and a lens apparatus are integrally formed.

In FIG. 2, an autofocus drive circuit (AF drive circuit) 202 includes, for example a DC motor or an ultrasonic motor, and it changes a position of a focus lens of the imaging lens (image capturing optical system) 201 according to the control of the microcomputer 221. An aperture drive circuit 204 drives an aperture stop 203 with a drive amount calculated by the microcomputer 221 to change an optical aperture value (F number).

A main mirror 205 switches a light beam incident from the imaging lens 201 between the viewfinder side and the image capturing apparatus side. The main mirror 205 is arranged so as to reflect the light beam to the viewfinder side at all times, but in the case of photographing, the main mirror 205 jumps upward so as to lead the light beam to the image sensor 213 and it is retracted from the light beam. A part of the light beam reflected by the main mirror 205 is guided to a photometric circuit 226 including an AE sensor for photometry, and luminance information and the like are detected. The central portion of the main mirror 205 is a half mirror so that a part of the light can transmit through the main mirror 205, and it transmits the light beam so that a part thereof is incident on a pair of AF sensors for performing focus detection.

A sub mirror 206 reflects the light beam transmitted from the main mirror 205 to be guided to a focus detection circuit 210 including an AF sensor for performing the focus detection. The focus detection circuit 210 can perform the focus detection by, for example, a phase difference method, and in this embodiment includes a pair of AF sensors. The light beam transmitted through the central portion of the main mirror 205 and reflected by the sub mirror 206 reaches the pair of AF sensors arranged inside the focus detection circuit 210 for performing photoelectric conversion. The defocus amount indicating a focusing state (focal state) of the imaging lens with respect to the object can be obtained by calculating outputs of the pair of AF sensors. In this embodiment, the photometric circuit 226 and the focus detection circuit 210 are independently configured, but the image sensor 213 and an image signal processing circuit 217 may be provided with a photometric function and a focus detection function. A viewfinder includes a pentaprism 207, a focusing plate 208, an eyepiece 209, and the like. The microcomputer 221 evaluates the calculation result and instructs the AF drive circuit 202 to drive the focus lens.

A shutter drive circuit 212 drives a focal plane shutter 211 according to the control of the microcomputer 221. Therefore, the opening time of the focal plane shutter 211 is controlled by the microcomputer 221. The image sensor 213 includes a CCD sensor, a CMOS sensor, or the like, and it photoelectrically converts an object image (optical image) formed via the imaging lens 201 to output an image signal. A clamp circuit 214 and an AGC circuit 215 perform basic analog signal processing before A/D conversion. The clamp circuit 214 and the AGC circuit 215 respectively change a clamp level and an AGC reference level according to the control of the microcomputer 221. An A/D converter 216 converts the analog image signal output from the image sensor 213 into a digital image signal.

The image signal processing circuit 217 is realized by a logic device such as a gate array. The video signal processing circuit 217 performs compression processing such as JPEG along with filter processing, color conversion processing, and gamma processing on the digitized image data, and it outputs the processed data to a memory controller 218. The memory controller 218 controls storage and retrieval of data in a memory 219 and a buffer memory 220. The image signal processing circuit 217 can output information such as exposure information of the signal of the image sensor 213 and the white balance to the microcomputer 221 as necessary. The microcomputer 221 instructs white balance and gain adjustment based on the information. At the time of a continuous image capturing operation, the image signal processing circuit 217 temporarily stores the captured image data in the buffer memory 220 as an unprocessed image, reads the unprocessed image data through the memory controller 218, and performs image processing and compression processing. The number of continuous captured images depends on the size of the buffer memory 220.

The memory controller 218 stores the unprocessed digital image data input from the image signal processing circuit 217 in the buffer memory 220 and stores the processed digital image data in the memory 219. In addition, conversely, the memory controller 218 outputs image data from the buffer memory 220 or the memory 219 to the image signal processing circuit 217. The memory 219 may be removable. An operation member 222 transmits its state to the microcomputer 221. Then, the microcomputer 221 controls each part according to change of the state of the operation member 222.

Reference numeral 223 denotes a first switch (switch SW1), and reference numeral 224 denotes a second switch (switch SW2). The switches SW1 and SW2 are switches that are turned on and off by operation of the release button, and they are each one of input switches of the operation member 222. The state where only the switch SW1 is ON is a half-pressed state of the release button. In this state, the autofocus operation and the photometry operation are performed. The state where both the switch SW1 and the switch SW2 are ON is a fully-pressed state of the release button, and photography is performed in this state. While both the switch SW1 and the switch SW2 are kept to be ON, the continuous image capturing operation is performed. In addition, switches (not illustrated) such as an ISO setting button, an image size setting button, an image quality setting button, and an information display button are connected to the operation member 222, and the state of each switch is detected. A power supply unit 225 supplies power necessary for each IC and drive system. A display member 227 includes a liquid crystal monitor or the like, and it outputs the state of the microcomputer 221 to the outside.

In this embodiment, in the image capturing apparatus 200, when the manual mode in which set values of the plurality of setting items relating to the focusing operation are fixed to predetermined values is selected by the user, predetermined set values associated with the manual mode are set. On the other hand, when the automatic mode is selected by the user, all the setting items relating to the tracking operation are automatically set. As a result, it is possible to automatically set the plurality of setting items relating to the tracking operation in accordance with the motion of the object changing constantly to keep it follow.

The configurations of the focusing apparatus 100 and the image capturing apparatus 200 of this embodiment described with reference to FIGS. 1 and 2 are common to each of a second embodiment and a third embodiment.

Figure 3A:
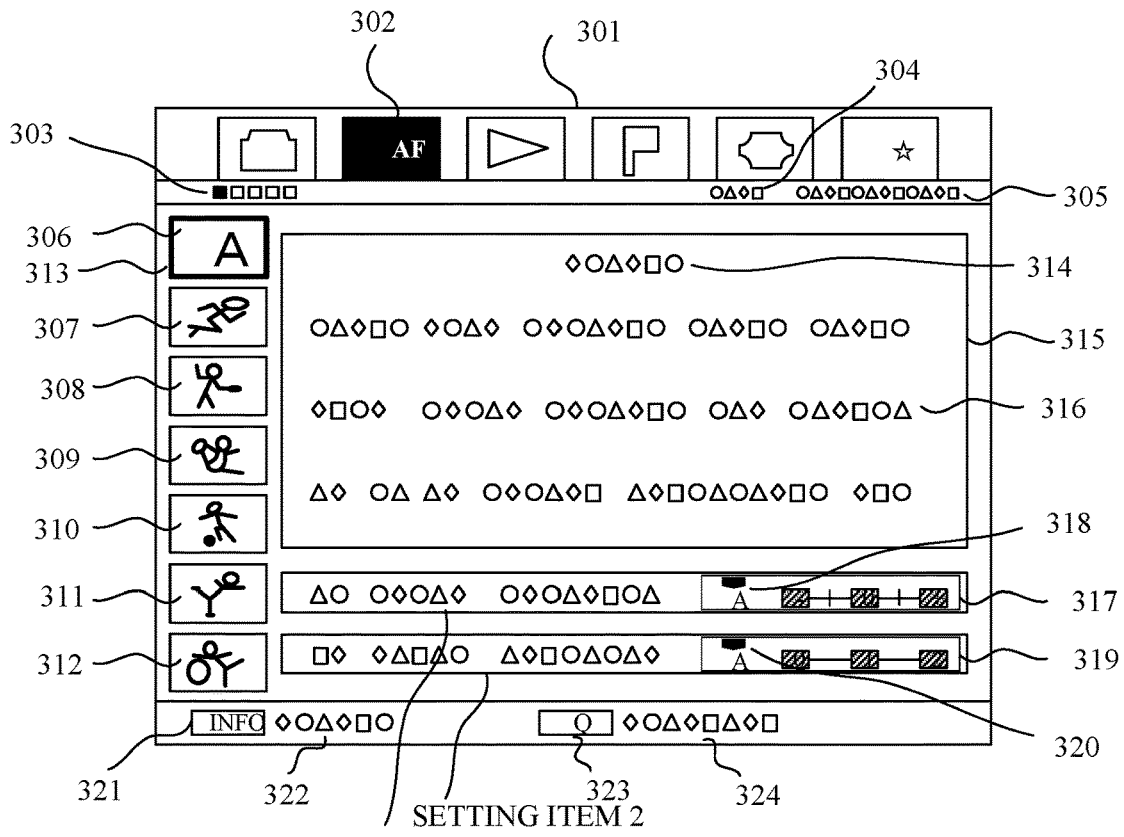
FIGS. 3A and 3B are explanatory diagrams of an operation mode selection in the first embodiment.

First, referring to FIGS. 3A and 3B, the operation mode selection in this embodiment will be described. FIG. 3A is an explanatory diagram of the automatic mode in which setting relating to the tracking operation on a menu screen is automatically performed. A large tab 301 is a tab display for classifying the major items of the menu. The large tab includes a "photographing" tab, an "AF" tab, a "playback" tab, a "setting" tab, a "custom function" tab, and a "my menu" tab. Icons representing functions are displayed on each tab. It means that the tab displayed in black on the tab is selected. In FIG. 3A, the "AF" tab is selected.

The "AF" tab of the large tab is further divided into a plurality of AF setting small tabs 303 so that the content of one small tab can be displayed on one screen. According to the number of small tabs 303, square marks are displayed. The selected small tab is indicated by a black rectangle. Reference numeral 304 denotes a small tab name display, and the name of the selected small tab 303 is displayed. Next to that, a simple guide to the small tab 304 is displayed. A small tab guide 305 may be omitted.

Reference numerals 306 to 312 denote operation mode icons from an operation mode 0 to an operation mode 6, respectively. The operation mode 0 is the automatic mode, and each of the operation mode 1 to the operation mode 6 is the manual mode. A focus indication 313 is displayed in the currently selected operation mode. The name of the selected operation mode is displayed on an operation mode name display 314 and a description of the selected operation mode is displayed on an operation mode explanation display 316 in an operation mode guidance area 315. In a setting area 317 of a setting item 1, the set value of the setting item 1 is displayed with a cursor by a set value display 318 of the setting item 1. In a setting area 319 of a setting item 2, the set value of the setting item 2 is displayed with the cursor by the set value display 320 of the setting item 2.

Since the operation mode 1 is the automatic mode, the cursor is displayed at "A" representing the automatic setting, and the other set values are grayed out and cannot be selected. An operation member icon 1 (321) is displayed in the lower part within the area of the menu screen, and the explanation thereof is displayed in an operation member guidance 1 (322). Further, an operation member icon 2 (323) is displayed, and the explanation thereof is displayed in an operation member guidance 2 (324). An operation member 222 can perform the setting displayed in the operation member guidance by the operation of a button (not illustrated).

Figure 3B:
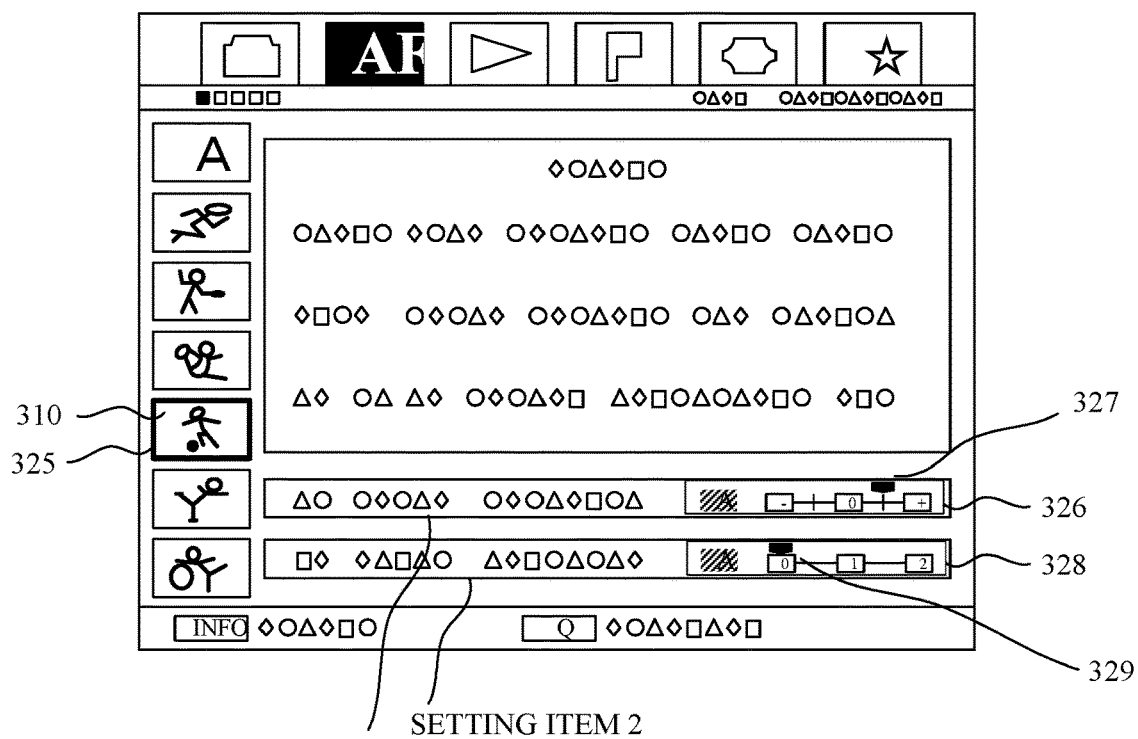

FIG. 3B is an explanatory diagram of the manual mode in which the plurality of setting items relating to the tracking operation are fixed to predetermined values. An operation mode 4 that is the manual mode is selected and a focus display 325 is displayed. In a setting area 326 of the setting item 1, the set value of the setting item 1 is displayed with the cursor by a set value display 327 of the setting item 1. In a setting area 328 of the setting item 2, the set value of the setting item 2 is displayed with the cursor by a set value display 329 of the setting item. In the case of the manual mode, predetermined values associated with each operation mode are set as initial values for the set values of the setting item 1 and the setting item 2. As the initial value, the cursor is displayed such that the set value of setting item 1 is displayed at +1 and the set value of setting item 2 is displayed at 0. The set value of each setting item can be changed to an arbitrary value. Since the operation mode 4 is the manual mode, "A" representing the automatic setting in a setting area 326 of the setting item 1 and a setting area 328 of the setting item 2 is grayed out and cannot be selected.

Figure 4:
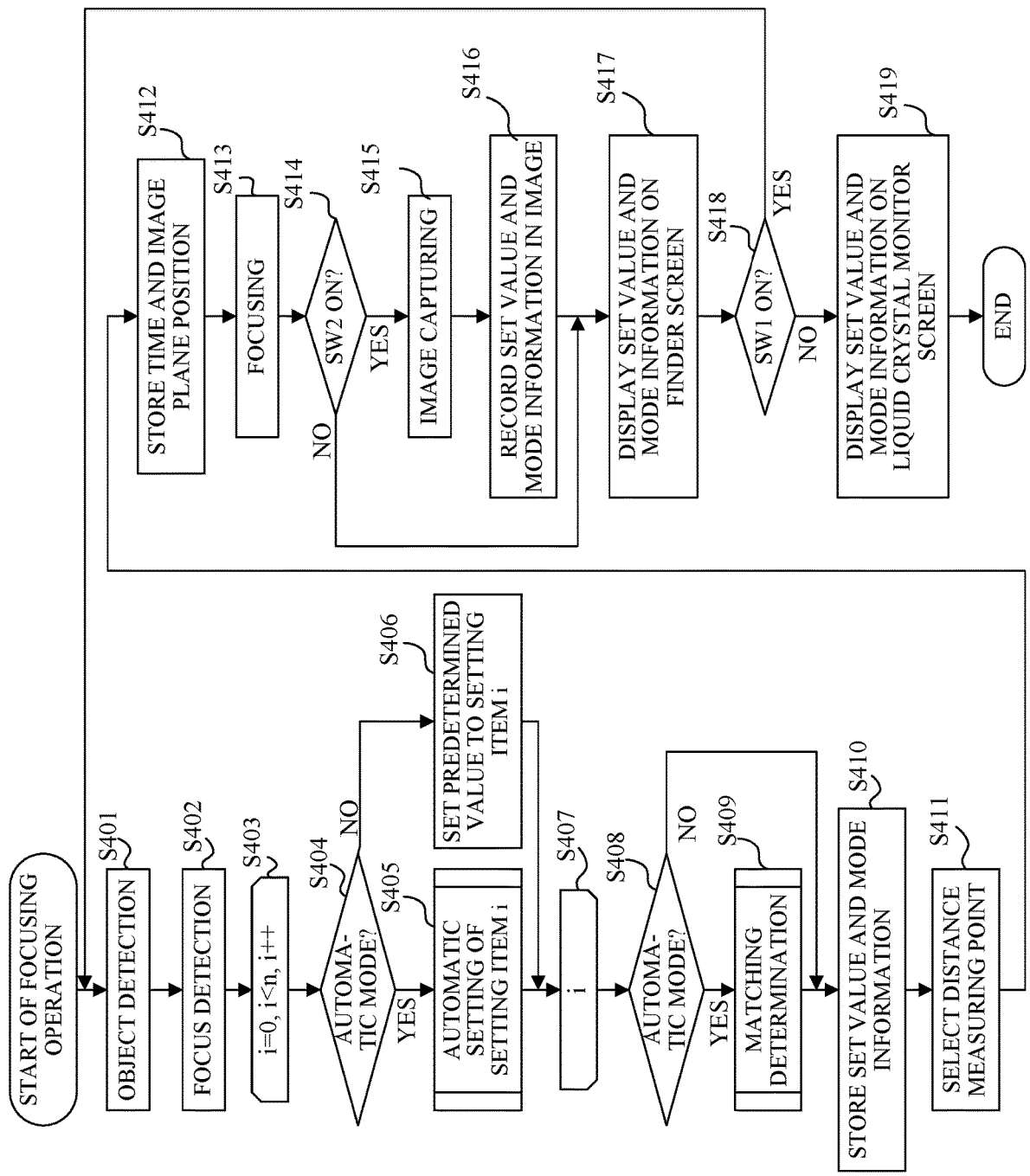
FIG. 4 is a flowchart of illustrating a focusing operation in the first embodiment.

Next, referring to FIG. 4, the focusing operation in this embodiment will be described. FIG. 4 is a flowchart of the focusing operation. Each step of FIG. 4 is realized mainly by each part of the focusing apparatus 100 by the microcomputer 221 executing a predetermined program.

Figure 5:
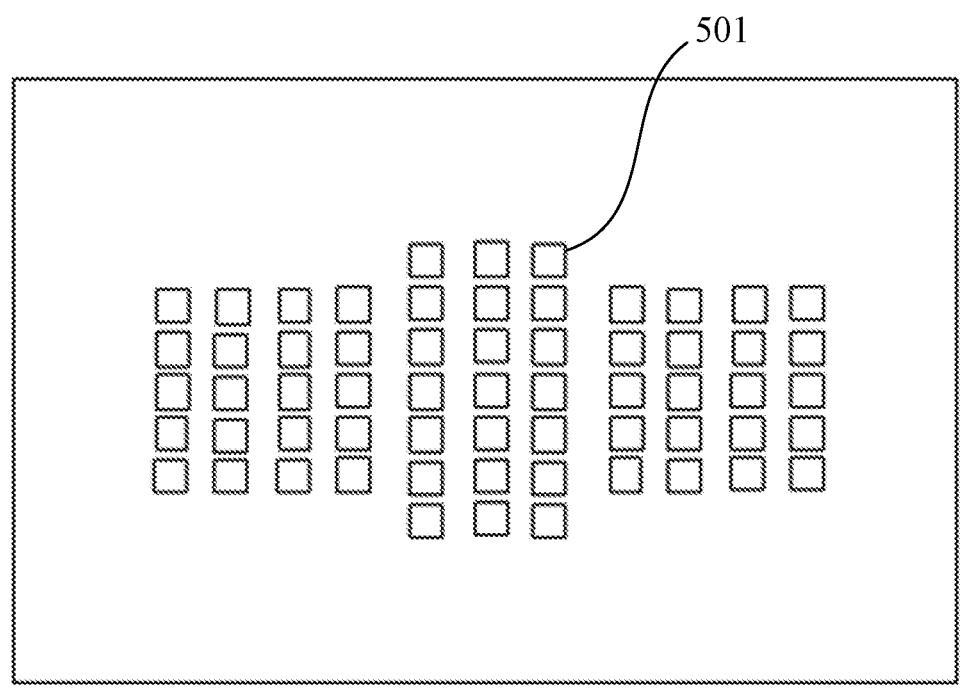
FIG. 5 is an explanatory diagram of a focus detection area in each of the first to third embodiments.

When the switch SW1 is turned on by the user, the microcomputer 221 starts the focusing operation. First, at step S401, the object detection unit 109 detects the coordinate position of the object on the screen based on the luminance information by using the photometric circuit 226 (object detection). Subsequently, at step S402, the focus detection unit 101 detects the defocus amount by using the focus detection circuit 210. FIG. 5 is a diagram illustrating an example of a plurality of focus detection areas (distance measuring points) 501 of the focus detection unit 101. The defocus amount is detected based on an image shift amount of two images in a line sensor (not illustrated) arranged in the focus detection area 501 indicated by a square in FIG. 5. The defocus amount detected in each focus detection area is temporarily stored in the memory 219 together with the detection time.

Subsequently, at step S403, the microcomputer 221 performs settings for repeating the processes from step S404 to step S405 or step S406 a predetermined number of times n. In this embodiment, n is equal to 2 (n=2) and the setting items relating to the tracking operation are "followability to velocity change" and "transfer characteristic of the distance measuring point", but the number and contents of the setting items are not necessarily limited to them. Subsequently, at step S404, the microcomputer 221 determines whether the automatic mode for automatically setting all the set values of the plurality of setting items relating to the tracking operation is selected. When the automatic mode is selected, the flow proceeds to step S405. On the other hand, if the automatic mode is not selected, the flow proceeds to step S406.

At step S405, the setting unit 102 executes a routine for automatically setting an i-th setting item relating to the tracking operation. The routine of step S405 will be described below with reference to FIGS. 9 to 16. At step S406, the setting unit 102 sets a predetermined set value associated with the manual mode selected for the i-th setting item relating to the tracking operation. Subsequently, at step S407, the microcomputer 221 determines whether the iterative process set at step S403 has been executed a predetermined number of times. If the iterative process has been executed a predetermined number of times, the flow proceeds to step S408. On the other hand, if the iterative process has not been executed a predetermined number of times, the value of i is incremented by 1 and the process returns to step S404.

At step S408, the microcomputer 221 determines whether the automatic mode in which all the set values of the plurality of setting items relating to the tracking operation are automatically set is selected. When the automatic mode is selected, the flow proceeds to step S409. On the other hand, when the automatic mode is not selected, the flow proceeds to step S410. At step S409, the mode determination unit 107 performs a routine for determining the manual mode in which set values that match the set values of the plurality of setting items relating to the tracking operation automatically set by the setting unit 102 are associated. The routine of step S409 will be described below with reference to the flowchart of FIG. 8.

At step S410, the memory unit 108 stores the set values of the plurality of setting items relating to the tracking operation set by the setting unit 102 and the operation mode information determined by the mode determination unit 107 over a plurality of times in the past. It is preferred that the set value and the operation mode information are stored together with the object distance information. Subsequently, at step S411, based on the defocus amount detected by the focus detection unit 101 and the set values of the plurality of setting items relating to the tracking operation set by the setting unit 102, the focusing unit 103 selects one of the plurality of focus detection areas (distance measuring point). Subsequently, at step S412, the memory unit 108 stores the image plane position calculated from the detection time of the defocus amount and the defocus amount detected by the focus detection unit 101 over the plurality of times in the past. Subsequently, at step S413, the focusing unit 103 performs the focusing operation based on the detection times of the defocus amounts and the image plane positions a plurality of times in the past stored in the memory unit 108 and the set values of the plurality of setting items relating to the tracking operation set by the setting unit 102.

Subsequently, at step S414, the microcomputer 221 determines whether the switch SW2 is turned on. When the switch SW2 is turned on, the flow proceeds to step S415. On the other hand, when the switch SW2 is not turned on, the flow proceeds to step S417. At step S415, the microcomputer 221 captures an image by using the image sensor 213. Subsequently, at step S416, the setting recording unit 111 records the set values of the plurality of setting items relating to the tracking operation set by the setting unit 102 in the captured image. The mode information recording unit 113 records the information on the operation mode determined by the mode determination unit 107 in the image information of the captured image.

Figure 6A:
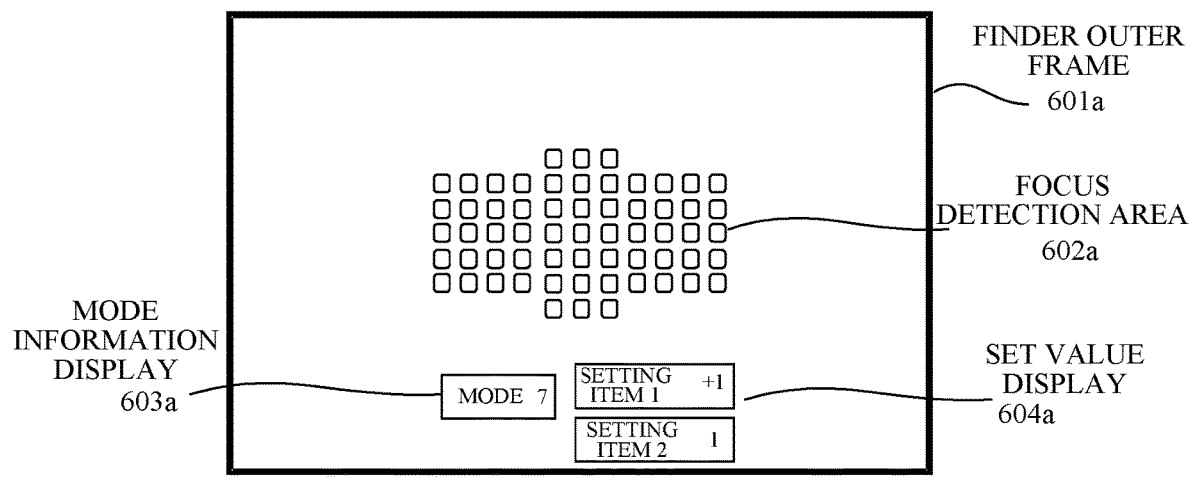
FIGS. 6A and 6B are explanatory diagrams of set values and mode information displays in each of the first to third embodiment.
Figure 6B:
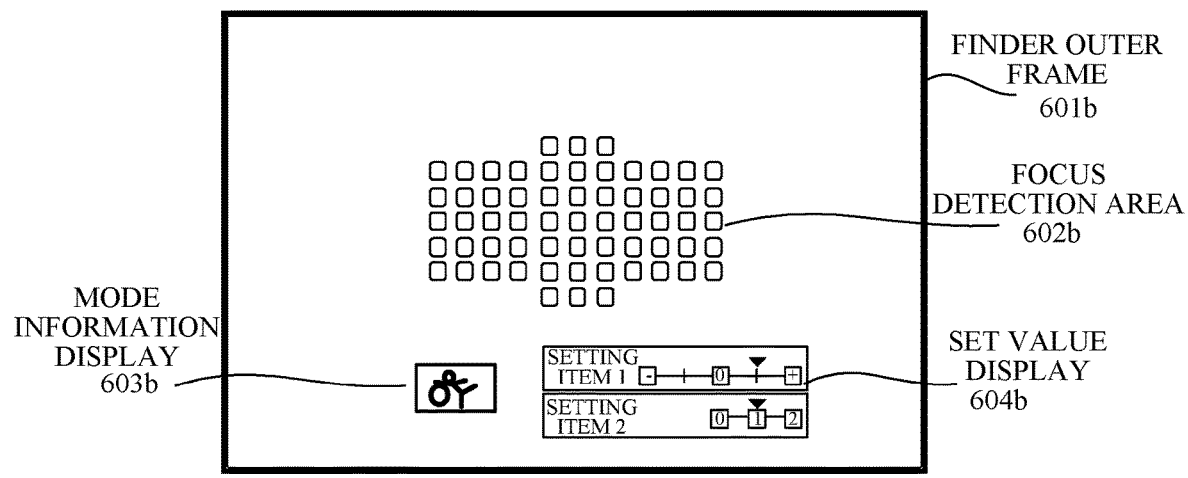

At step S417, the setting display unit 110 displays the set values of the plurality of setting items relating to the tracking operation set by the setting unit 102 on the finder screen. The mode information display unit 112 displays information on the operation mode determined by the mode determination unit 107 on the finder screen. FIGS. 6A and 6B are explanatory diagrams of the set values and the mode information display on the viewfinder screen, and two examples are illustrated in FIGS. 6A and 6B. In FIG. 6A, a thick frame indicated by 601a is an outer frame of the finder. Reference numeral 602a denotes a focus detection area (distance measuring point), which corresponds to the plurality of focus detection areas 501 illustrated in FIG. 5. As a mode information display 603a, the mode number of the operation mode determined by the mode determination unit 107 is numerically displayed. As a set value display 604a, the set values of the respective setting items set by the setting unit 102 are numerically displayed. In FIG. 6B, an icon of the operation mode determined by the mode determination unit 107 is displayed as a mode information display 603b. The set value set by the setting unit 102 as a set value display 604b is indicated by a black triangle in FIG. 6B together with the display of a range that each setting item can take. It is not always necessary to display the set value or the operation mode information by the combination as illustrated in FIG. 6A or FIG. 6B or at the position in the finder.

Subsequently, at step S418 in FIG. 4, the microcomputer 221 determines whether the switch SW1 is turned on. When the switch SW1 is turned on, the flow returns to step S401. On the other hand, when the switch SW1 is not turned on, the flow proceeds to step S419. At step S419, the setting display unit 110 displays the set values of the plurality of setting items relating to the tracking operation set by the setting unit 102 on the screen of the liquid crystal monitor. The mode information display unit 112 displays information on the operation mode determined by the mode determination unit 107 on the screen of the liquid crystal monitor.

Here, as the focusing operation is completed once, the set value, the mode information, and the object distance information stored at step S410 may be erased from the memory. However, in the case where it is considered that the user is photographing at the same place or the same scene, it is preferable not to erase the information from the memory. It is because it is impossible to calculate an appropriate set value immediately after the start of the focusing operation in which data relating to the image capturing state (image capturing situation) such as a sufficient number of image plane positions are not stored yet in some cases. Therefore, a more suitable set value can be used by using the predetermined initial value as the set value. Furthermore, at this time, by storing the set value, the mode information, the object distance information, and the like in the past focusing operation as appropriate, it is possible to determine the initial value in consideration of the past focusing operation. As a result, when the user is photographing at the same place or in the same scene, more accurate focusing can be performed as compared with the case where the initial value considering the past focusing operation is not set. An example of a method of determining the initial value will be described below.

When it is considered that the user is not photographing at the same place or in the same scene, it is preferable to erase the stored set value, mode information, object distance information, and the like from the memory.

For example, when the power of the camera is turned off, it is considered that the photographing in that scene ends and the place is moved to another place. When a focal length or an object distance changes greatly or when the imaging lens is replaced, it is considered that another object is to be photographed. When the focusing operation is not performed for a relatively long predetermined time or when it is determined that the photographing scene is changed to another scene based on the luminance information, it is considered that the user is not photographing at the same place or in the same scene. In these cases, it is determined that the user is not photographing at the same place or in the same scene, in other words, that the image capturing state (image capturing situation) of the focusing operation performed next time is different from that of the current focusing operation, and it is preferred that the stored set values, mode information, and object distance information are deleted from the memory.

Figure 7A:
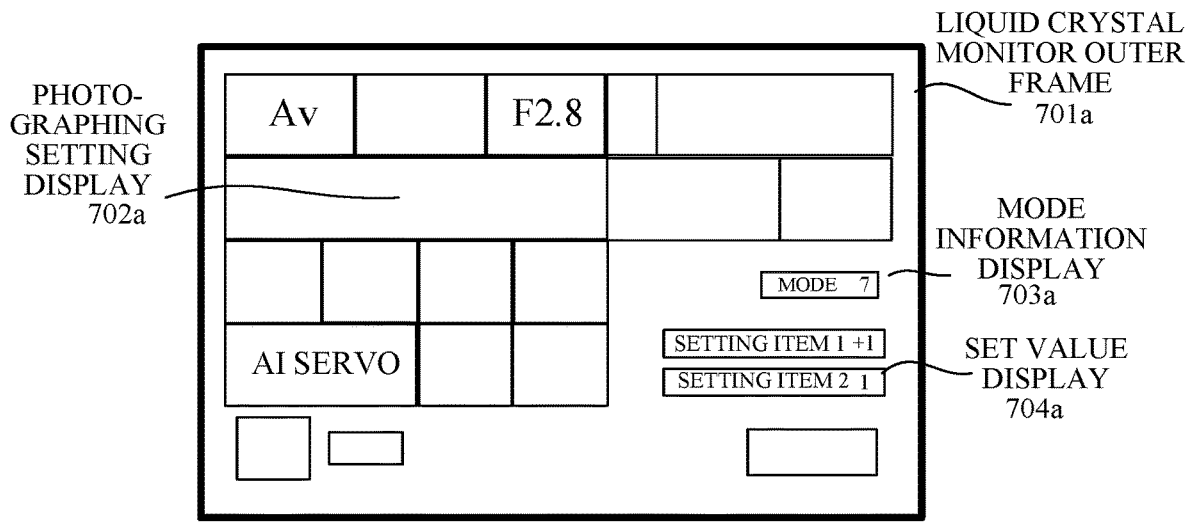
FIGS. 7A and 7B are explanatory diagrams of set values and mode information displays in each of the first to third embodiment.
Figure 7B:
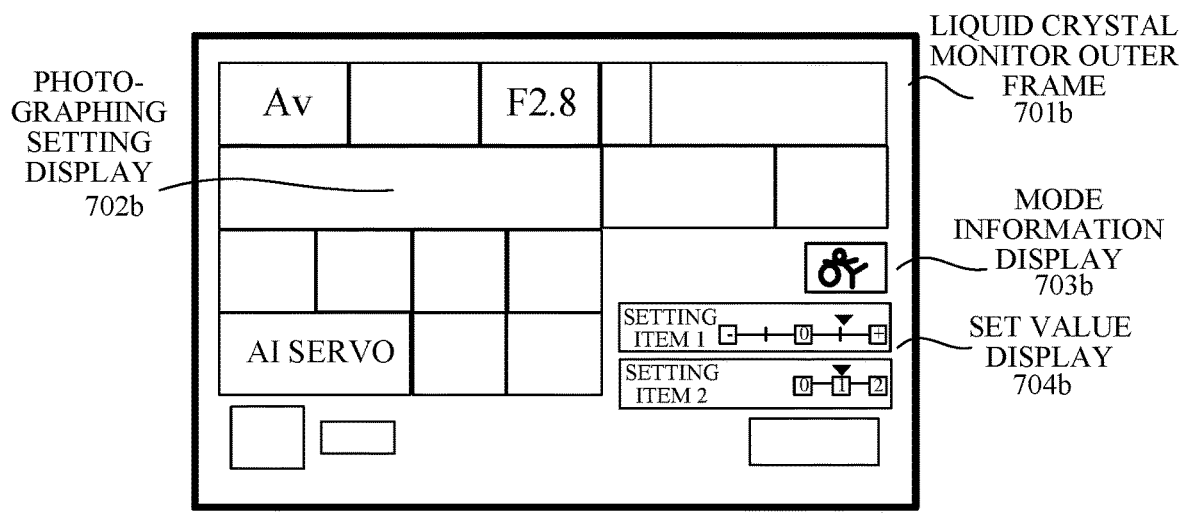

FIGS. 7A and 7B are explanatory diagrams of the set values and the mode information display on the liquid crystal monitor screen, and two examples are illustrated in FIGS. 7A and 7B. In FIG. 7A, a thick frame denoted by 701a is an outer frame of the liquid crystal monitor. For example, Av (aperture priority AE) in the image capturing mode, F2.8 of the aperture set value, AI SERVO of the AF operation mode, and the like are displayed as a photographing setting display 702 a. As a mode information display 703a, the mode number of the operation mode determined by the mode determination unit 107 is numerically displayed. As a set value display 704a, the set value of each setting item set by the setting unit 102 is numerically displayed. In FIG. 7B, the icon of the operation mode determined by the mode determination unit 107 is displayed as a mode information display 703b. As a set value display 704b, the set value set by the setting unit 102 is indicated by a black triangle in FIG. 7B together with the display of a range that the set value of each setting item can take. It is not always necessary to display the set values and the operation mode information in the combination as illustrated in FIGS. 7A and 7B or the position in the liquid crystal monitor. Further, the latest set value and mode information may be displayed on the liquid crystal monitor screen, or alternatively, the set value and the mode information having the highest frequency may be displayed from the set values and the mode information stored a plurality of times in the past. In this embodiment, displaying the set values and the mode information on the finder screen is performed at step S417. At this time, similarly to the display on the liquid crystal monitor screen, the display of the set values and the mode information in the finder may be updated only when it is determined at step S418 that the switch SW1 is not turned on.

Figure 8:
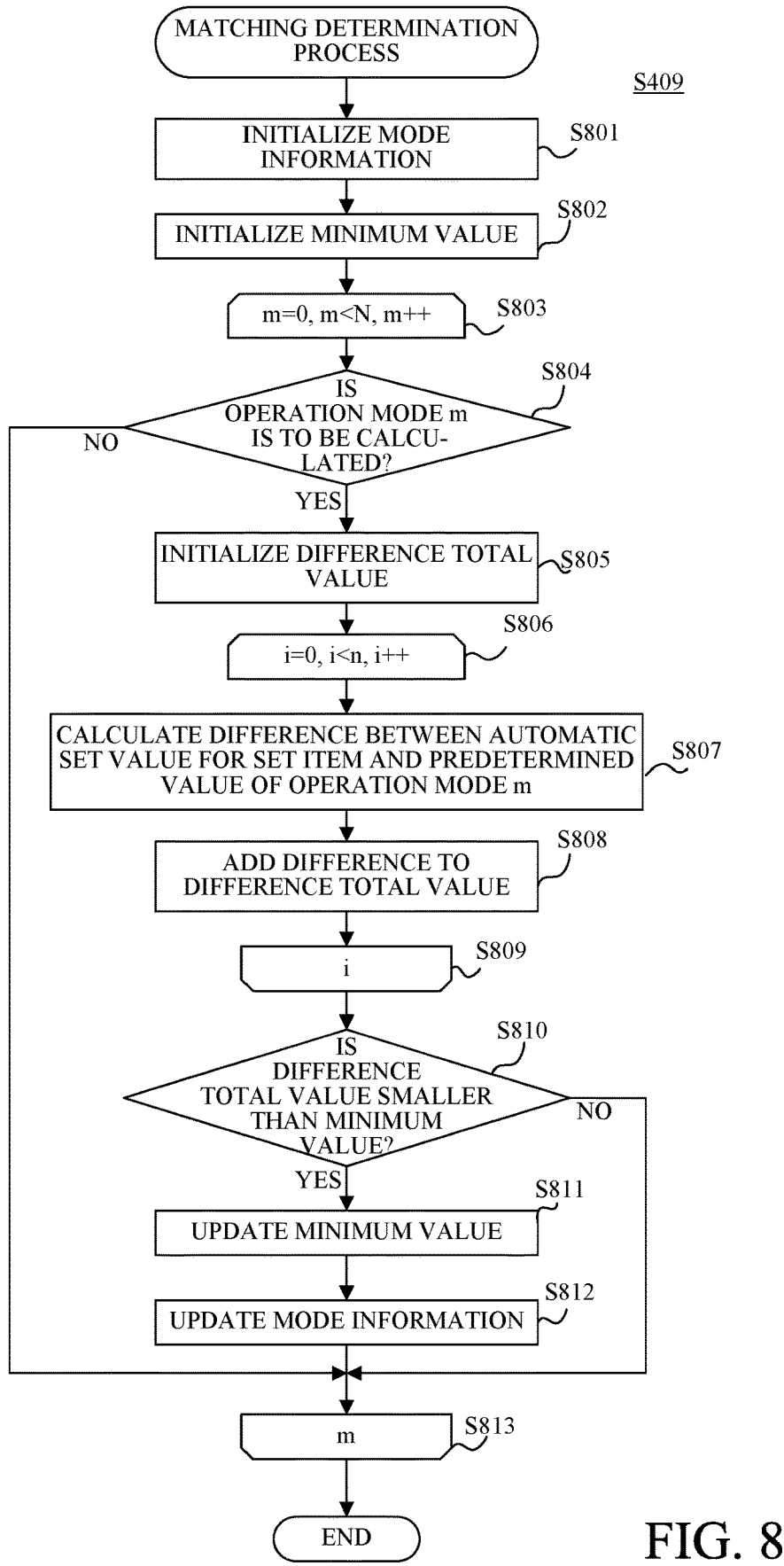
FIG. 8 is a flowchart of illustrating a matching determination process in each of the first to third embodiment.

Next, referring to FIG. 8, a routine (matching determination process) in which the mode determination unit 107 determines whether the set value automatically set by the setting unit 102 matches the set value associated with the manual mode, which is performed at step S409 in FIG. 4, will be described. FIG. 8 is a flowchart of illustrating the matching determination process (step S409). Each step of FIG. 8 is performed by the microcomputer 221 (mode determination unit 107).

First, at step S801, the mode determination unit 107 initializes matching mode information. The mode determination unit 107 may set a predetermined operation mode as the mode information by initialization, or alternatively, it may set information indicating that there is no matching mode. Subsequently, at step S802, the mode determination unit 107 initializes a minimum value of a difference total value between the set values of the plurality of setting items relating to the tracking operation set by the setting unit 102 and the set values associated with the operation mode. It is preferred that the minimum value is set to a very large number by the initialization process so that the minimum value is necessarily updated once in the subsequent process.

Subsequently, at step S803, the microcomputer 221 performs setting for repeating steps S804 to S812 for a predetermined number N of times. The predetermined number of times N may be set to N=6 using the operation mode 1 to the operation mode 6, excluding the operation mode icon 0 which is the automatic mode in FIGS. 3A and 3B, for example.

Subsequently, at step S804, the mode determination unit 107 determines whether the operation mode m is to be calculated for the matching determination. When the operation mode m is to be calculated, the flow proceeds to step S805. On the other hand, when the operation mode m is not to be calculated, the flow proceeds to step S813. In this embodiment, it is preferred that all operation modes are to be calculated. At step S805, the mode determination unit 107 initializes the total value of the differences between the set values of the plurality of setting items relating to the tracking operation set by the setting unit 102 and the set values associated with the operation mode m. Subsequently, at step S806, the microcomputer 221 performs settings for repeating steps S807 and S808 for a predetermined number of times n. In this embodiment, n=2 and the setting items relating to the tracking operation are "tracking ability with respect to velocity change" and "transfer characteristic of a distance measuring point", but the present invention is not necessarily limited to this.

At step S807, the mode determination unit 107 calculates the difference between the set value automatically set by the setting unit 102 for the setting item i and the predetermined set value associated with the operation mode m. It is preferred that the difference has an absolute value. Subsequently, at step S808, the mode determination unit 107 adds the difference calculated at step S807 to the difference total value. Subsequently, at step S809, the microcomputer 221 determines whether the iterative process set at step S806 has been performed a predetermined number of times. When the iterative process has been performed the predetermined number of times, the flow proceeds to step S810. On the other hand, when the iterative process has not been performed the predetermined number of times, the value of i is incremented by 1 and then the flow proceeds to step S807.

At step S810, the mode determination unit 107 determines whether the difference total value calculated at step S808 is smaller than the minimum value. When the difference total value is smaller than the minimum value, the flow proceeds to step S811. On the other hand, when the difference total value is not smaller than the minimum value, the flow proceeds to step S813.

At step S811, the mode determination unit 107 substitutes the difference total value calculated at step S808 to the minimum value. Subsequently, at step S812, the mode determination unit 107 sets information on the operation mode m in which the difference total value is calculated at step S808 as the mode information.

At step S813, the microcomputer 221 determines whether the iterative process set at step S804 has been performed a predetermined number of times. When the iterative process has been performed the predetermined number of times, this routine is ended. On the other hand, when the iterative process has not been performed the predetermined number of times, the value of m is incremented by 1 and then the flow returns to step S804. It is also possible to determine the operation mode in which the set value automatically set by the setting unit 102 and the predetermined set value associated with the operation mode coincide with each other. This determination can be realized by setting the matching mode information at step S801 to information indicating that there is no matching mode and setting the minimum value at step S802 to 1.

Next, referring to FIGS. 9 to 15, a routine in which the setting unit 102 automatically sets the set value of the "transfer characteristic of the distance measuring point" that is one of the plurality of setting items relating to the tracking operation, which is executed at step S405 of FIG. 4, will be described. The "transfer characteristic of the distance measuring point" is a setting item indicating the degree of transfer of the transfer operation to the object on the distance measuring point. When the motion of the object is quick, it is necessary to transfer the distance measuring point quickly in response to the motion of the object. On the other hand, when the motion of the object is slow, it is necessary to transfer the distance measuring point slowly in response to the motion of the object. For example, when the way of transferring the distance measuring point is slow while the motion of the object is fast, the focusing on the object may not be achieved in some cases. On the other hand, when the way of transferring the distance measuring point is fast while the motion of the object is slow, there is a possibility of focusing on another object. Therefore, it is preferred that the "transfer characteristic of the distance measuring point" can be automatically changed depending on the motion of the object every time.

Figure 9:
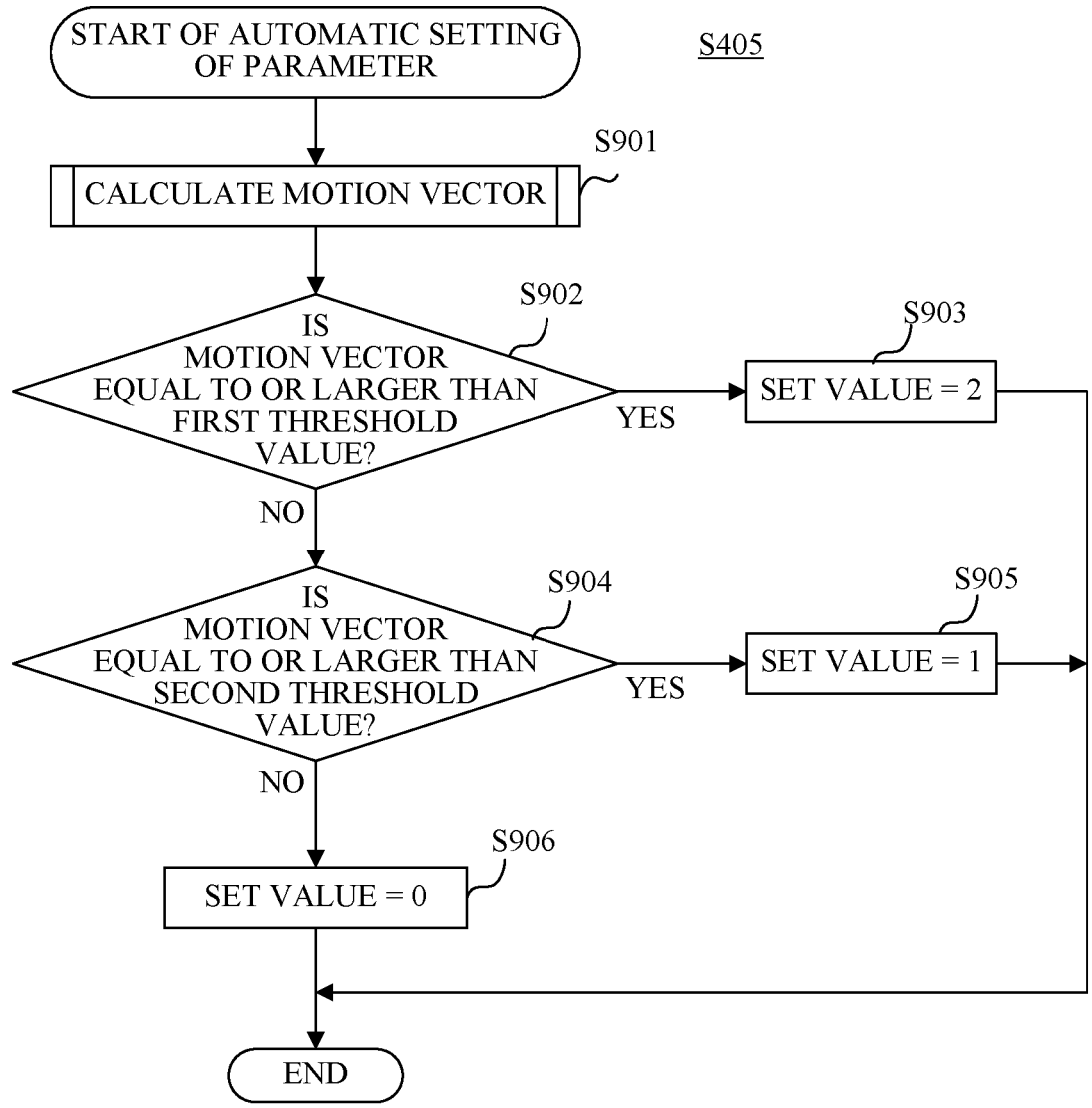
FIG. 9 is a flowchart of illustrating an automatic setting process of transfer characteristic of a distance measuring point in each of the first to third embodiments.

First, referring to FIG. 9, a method for automatically setting the "transfer characteristic of the distance measuring point" will be described. FIG. 9 is a flowchart of illustrating an automatic setting process of the transfer characteristic of the distance measuring point. Each step of FIG. 9 is mainly performed by the microcomputer 221 (setting unit 102).

First, at step S901, the setting unit 102 calculates a motion vector of an object. A method of calculating the motion vector of the object at step S901 will be described below. Subsequently, at step S902, when the relationship between a first threshold value and a second threshold value is the first threshold value>the second threshold value, that is, the first threshold value is greater than the second threshold value, the microcomputer 221 determines whether the magnitude of the motion vector of the object calculated at step S901 is equal to or greater than the first threshold value. When the magnitude of the motion vector is equal to or greater than the first threshold value, the flow proceeds to step S903. At step S903, the setting unit 102 sets the set value to 2 and the flow is ended. On the other hand, when the magnitude of the motion vector is less than the first threshold value, the flow proceeds to step S904.

At step S904, the microcomputer 221 determines whether the magnitude of the motion vector of the object calculated at step S901 is equal to or greater than the second threshold value. When the magnitude of the motion vector is equal to or greater than the second threshold value, the flow proceeds to step S905. At step S905, the setting unit 102 sets the set value to 1 and the flow is ended. On the other hand, when the magnitude of the motion vector is less than the second threshold value, the flow proceeds to step S906. At step S906, the setting unit 102 sets the set value to 0. After the setting unit 102 completes setting of the set value at step S906, the flow is ended. As described above, in this embodiment, when the set value of the "transfer characteristic of the distance measuring point" is large, a search range of the object is set to be relatively wide so that the distance measuring point follows the quick motion of the object. On the other hand, when the set value of the "transfer characteristic of the distance measuring point" is small, the search range of the object is narrowed so that the distance measuring point follows the slow motion of the object.

Figure 10:
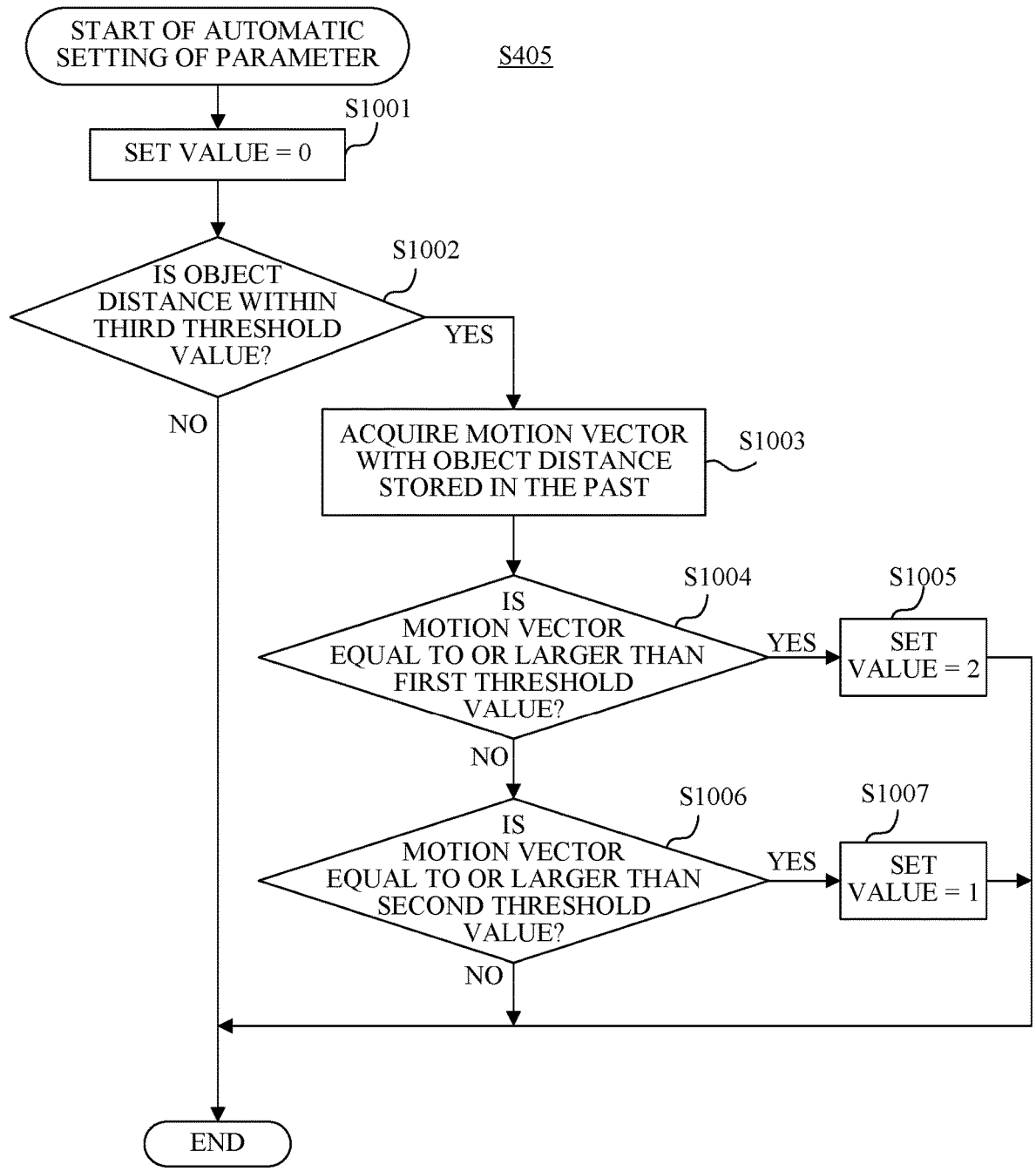
FIG. 10 is a flowchart of illustrating an automatic setting process of transfer characteristic of a distance measuring point based on learning in each of the first to third embodiment.

In addition, there is a method illustrated in FIG. 10 as a method of automatically setting the "transfer characteristic of the distance measuring point". That is, the object distance and the motion vector at the time of capturing the image in the same scene in the past are stored in the image capturing apparatus 200, and the set value of the current "transfer characteristic of the distance measuring point" is set based on the information stored in the image capturing apparatus 200. The set of the object distance and the motion vector to be stored is a motion vector that can be calculated based on an object position at the time of focus detection and an object position at the time of previous focus detection, and an object distance at the time of the previous focus detection.

FIG. 10 is a flowchart of the automatic setting process of the transfer characteristic of the distance measuring point based on learning. Each step of FIG. 10 is mainly performed by the microcomputer 221 (setting unit 102).

First, at step S1001, the setting unit 102 sets the set value of the "transfer characteristic of the distance measuring point" to 0 so that the object is the hardest to transfer.

Subsequently, at step S1002, the microcomputer 221 determines whether the distance from the image capturing apparatus 200 to the object at the time of focus detection is within a third threshold value. When the distance to the object is larger than the third threshold value at step S1002, the flow is ended. On the other hand, when the distance to the object is within the third threshold value, the flow proceeds to step S1003. The distance of the object is information obtained from the lens apparatus. When the distance to the object is long, the moving distance of the object on the imaging screen (image) from a first time to a second time is short compared to the case where the distance to the object is short. Therefore, it is preferred that the setting of the "transfer characteristic of the distance measuring point" is performed automatically only when the distance to the object is within a certain range.

At step S1003, the setting unit 102 compares the object distance stored in the past with the object distance at the time of focus detection, and it acquires a motion vector when the distance is the closest distance to the object distance stored in the past. This motion vector means a direction and an amount of the motion of the object by the next focus detection. When the motion vector can be obtained at step S1003, the flow proceeds to step S1004. At step S1004, the microcomputer 221 determines whether the magnitude of the acquired motion vector is equal to or greater than the first threshold value. When the magnitude of the motion vector is equal to or greater than the first threshold value, the flow proceeds to step S1005. At step S1005, the setting unit 102 sets the set value to 2 and the flow is ended. On the other hand, when the magnitude of the motion vector is less than the first threshold value, the flow proceeds to step S1006.

At step S1006, the microcomputer 221 determines whether the magnitude of the motion vector acquired at step S1003 is equal to or greater than the second threshold value. When the magnitude of the motion vector is equal to or greater than the second threshold value, the flow proceeds to step S1007. At step S1007, the setting unit 102 sets the set value to 1 and the flow is ended. On the other hand, when the magnitude of the motion vector is less than the second threshold value, the flow is ended as it is. As described above, in this embodiment, when the set value of the "transfer characteristic of the distance measuring point" is large, the search range of the object is set to be relatively wide so that the distance measuring point follows the quick motion of the object. On the other hand, when the set value of the "transfer characteristic of the distance measuring point" is small, the search range of the object is narrowed so that the distance measuring point follows the slow motion of the object.

Figure 11A:
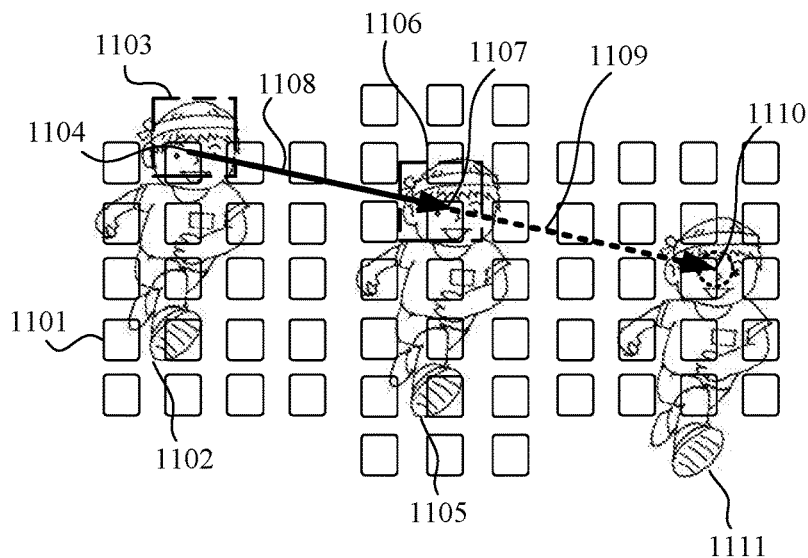
FIGS. 11A to 11C are explanatory diagrams of a method of calculating a motion vector based on an output signal of a photometric sensor in each of the first to third embodiment.
Figure 11B:
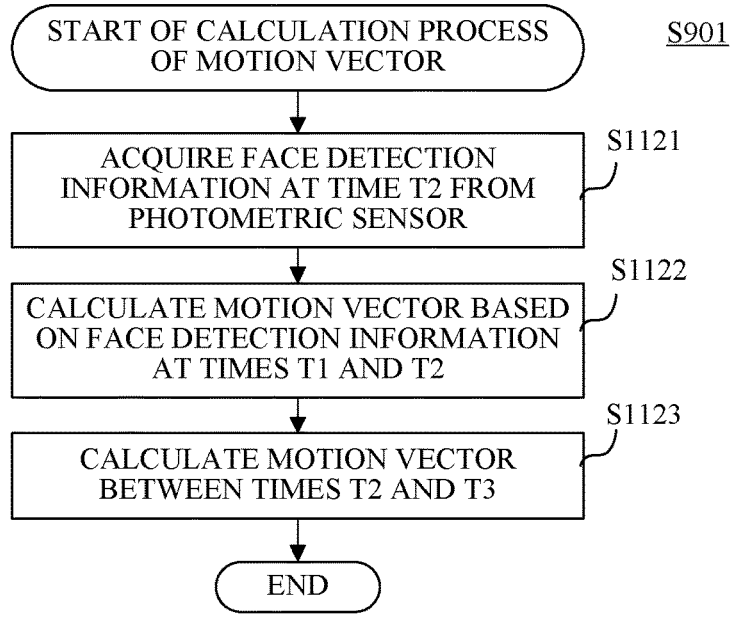
Figure 11C:
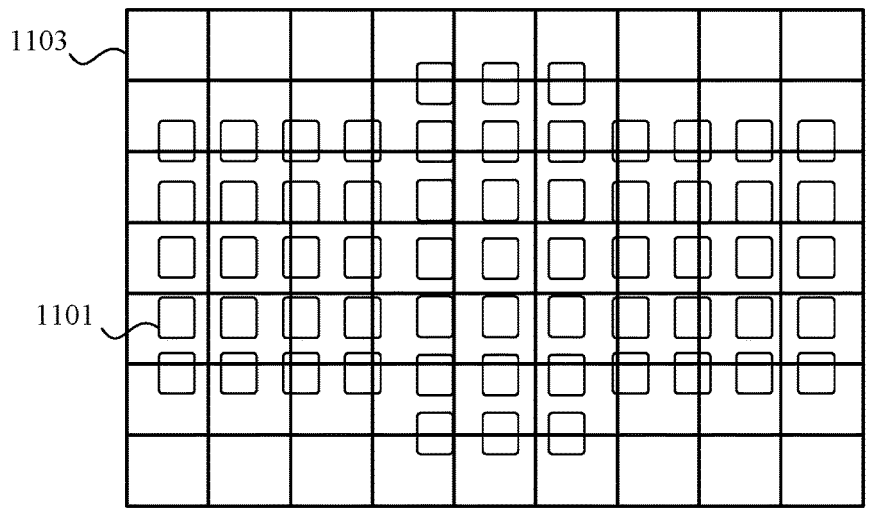

Next, referring to FIGS. 11A to 11C, a method of calculating the motion vector of the object (step S901) will be described. FIGS. 11A to 11C are explanatory diagrams of the method of calculating the motion vector of the object based on an output signal of the photometric sensor (photometric circuit 226) by the object detection unit 109. FIG. 11A illustrates an explanatory diagram of calculating the motion vector, FIG. 11B illustrates a flowchart of a method of calculating the motion vector, and FIG. 11C illustrates a plurality of areas 1103 and a plurality of distance measuring points (focus detection areas) 1101 photometered by the photometric sensor. FIG. 11A is a diagram illustrating the motion of the object moving in a range of the plurality of distance measuring points 1101 from time T1 to time T3 on the imaging screen. Time T1 is an accumulation center time photometered by the photometric sensor at the time of focus detection two times before, and it represents a position of the object 1102 on the imaging screen at time T1.

As illustrated in FIG. 11C, the plurality of areas (photometry areas) 1103 photometered by the photometric sensor are arranged so as to cover the plurality of distance measuring points 1101. FIG. 11C describes that the plurality of areas 1103 is 7×9 areas, but the present invention is not limited thereto and may have more areas. At time T1, face or skin color information of the object 1102 detected in a part of the plurality of photometry areas by the photometric sensor of the object detection unit 109 is calculated, and this detection area is denoted by 1103, and the centroid position of the detection area is denoted by 1104. On the other hand, the time T2 is the accumulation center time measured by the photometric sensor at the time of focus detection one time ago, and it represents a position of the object 1105 on the imaging screen at time T2. The detection area of the object 1105 detected by the photometric sensor of the object detection unit 109 at time T2 is denoted by 1106, and the centroid position of the detection area is denoted by 1107. The motion vector 1108 of the object between the time T1 and the time T2 is calculated based on the centroid positions 1104 and 1107 of the detection area at the time T1 and the time T2.

The motion vector 1108 of the object represents a direction and a magnitude of the motion of the object in an image capturing range (an xy plane with an optical axis as a z axis). Here, when a coordinate A of the centroid position of the detection area at time T1 is set to (x1, y1) and a coordinate B of the centroid position of the detection area at time T2 is set to (x2, y2), the vector 1108 from the coordinate A to the coordinate B is represented by expression (1) below.

$$\overrightarrow{AB} = (x2-x1, y2-y1) \quad (1)$$

The magnitude of the vector 1108 from the coordinate A to the coordinate B is represented by expression (2) below.

$$|\overrightarrow{AB}| = \sqrt{(x2-x1)^2 + (y2-y1)^2} \quad (2)$$

The motion vector 1109 between the time T2 and the time T3 considered to be the accumulation center time at the current focus detection is estimated based on the motion vector 1108, and a coordinate C (x3, y3) of the centroid position 1110 of the face of the object is obtained. When the time interval from the time T1 to the time T2 and the time interval from the time T2 to the time T3 are equal (T2−T1=T3−T2), the magnitudes of the motion vector 1108 and the motion vector 1109 are equal. In this case, it can be estimated from a coordinate B (x2, y2) of the centroid position of the detection area at the time T2 that the object moves by the size represented by expression (2) with respect to the size of the motion vector 1108. Therefore, the coordinate C (x3, y3) at the time T3 can be obtained. On the other hand, when the time T3 is T2−T1≠T3−T2, the magnitudes of the motion vector 1108 and the motion vector 1109 are different from each other. Therefore, from the coordinate B (x2, y2), the magnitude of the movement of the object can be obtained by expression (3) below.

$$|\overrightarrow{AB}| \cdot \frac{T3-T2}{T2-T1} \quad (3)$$

In this manner, it is possible to predict the position 1111 of the object at the time T3.

Next, referring to FIG. 11B, a method of calculating the motion vector will be described. In FIG. 11B, the times T1, T2, and T3 are the same as the times described in FIG. 11A. First, at step S1121, the setting unit 102 acquires face or skin color detection information at the time T2 detected from the photometric sensor using the object detection unit 109. Subsequently, at step S1122, the setting unit 102 calculates a motion vector between the time T1 and the time T2 based on the face detection information at the time T1 and the time T2. Subsequently, at step S1123, the setting unit 102 calculates a motion vector between the time T2 and the time T3 based on the motion vector calculated at step S1122, and then the flow is ended. Since human body detection information can be obtained using the photometric sensor, the motion vector of the object may be obtained using the human detection information instead of the face detection information.

Figure 12A:
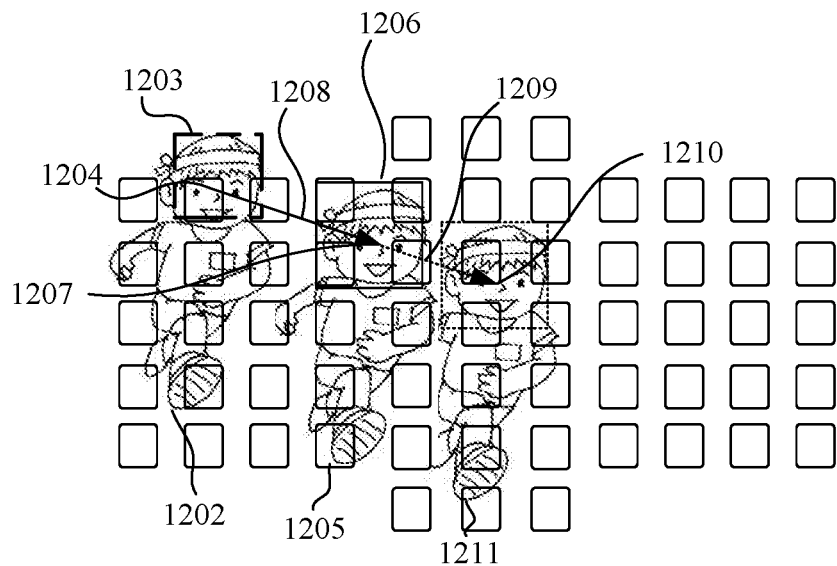
FIGS. 12A and 12B are explanatory diagrams of a method of calculating the motion vector based on the output signal of the photometric sensor and an output signal of an imaging plane AE in each of the first to third embodiments.
Figure 12B:
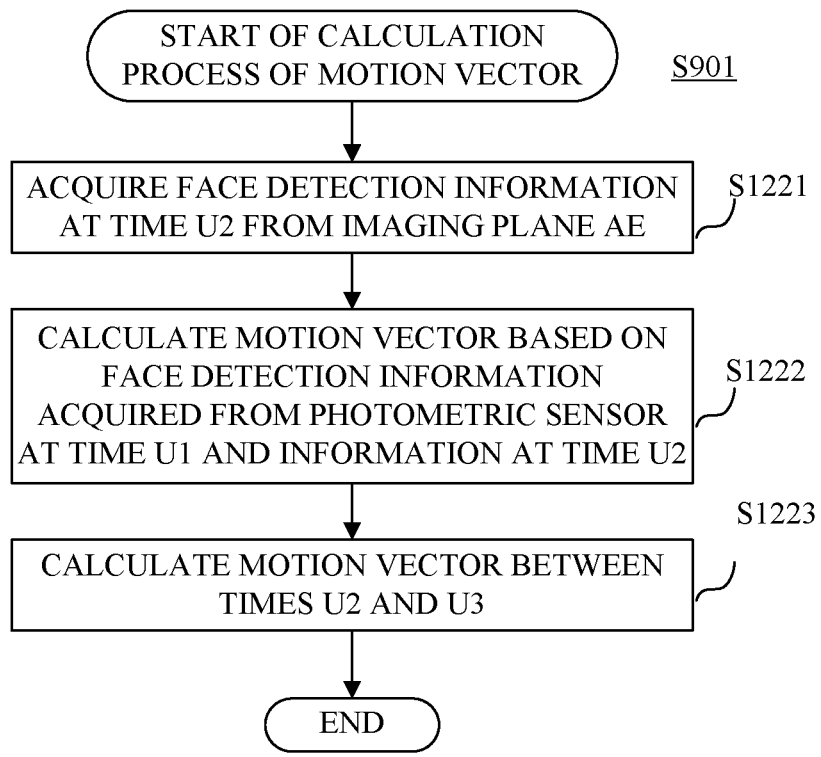

Next, referring to FIGS. 12A and 12B, a method (step S901) of calculating the motion vector of the object based on the output signal of the photometric sensor and the output signal of the imaging plane AE by the object detection unit 109 will be described. FIG. 12A is an explanatory diagram of the method of calculating the motion vector based on the output signal of the photometric sensor and the output signal of the imaging plane AE, and FIG. 12B is a flowchart of the method of calculating the motion vector.

FIG. 12A is a diagram of illustrating the motion of the object moving within a range of a plurality of distance measuring points from time U1 to time U3 on the imaging screen. The time U1 is the accumulation center time photometered by the photometric sensor at the time of focus detection in a previous mirror-down state, and it represents a position of an object 1202 on the imaging screen at the time U1. The detection area of the object 1202 detected by the photometric sensor at the time U1 is denoted by 1203, and the centroid position of the detection area is denoted by 1204. The area (photometric area) of the photometric sensor is the same area as in FIG. 11C. On the other hand, the time U2 is the accumulation center time taken by the imaging plane AE of the object detection unit 109 in the mirror-up state, and it represents a position of an object 1205 on the imaging screen at the time U2. The face detection area of the object 1205 detected by the imaging plane AE at the time U2 is denoted by 1206, and the centroid position of the face detection area is denoted by 1207. The motion vector 1208 of the object between the time U1 and the time U2 is calculated based on the centroid positions 1204 and 1207 of the face detection area at the time U1 and the time U2. The method of calculating the motion vector is the same as the method described with reference to FIGS. 11A to 11C.

The detection area of the imaging plane AE also includes a plurality of areas. The detection area of the imaging plane AE may be the same area as the detection area of the photometric sensor described with reference to FIG. 11C, or it may include more areas than that. Based on the motion vector 1208, a motion vector 1209 between the time U2 and the accumulation center time U3 of the focus detection in the next mirror-down state is estimated. The centroid position 1210 of the face of the object assumed at the time U3 based on the estimated motion vector 1209, and a position 1211 of the object at the time U3 is predicted.

Next, referring to FIG. 12B, a flowchart of the calculation method will be described. The times U1, U2, and U3 in FIG. 12B are the same as the times described with reference to FIG. 12A. First, at step S1221, the setting unit 102 acquires face detection information of the accumulation center time U2 captured by the imaging plane AE in the mirror-up state. Subsequently, at step S1222, the setting unit 102 calculates a motion vector of the object between the times U1 and U2.

The motion vector can be calculated based on the face detection information acquired at the accumulation center time U1 photometrically measured with the photometric sensor at the time of focus detection in the previous mirror-down state and the face detection information at the time U2 acquired at step S1221. Subsequently, at step S1223, the setting unit 102 calculates a motion vector between the times U2 and U3 based on the motion vector calculated at step S1222. Since human body detection information is also obtained on the photometric sensor and the imaging plane AE, a motion vector of the object may be obtained using the human body detection information instead of the face detection information.

Figure 13A:
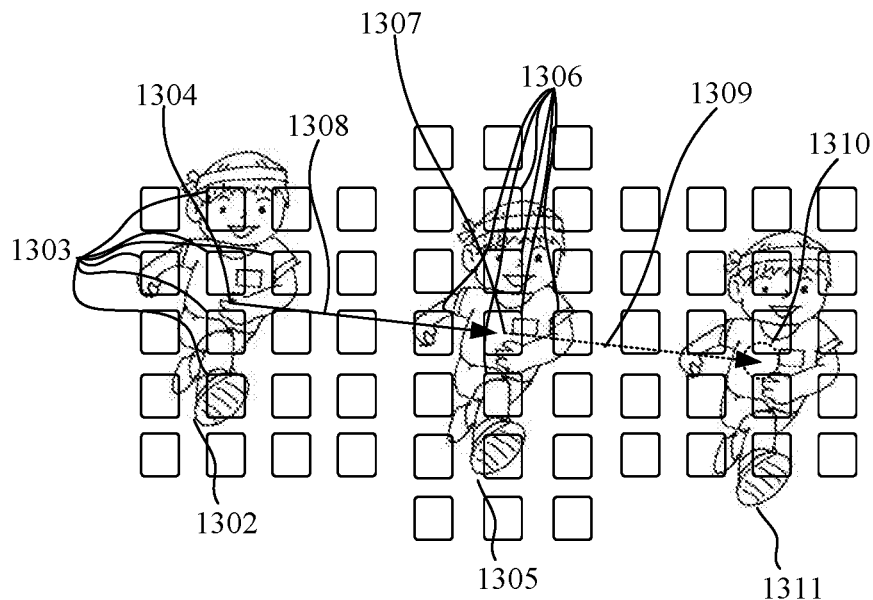
FIGS. 13A and 13B are explanatory diagrams of a method of calculating the motion vector based on an output signal of a secondary imaging phase difference AF in each of the first to third embodiments.
Figure 13B:
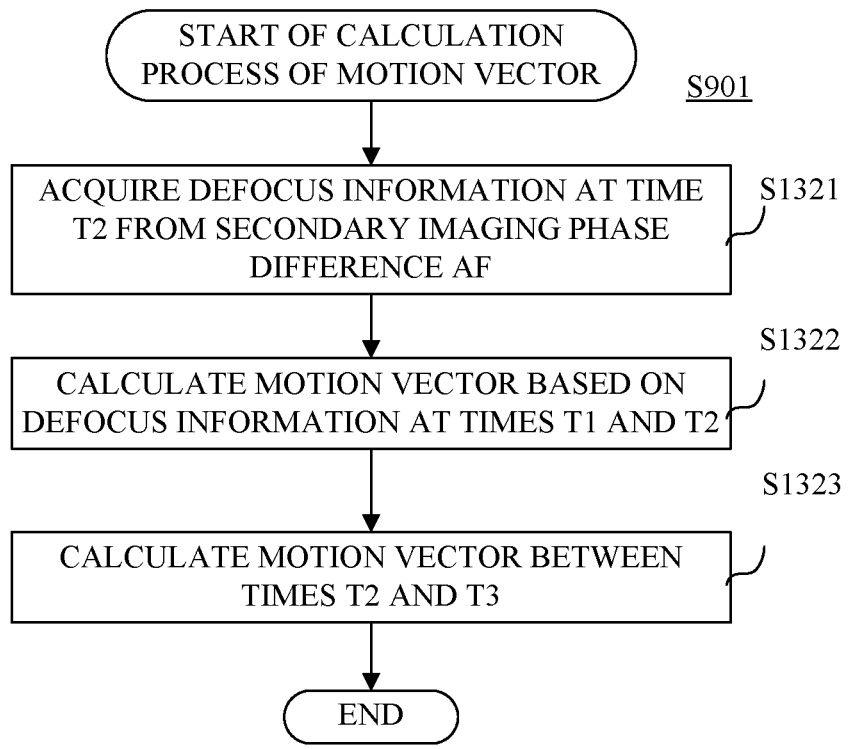

Next, referring to FIGS. 13A and 13B, a method (step S901) of calculating the motion vector of the object based on the defocus amount obtained by the secondary imaging phase difference AF by the focus detection unit 101 will be described. FIG. 13A is an explanatory diagram of a method of calculating the motion vector based on the defocus amount obtained by the secondary imaging phase difference AF, and FIG. 13B is a flowchart of the method of calculating the motion vector.

FIG. 13A is a diagram of illustrating the motion of an object moving within a range of a plurality of distance measuring points from time T1 to time T3 on the imaging screen. The time T1 is the accumulation center time of the secondary imaging phase difference AF sensor at the time of focus detection two times before, and it represents a position 1302 of the object on the imaging screen at the time T1. At the time T1, the distance measuring point at which the defocus amount of the object detected by the secondary imaging phase difference AF is detected is denoted by 1303, and thus a mass of the object is detected. The determination to regard as the defocus amount of the object is performed by comparing the defocus amount of the focus detection point of interest with the defocus amount of the adjacent focus detection point. When a determination width of the defocus amount is a defocus amount within an in-focus determination width (for example, Fδ), it is regarded as the same object. On the other hand, when the determination width is a defocus amount exceeding the range of the in-focus determination width, it is regarded that the object is not the same object. The defocus amount regarded as the same object may be a value equal to or larger than the in-focus width, or it may be changed according to the distance of the object. A centroid position 1304 of the object is calculated based on the defocus amount of the distance measuring point regarded as the same object.

On the other hand, the time T2 is the accumulation center time of the secondary imaging phase difference AF sensor at the time of focus detection one time ago, and it represents a position 1305 of the object on the imaging screen at the time T2. At the time T2, the distance measuring point at which the defocus amount of the object detected by the secondary imaging phase difference AF is detected is denoted by 1306 to detect a lump of the object. The method of regarding it as the defocus amount of the object is the same as the method in which it is regarded as a lump of the object at the time T1. A centroid position 1307 of the object is calculated based on the defocus amount of the distance measuring point regarded as the same object. A motion vector 1308 at the time T1 and the time T2 is calculated based on the centroid positions 1304 and 1307 of the object at the time T1 and the time T2. The method of calculating the motion vector is the same as the method described with reference to FIGS. 11A to 11C. Based on a motion vector 1308, a motion vector 1309 at the time T2 and at the time T3 which is considered to be the accumulation center time at the current focus detection time is estimated, a centroid position 1310 of the object at the time T3 is estimated, and a position 1311 of the object at the time T2 is predicted.

Next, the flowchart of FIG. 13B will be described. The times T1, T2, and T3 in FIG. 13B are the same as the times described with reference to FIG. 13A. First, at step S1321, the setting unit 102 acquires the defocus amount (defocus information) at the time T2 by the secondary imaging phase difference AF using the focus detection unit 101. Subsequently, at step S1322, the setting unit 102 calculates a motion vector between times T1 and T2 based on the defocus information at the time T1 and the time T2. Subsequently, at step S1323, the setting unit 102 calculates a motion vector between times T2 and T3 based on the motion vector calculated at step S1322, and then the flow is ended.

Figure 14A:
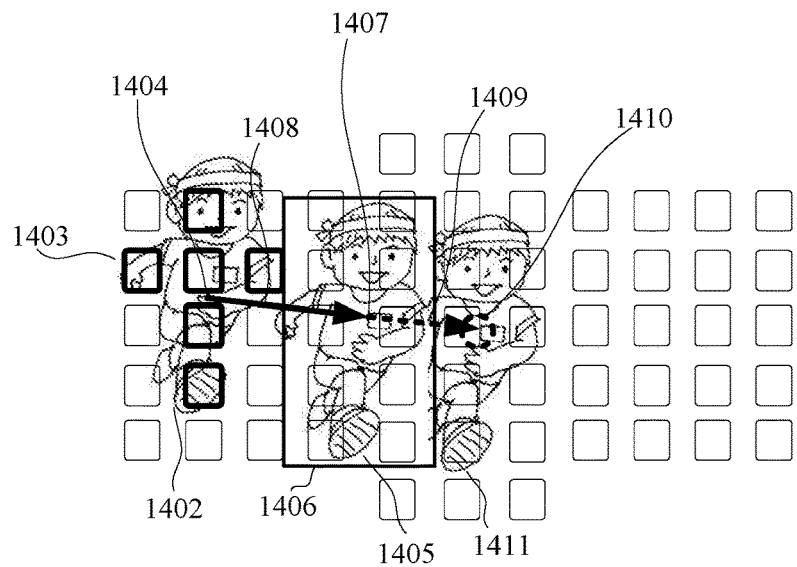
FIGS. 14A to 14C are explanatory diagrams of a method of calculating the motion vector based on the output signal of the secondary imaging phase difference AF and an output signal of an imaging plane AF in each of the first to third embodiment.
Figure 14B:
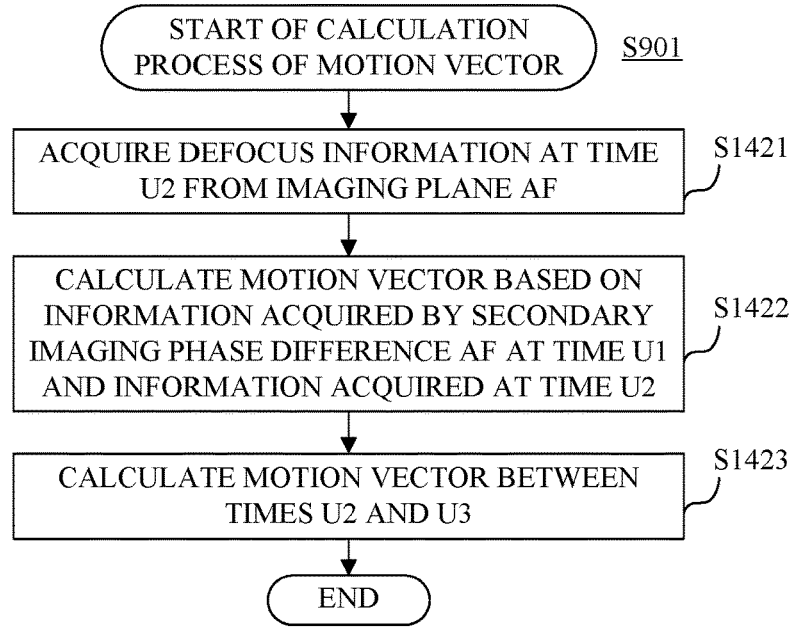
Figure 14C:
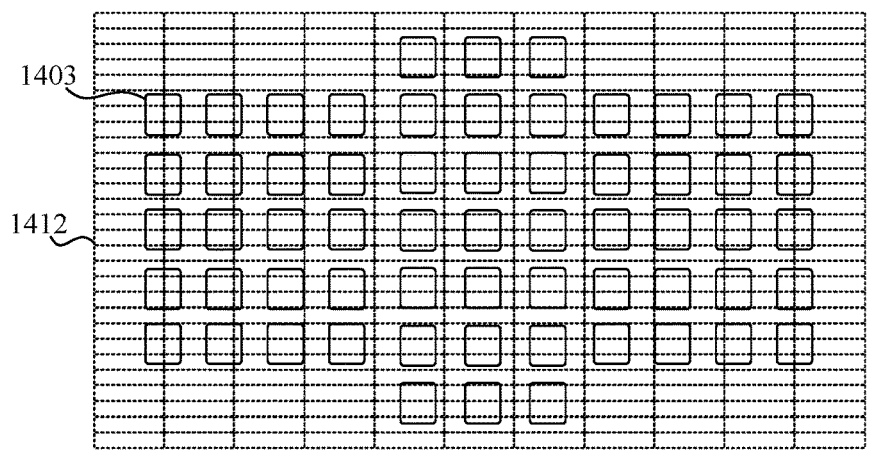

Next, referring to FIGS. 14A to 14C, a method (Step S901) of calculating the motion vector of the object based on the secondary imaging phase difference AF by the focus detection unit 101 and the defocus amount obtained by the imaging plane AF will be described. FIG. 14A is an explanatory diagram of the method of calculating the motion vector based on the defocus amount obtained by the secondary imaging phase difference AF and the imaging plane AF, FIG. 14B is a flowchart of the method of calculating the motion vector, and FIG. 14C is an explanatory diagram of a plurality of distance measuring areas 1412 and a plurality of distance measuring points 1403.

FIG. 14A is a diagram of illustrating the motion of the object moving over a range of a plurality of distance measuring points from time U1 to time U3 on the imaging screen. The time U1 is the accumulation center time of the secondary imaging phase difference AF sensor at the time of focus detection in the previous mirror-down state, and it represents a position 1402 of the object on the imaging screen at the time U1. The distance measuring point where the defocus amount of the object is detected by the secondary imaging phase difference AF at the time U1 is denoted by 1403, and the lump of the object is detected. The determining method of being regarded as the defocus amount is the same as the method described with reference to FIG. 13A, and therefore descriptions thereof will be omitted. A centroid position 1404 of the object is calculated based on the defocus amount of the distance measuring point regarded as the same object.

On the other hand, the time U2 is the accumulation center time at which an image is captured by the imaging plane AF in the mirror-up state, and it represents a position 1405 of the object on the imaging screen at the time U2. In the imaging plane AF, as illustrated in FIG. 14C, a plurality of distance measuring areas (focus detection areas) 1412 are arranged so as to cover the plurality of distance measuring points 1403 of the secondary imaging phase difference AF. Based on the defocus amount detected by each area of the imaging plane AF at the time U2, the lump of the object is determined by the same method as described with reference to FIG. 13A. The lump area of the determined object is denoted by 1406, and a centroid position of the object detection area is denoted by 1407. A motion vector 1408 between the time U1 and the time U2 is calculated based on the centroid positions 1404 and 1407 of the object at the time U1 and the time U2. The method of calculating the motion vector is the same as the method described with reference to FIGS. 11A to 11C. Based on the motion vector 1408, a motion vector 1409 between the time U2 and the time U3 which is considered to be the accumulation center time at the current focus detection in the next mirror-down state is estimated. Then, a centroid position 1110 of the object assumed at the time U3 is estimated, and a position 1411 of the object at the time U3 is predicted.

Next, the flowchart of FIG. 14B will be described. The times U1, U2, and U3 in FIG. 14B are the same as the times described with reference to FIG. 14A. First at step S1421, the setting unit 102 acquires object position detection information (defocus information) of the accumulation center time U2 at which an image is captured by the imaging plane AF in the mirror-up state. Subsequently, at step S1422, the setting unit 102 calculates a motion vector of the object between the times U1 and U2. The calculation of the motion vector is performed based on the object position detection information acquired at the time U1 by the secondary imaging phase difference AF in the previous mirror-down state and the object position detection information at the time U2 acquired at step S1421. Subsequently, at step S1423, the setting unit 102 calculates a motion vector between the times U2 and U3 based on the motion vector calculated at step S1122, and then the flow is ended.

Figure 15A:
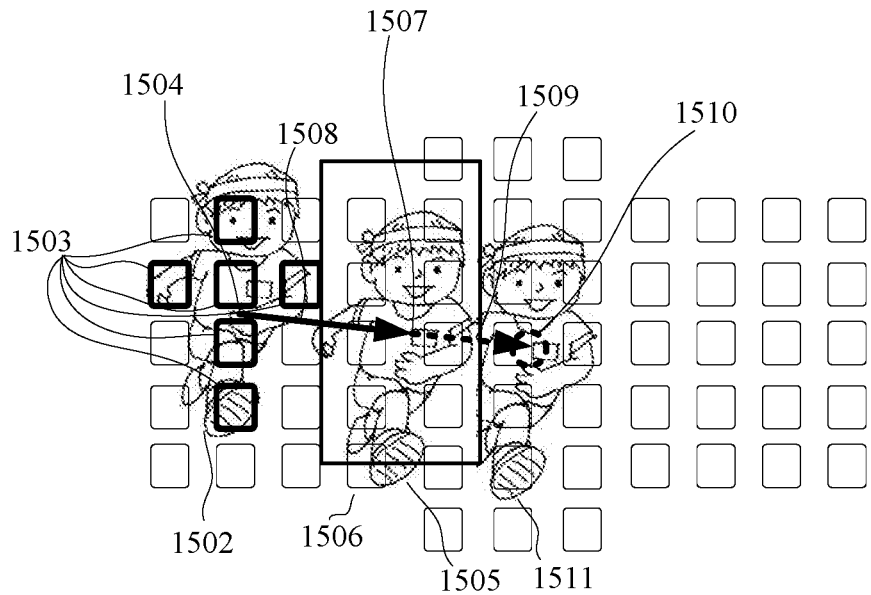
FIGS. 15A and 15B are explanatory diagrams of a method of calculating the motion vector based on the output signal of the secondary imaging phase difference AF and the output signal of the imaging plane AE in each of the first to third embodiments.
Figure 15B:
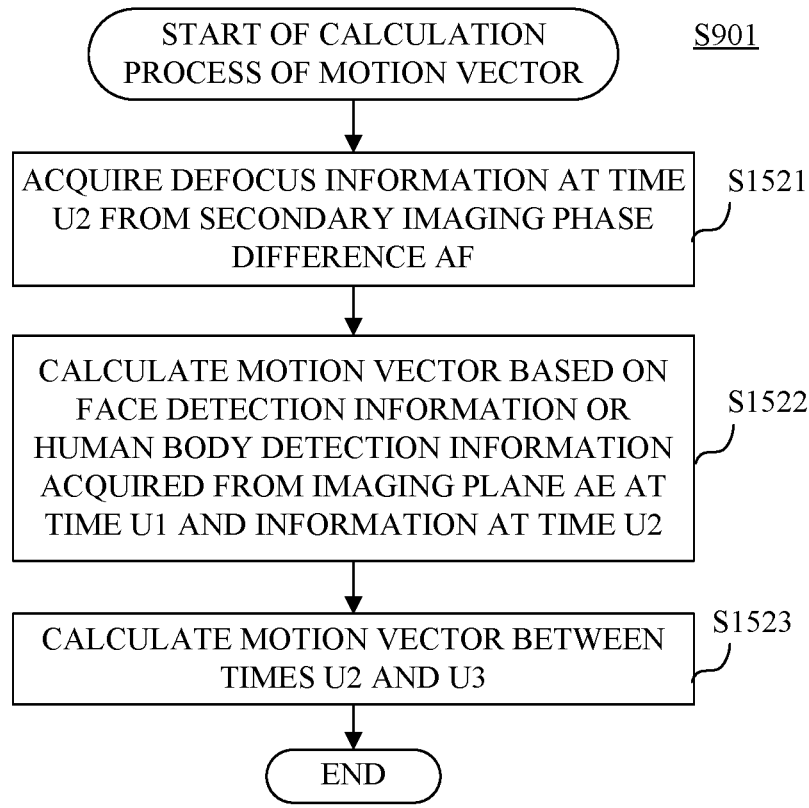

Next, referring to FIGS. 15A and 15B, a method (step S901) of calculating the motion vector of the object based on the defocus amount that is obtained by the secondary imaging phase difference AF by the focus detection unit 101 and the imaging phase difference AF and the output result of the imaging plane AE will be described. FIG. 15A is an explanatory diagram of the method of calculating the motion vector based on the defocus amount obtained by the secondary imaging phase difference AF and the output result of the imaging plane AE, and FIG. 15B is a flowchart of the method of calculating the motion vector.

FIG. 15A is a diagram of illustrating the motion of the object moving within a range of a plurality of distance measuring points from time U1 to time U3 on the imaging screen. The time U1 is the accumulation center time of the secondary imaging phase difference AF sensor at the time of focus detection in the previous mirror-down state, and it represents a position 1502 of the object on the imaging screen at the time U1. The distance measuring point where the defocus amount of the object detected by the secondary imaging phase difference AF is detected at the time U1 is denoted by 1503, and the lump of the object is detected. The method of determining the lump of the object based on the defocus amount is the same as the method described with reference to FIG. 13A, and therefore descriptions thereof is omitted. A centroid position 1504 of the object is calculated based on the distance measuring point having the defocus amount determined as the lump of the object.

On the other hand, the time U2 is the accumulation center time at which an image is captured by the imaging plane AE in the mirror-up state, and it represents a position 1505 of the object on the imaging screen at the time U2. As described with reference to FIGS. 11A to 11C, the photometric area of the imaging plane AE is considered to have the same area as the photometric area of the photometric sensor of FIG. 11C. A human body detection area of the object detected by the imaging plane AE at the time U2 is denoted by 1506, and the centroid position of the human body detection area 1506 is denoted by 1507. A motion vector 1508 of the object between the time U1 and the time U2 is calculated based on the centroid positions 1504 and 1507 of the human body detection area at the time U1 and the time U2. The method of calculating the motion vector is the same as the method described with reference to FIGS. 11A to 11C. Based on the motion vector 1508, a motion vector 1509 between the time U2 and the time U3 which is considered to be the accumulation center time at the current focus detection in the next mirror-down state is estimated. Then, a centroid position 1510 of the object assumed at the time U3 is estimated, and a position 1511 of the object at the time U3 is predicted.

Next, the flowchart of FIG. 15B will be described. The times U1, U2, and U3 in FIG. 15B are the same as the times described with reference to FIG. 15A. Subsequently, at step S1521, the setting unit 102 acquires human body detection information (object position detection information, or defocus information) of the accumulation center time U2 at which an image is captured by the imaging plane AE in the mirror-up state. Subsequently, at step S1522, the setting unit 102 calculates a motion vector of the object between the times U1 and U2. The motion vector of the object is calculated based on the object position detection information acquired at the time U1 of the secondary imaging phase difference AF in the previous mirror-down state and the object position detection information at the time U2 acquired at step S1521. Subsequently, at step S1523, the setting unit 102 calculates a motion vector between the times U2 and U3 based on the motion vector calculated at step S1522, and then the flow is ended.

Next, referring to FIG. 16, a routine, which is performed at step S405 in FIG. 4, of automatically setting the set value of the "tracking ability with respect to velocity change" that is one of the plurality of setting items relating to the tracking operation, will be described. The "tracking ability with respect to velocity change" is a setting item indicating how much velocity change is observed. That is, the "tracking ability with respect to velocity change" is the setting item indicating the degree of the difference, which is to be regarded as the same object, between the defocus amount of the object predicted from the defocus amount detection times and the imaging plane positions plurality of times in the past and the observed defocus amount. It is preferable to permit a greater change in velocity when the velocity of the object changes greatly and to permit the velocity change to be small when the velocity of the object does not change much. If the velocity of the object greatly changes and the velocity change is permitted to be small, there is a possibility that the object cannot be appropriately followed. On the other hand, if the velocity of the object does not change so much and the velocity change is permitted largely, there is a possibility that another object is erroneously followed. Thus, it is preferable to appropriately set the "tracking ability with respect to velocity change" according to the change of the motion of the object changing every time.

Figure 16:
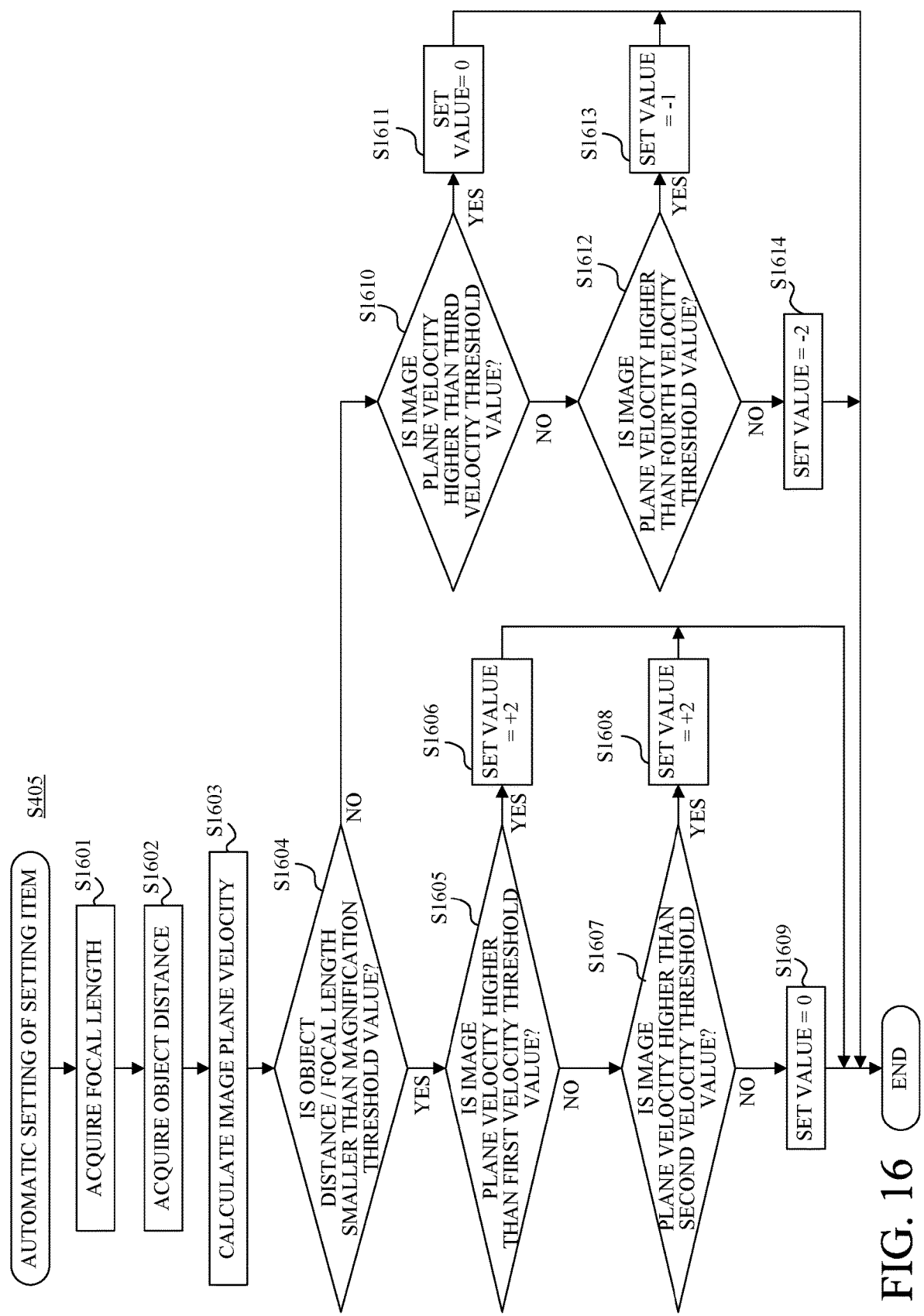
FIG. 16 is a flowchart of illustrating an automatic setting process of a tracking ability with respect to a velocity change in each of the first to third embodiments.

Referring to FIG. 16, a method of automatically setting the "tracking ability with respect to velocity change" will be described. FIG. 16 is a flowchart of illustrating an automatic setting process of the tracking ability with respect to velocity change. First, at step S1601, the setting unit 102 acquires focal length information from the imaging lens 201. Subsequently, at step S1602, the setting unit 102 acquires information on an object distance from the imaging lens 201. For example, the object distance is determined in association with a focus lens position of the imaging lens 201. Subsequently, at step S1603, the setting unit 102 calculates an image plane velocity of the object based on the defocus amount detection times and the image plane positions a plurality of times in the past stored in the memory unit 108. Subsequently, at step S1604, the microcomputer 221 determines whether the "object distance/focal distance" is smaller than a predetermined magnification threshold value. When the "object distance/focal length" is smaller than the predetermined magnification threshold value, the flow proceeds to step S1605. On the other hand, when the "object distance/ focal distance" is not smaller than the predetermined magnification threshold value, the flow proceeds to step S1610.

At step S1605, the microcomputer 221 determines whether the image plane velocity is higher than a predetermined first velocity threshold value. When the image plane velocity is higher than the predetermined first image plane velocity, the flow proceeds to step S1606. On the other hand, when the image plane velocity is not higher than the first image plane velocity, the flow proceeds to step S1607. At step S1606, the setting unit 102 sets a set value of +2 in the setting item, and then this routine is ended. At step S1607, the microcomputer 221 determines whether the image plane velocity is higher than a predetermined second velocity threshold value. When the image plane velocity is higher than the predetermined second image plane velocity, the flow proceeds to step S1608. On the other hand, when the image plane velocity is not higher than the second image plane velocity, the flow proceeds to step S1609. The second velocity threshold value is smaller than the first velocity threshold value. At step S1608, the setting unit 102 sets a set value of +1 in the setting item, and this routine is ended. At step S1609, the setting unit 102 sets a set value of 0 in the setting item, and then this routine is ended.

At step S1610, the microcomputer 221 determines whether the image plane velocity is higher than a predetermined third velocity threshold value. When the image plane velocity is higher than the predetermined third image plane velocity, the flow proceeds to step S1611. On the other hand, when the image plane velocity is not higher than the third image plane velocity, the flow proceeds to step S1612. At step S1611, the setting unit 102 sets a set value of 0 in the setting item, and then this routine is ended. At step S1612, the microcomputer 221 determines whether the image plane velocity is higher than a predetermined fourth velocity threshold value. When the image plane velocity is higher than the predetermined fourth image plane velocity, the flow proceeds to step S1613. On the other hand, when the image plane velocity is not higher than the third image plane velocity, the flow proceeds to step S1614. The fourth velocity threshold value is smaller than the third velocity threshold value. At step S1613, the setting unit 102 sets a set value of −1 in the setting item, and then this routine is ended. At step S1614, the setting unit 102 sets a set value of −2 in the setting item, and then this routine is ended.

When the set value of the "tracking ability with respect to velocity change" is large, the difference between the defocus amount of the object predicted from the defocus amount detection times and the image plane positions a plurality of times in the past and the observed defocus amount is permitted to be larger so as to follow an object with large velocity change. On the other hand, when the set value of the "tracking ability with respect to velocity change" is small, the difference between the predicted defocus amount of the object and the observed defocus amount is permitted to be smaller so as to make it difficult to carelessly follow another object. In this embodiment, as the photographing magnification of the object is high and the image plane velocity of the object is high, the set value is set to be large since there is a high probability of accompanying larger velocity change. On the other hand, as the photographing magnification of the object is low and the image plane velocity of the object is small, the set value is set to be small since there is a low possibility of accompanying a large velocity change.

As described above, in the automatic mode of this embodiment, the set value is automatically set. Immediately after the focusing operation is started, the image plane positions of a sufficient number of objects are not stored and the image plane velocity cannot be calculated with high accuracy. Therefore, it is preferred that the initial value is used while a sufficient number of image plane positions are not stored yet. For example, a basic set value of 0 may be used as an initial position. Alternatively, a set value preset by the user may be used as the initial value. Further, a predetermined set value associated with the mode may be used as the initial value.

Alternatively, as described above, the initial value may be determined as appropriate based on the set value, the mode information, the object distance information, or the like stored in the past focusing operation. For example, the set value last set in the immediately preceding focusing operation may be used as the initial value. Alternatively, a set value that is most frequently set among the set values stored in the past may be used as the initial value. Alternatively, a largest set value among the set values stored in the past may be used as the initial value (in the case of a setting item having set values of −2 to +2, +2 is the largest set value). Furthermore, the initial value may be determined based on the set value stored in the past at the object distance corresponding to the current object distance. For example, when an object with a very high image plane velocity is followed by a certain focusing operation, in the subsequent focusing operation, a large value is set as the initial value of tracking ability with respect to velocity change based on the set value set in the past. This makes it possible to track an object with a high image plane velocity immediately after the start of the focusing operation. As described above, when it is considered that the user does not have any experience of photographing at the same place or in the same scene, it is preferred that the initial value is reset. Along with this, the set value, the mode information, the object distance information, or the like stored in the past focusing operation may be deleted.

According to this embodiment, it is possible to select an automatic mode in which all the set values of the plurality of setting items relating to the tracking operation are set automatically. In the automatic mode, it is possible to perform the focusing operation by automatically setting the plurality of setting items relating to the tracking operation according to the motion of the object changing constantly. It is also possible for the user to know the set values of the plurality of setting items relating to the tracking operation suitable for the photographing scene by displaying the set values of the plurality of setting items relating to the focusing operation in the screen and recording the setting values in the captured image.

Second Embodiment

Next, a second embodiment of the present invention will be described. In this embodiment, at least one of a plurality of setting items relating to a focusing operation can be set by automatic setting. A set value is automatically set with respect to the setting item automatically set, and a predetermined set value associated with an operation mode is set with respect to the setting item which is not automatically set. This makes it possible to perform automatic setting according to change of a motion of an object with respect to only a specific setting item while using the predetermined set value associated with the operation mode.

Figure 17:
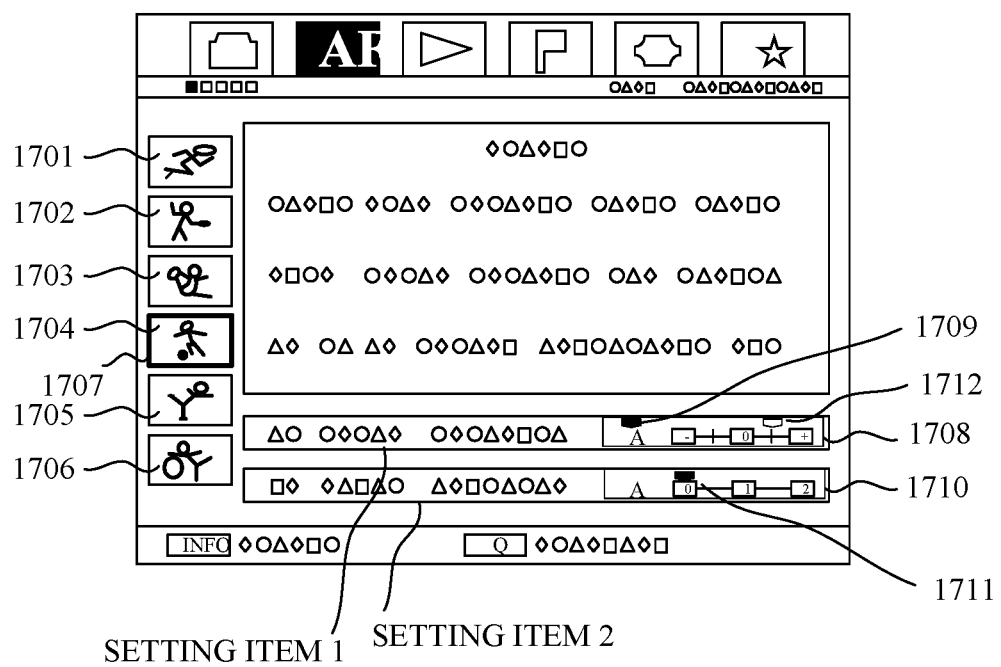
FIG. 17 is an explanatory diagram of an operation mode selection in the second embodiment.

FIG. 17 is an explanatory diagram of the operation mode setting on the menu screen in this embodiment. The same parts as in FIGS. 3A and 3B, such as the description of the tab, will be omitted. Reference numerals 1701 to 1706 denote operation mode icons from the operation mode 1 to the operation mode 6, respectively. A focus display 1707 is displayed in the currently selected operation mode. In a setting area 1708 of the setting item 1, the set value of setting item 1 is displayed with a cursor by a set value display 1709 of the setting item 1. In a setting area 1710 of the setting item 2, the set value of the setting item 2 is displayed with the cursor by a set value display 1711 of the setting item 2. The setting item 1 is set by the automatic setting, and the cursor is displayed at "A" expressing the automatic setting. Further, a predetermined value "+1" of the setting item 1 associated with the selected operation mode 4 is displayed by an initial value display 1712 of the setting item 1 with a color cursor distinguishable from a set value display 1709 of the setting item 1.

Figure 18:
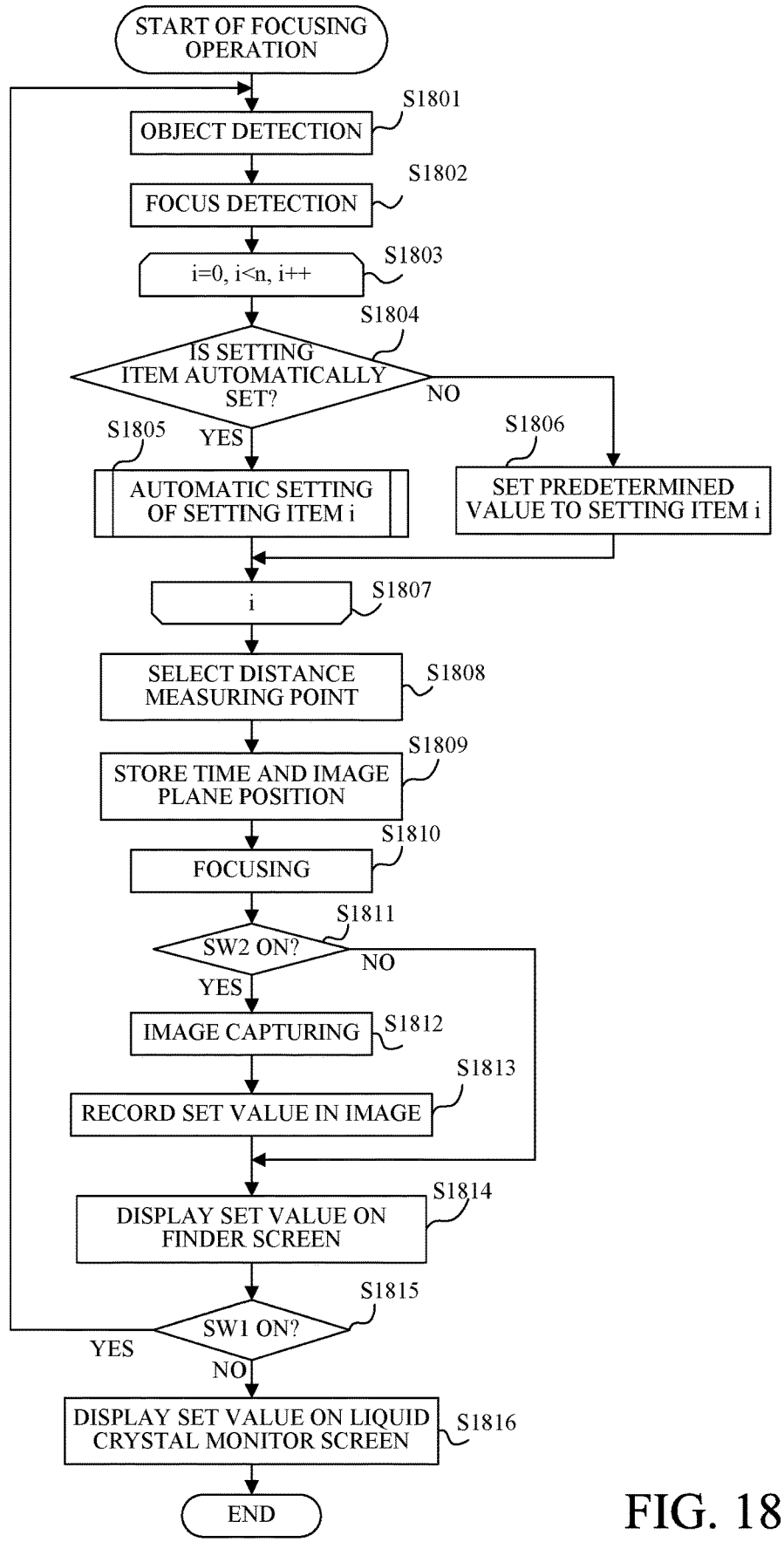
FIG. 18 is a flowchart of illustrating a focusing operation in the second embodiment.

Next, referring to FIG. 18, a focusing operation in this embodiment will be described. FIG. 18 is a flowchart of the focusing operation. Each step of FIG. 18 is realized mainly by each part of the focusing apparatus 100 according to the microcomputer 221 executing a predetermined program. Steps S1801, S1802, S1808 to S1816 in FIG. 18 are basically the same as steps S401, S402, and S411 to S419 in FIG. 4. Therefore, in this embodiment, description thereof will be omitted, and only steps S1803 to S1807 will be described.

At step S1803, the microcomputer 221 performs setting for repeating the process from step S1804 to step S1805 or step S1806 by the predetermined number of times n. Subsequently, at step S1804, the microcomputer 221 determines whether a setting item i is set by automatic setting by the setting automation unit 105. When the setting item i is set by the automatic setting, the flow proceeds to step S1805. On the other hand, when the setting item i is not set by the automatic setting, the flow proceeds to step S1806.

At step S1805, the setting unit 102 performs a routine for automatically setting the setting item i. Since the routine at step S1805 is the same as the description in the first embodiment with reference to FIGS. 9 to 16, its description will be omitted. At step S1806, the setting unit 102 sets a predetermined set value associated with the operation mode in the setting item i. Subsequently, at step S1807, the microcomputer 221 determines whether the iterative process set at step S1803 has been performed a predetermined number of times. When the iterative process has been performed the predetermined number of times, the flow proceeds to step S1808. On the other hand, when the iterative process has not been performed the predetermined number of times, the value of i is incremented by 1 and the flow returns to step S1804.

According to this embodiment, by setting at least one of a plurality of setting items relating to the tracking operation by automatic setting, it is possible to set only the specific setting item to the automatic setting according to the situation of the object while using a predetermined set value associated with the operation mode. Thus, when the user previously determines the set values for some of the plurality of setting items relating to the tracking operation, only the setting item for which the set value has not been determined can be automatically set. Alternatively, it is possible to automatically set only setting items where the motion of the object largely changes.

Third Embodiment

Next, a third embodiment of the present invention will be described. In this embodiment, a plurality of operation modes can be selected by the user. Set values of a plurality of setting items relating to the tracking operation are automatically calculated, and one optimum operation mode is determined from among the plurality of operation modes selected by the user. Then, the set value associated with the determined one operation mode is set for each of the plurality of setting items relating to the tracking operation. Thus, among the plurality of operation modes selected by the user, it is possible to automatically select the operation mode suitable (preferably optimal) for the motion of the object to perform the tracking operation.

Figure 19:
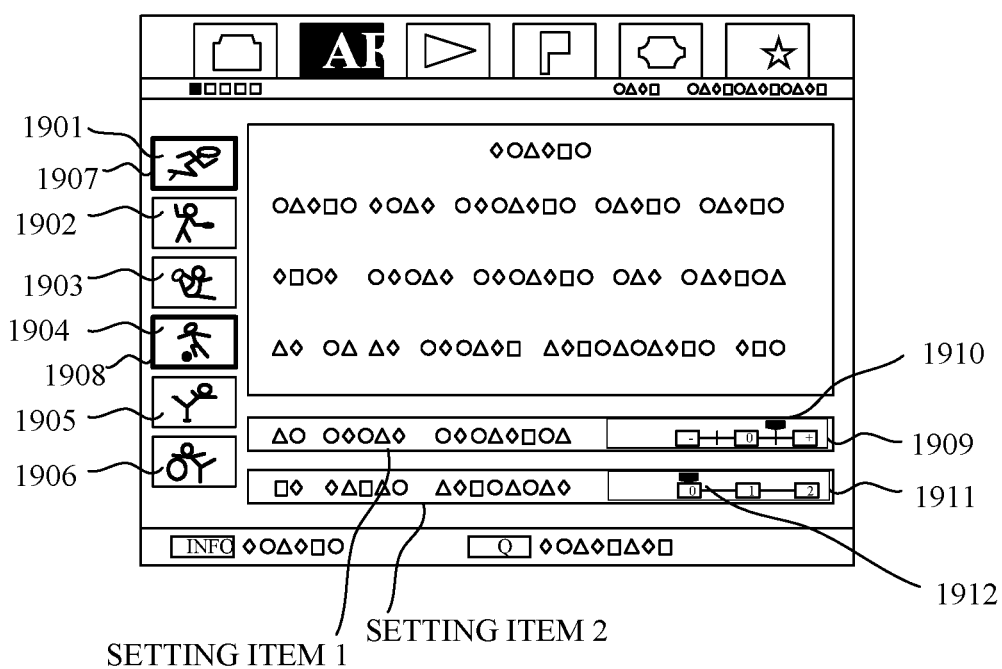
FIG. 19 is an explanatory diagram of an operation mode selection in the third embodiment.

FIG. 19 is an explanatory diagram of the operation mode setting on the menu screen in this embodiment. The same parts as in FIGS. 3A and 3B, such as the description of the tab, will be omitted. Reference numerals 1901 to 1906 denote operation mode icons from the operation mode 1 to the operation mode 6, respectively. Any of the operation modes 1 to 6 are manual modes in which the plurality of setting items relating to the tracking operation are fixed to predetermined values. A plurality of currently selected operation modes are indicated by focus display 1 (1907) and focus display 2 (1908). In a setting area 1909 of the setting item 1, the set value of the setting item 1 is displayed with the cursor by a set value display 1910 of the setting item 1. In a setting area 1911 of the setting item 2, the set value of the setting item 2 is displayed with the cursor by a set value display 1912 of the setting item 2. Here, the setting of the operation mode 4, which is one of a plurality of selected operation modes, is displayed, but any number of operation modes may be used as long as there are two or more operation modes.

Figure 20:
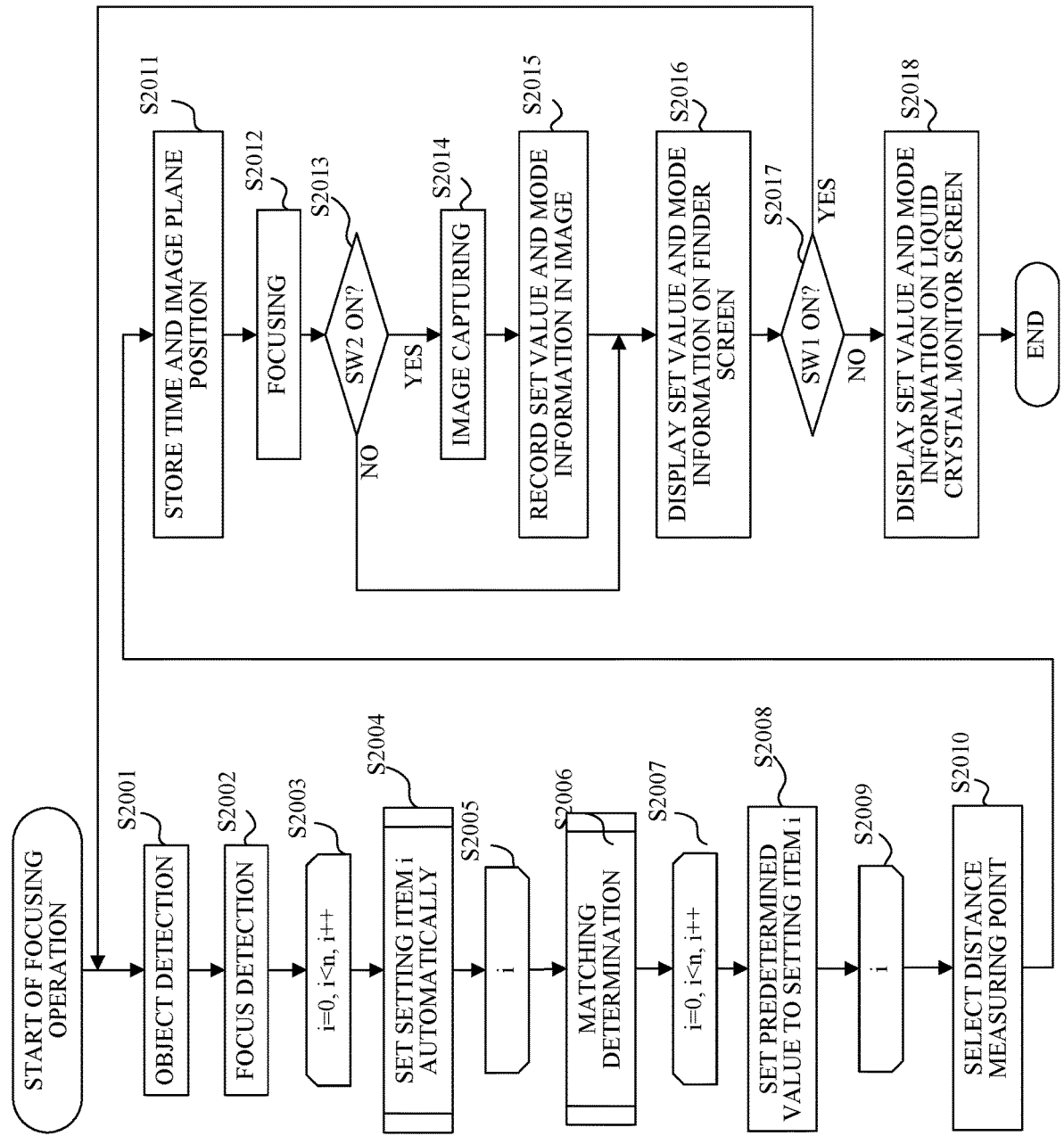
FIG. 20 is a flowchart of illustrating a focusing operation in the third embodiment.

Next, referring to FIG. 20, a focusing operation in this embodiment will be described. FIG. 20 is a flowchart of the focusing operation. Each step of FIG. 20 is realized mainly by each part of the focusing apparatus 100 by the microcomputer 221 performing a predetermined program. Steps S2001, S2002, S2010 to S2018 in FIG. 20 are basically the same as steps S401, S402, and S411 to S419 in FIG. 4. Therefore, in this embodiment, description thereof will be omitted, and only steps S2003 to S2009 will be described.

At step S2003, the microcomputer 221 performs settings for repeating the process of step S2004 by a predetermined number of times n. Subsequently, at step S2004, the setting unit 102 performs a routine for automatically setting the setting item i. Since the routine at step S2004 is the same as the description in the first embodiment with reference to FIGS. 9 to 16, its description will be omitted.

Subsequently, at step S2005, the microcomputer 221 determines whether the iterative process set at step S2003 has been performed a predetermined number of times. When the iterative process has been performed the predetermined number of times, the flow proceeds to step S2006. On the other hand, when the iterative process has not been performed the predetermined number of times, the value of i is incremented by 1, and then the flow proceeds to step S2004. At step S2006, the mode determination unit 107 performs a routine for determining a manual mode associated with set values that match the set values of the plurality of setting items relating to the tracking operation automatically set by the setting unit 102 at step S2005. The routine of step S2006 is the same as the routine described in the first embodiment with reference to FIG. 8. However, in this embodiment, at step S804 of FIG. 8, it is preferred that only the operation mode selected by the multiple mode selection unit 106 is to be calculated.

Subsequently, at step S2007, the microcomputer 221 performs settings for repeating the process of step S2008 by the predetermined number of times n. Subsequently, at step S2008, the setting unit 102 sets a predetermined value associated with the operation mode determined by the mode determination unit 107 at step S2006 for the setting item i relating to the tracking operation. Subsequently, at step S2009, the microcomputer 221 determines whether the iterative process set at step S2007 has been performed a predetermined number of times. When the iterative process has been performed the predetermined number of times, the flow proceeds to step S2010. On the other hand, when the iterative process has not been performed the predetermined number of times, the value of i is incremented by 1, and then the flow proceeds to step S2008.

According to this embodiment, it is possible to automatically select an operation mode suitable for the motion of the object from among a plurality of operation modes selected by the user to perform the tracking operation. In this way, when candidates of the operation modes to be used by the user are narrowed down to some modes in advance, it is possible to select an appropriate operation mode from among the candidates to perform the tracking operation.

Fourth Embodiment

Next, a fourth embodiment of the present invention will be described. In the first to third embodiments, the methods of automatically setting the setting items relating to the tracking operation are described. Among them, the method of automatically changing the set values of the "transfer characteristic of the distance measuring point" and the "tracking ability with respect to velocity change" as the setting items is described. In this embodiment and fifth to seventh embodiments described below, methods of automatically changing the set value of the setting item of an "object tracking characteristic" will be described.

The "object tracking characteristic" is a setting item indicating how long the drive prohibition time of the focus lens of the imaging lens is to be set when it is considered that two objects are not the same based on the focus detection result. In the case where obstacles unintended by the user appear and frequently block the object or it is difficult for the user to capture an object whose motion is large in the screen for example, it is preferred that the drive prohibition time is set to be long. On the other hand, when the user wishes to change the tracking target from one object to another object, it is preferred that the drive prohibition time is shortened. This is because the target to be followed is switched to an unintended object if an obstacle frequently appears to block the object. In addition, if the drive prohibition time is lengthened when the user wishes to switch the object to follow from one object to another object, the object to be followed is not easily switched to the targeted object, and as a result there is a possibility that the photographing at the timing expected by the user is missed. As described above, it is preferred that the "object tracking characteristic" is appropriately set depending on the image capturing state (image capturing situation) or the intention of the user.

Figure 21:
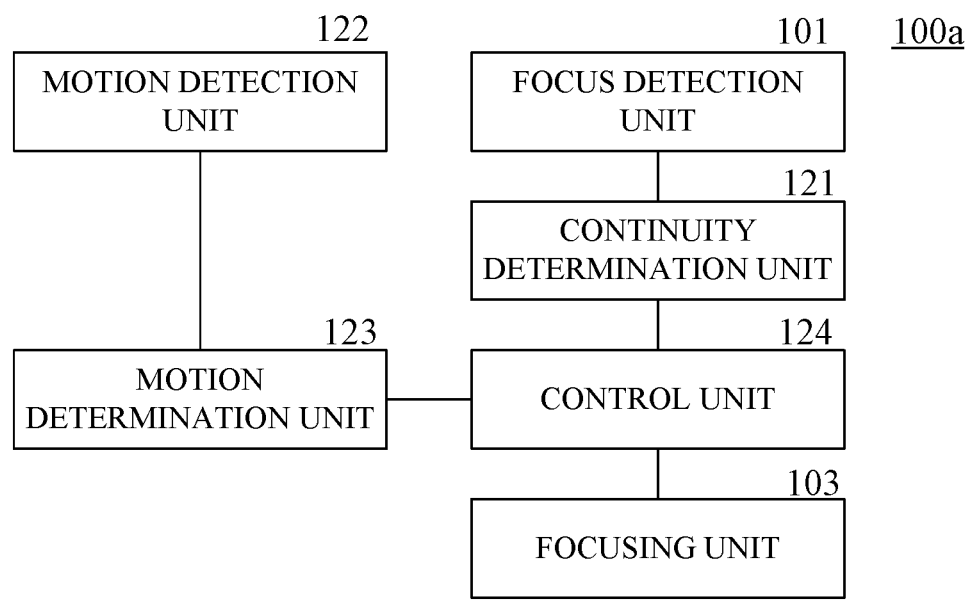
FIG. 21 is a block diagram of a focusing apparatus in each of fourth to sixth embodiments.

First, referring to FIG. 21, a focusing apparatus in this embodiment will be described. FIG. 21 is a block diagram of a focusing apparatus (image capturing apparatus) 100a. Each part in FIG. 21 is realized by cooperation of the hardware and software illustrated in FIG. 22 according to the control of the microcomputer 221 described below with reference to FIG. 22.

A focus detection unit (focus detector) 101 detects focus detection results of a plurality of coordinates in an imaging screen. The focus detection result is detected as an image plane position of an object based on an imaging position of an imaging lens 201 and a defocus amount (focal state). A continuity determination unit (control unit) 121 determines the continuity of the image plane positions of the object based on the time-series change of the focus detection results detected by the focus detection unit 101. A motion detection unit 122 detects a motion detection result (direction or magnitude of the motion) of the image capturing apparatus or the imaging lens. The motion detection result is detected as angular velocity.

A motion determination unit (control unit) 123 determines whether there is a specific motion of the image capturing apparatus or the imaging lens based on the motion detection result detected by the motion detection unit 122. The specific movement will be described below. A control unit (controller) 124 controls a focusing unit (focusing controller) 103 based on the determination result of the continuity of the image plane positions of the object by the continuity determination unit 121 and the determination result of the presence or absence of the specific motion of the image capturing apparatus or the imaging lens by the motion determination unit 123. The focusing unit 103 performs focusing based on an instruction from the control unit 124.

Figure 22:
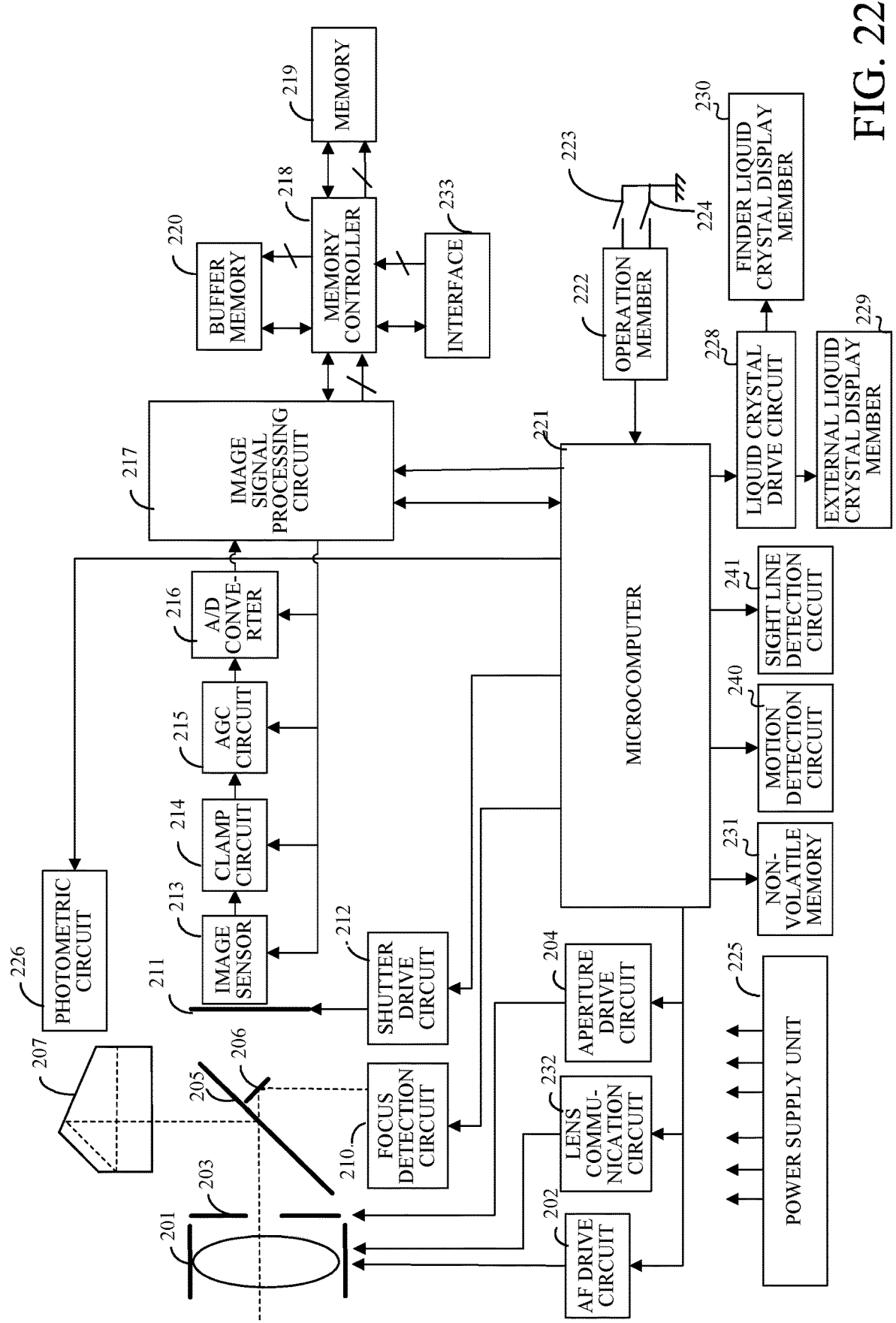
FIG. 22 is a block diagram of an image capturing apparatus in each of the fourth to sixth embodiments.

Next, referring to FIG. 22, an image capturing apparatus (digital single lens reflex camera) in this embodiment will be described. FIG. 22 is a block diagram of an image capturing apparatus 200a in this embodiment. The basic configuration of the image capturing apparatus 200a of this embodiment is the same as that of the image capturing apparatus 200 of the first embodiment, and therefore only different parts from the image capturing apparatus 200 will be described here.

A lens communication circuit 232 communicates with a microcomputer (not illustrated) in the imaging lens 201. This communication is controlled by the microcomputer 221. The microcomputer 221 acquires the state of the imaging lens 201 via the lens communication circuit 232.

A liquid crystal drive circuit 228 drives an external liquid crystal display member 229 and a finder liquid crystal display member 230 according to a display content instruction of the microcomputer 221. A backlight such as an LED (not illustrated) is disposed in the finder liquid crystal display member 230, and the LED is also driven by the liquid crystal drive circuit 228. The microcomputer 221 checks the capacity of a memory 219 via a memory controller 218 based on predicted value data of an image size according to the ISO sensitivity, the image size, or the image quality set before image capturing, and it can calculate the remaining number of capturable images. The microcomputer 221 can display the calculation result on the external liquid crystal display member 229 and the finder liquid crystal display member 230 if necessary. A non-volatile memory 231 (EEPROM) can store data even when the image capturing apparatus 200a is not powered on.

A motion detection circuit 240 includes a detection unit that detects a motion of the image capturing apparatus 200a. The detection unit is, for example, an acceleration sensor, and detects the acceleration when a horizontal axis or a vertical axis of the image capturing apparatus 200a is taken as a rotation axis. A sight line detection circuit (sight line detection unit) 241 detects a sight line position when the user looks in the finder unit (not illustrated). The sight line position is detected by projecting infrared light to the eyeball with a sight line detection LED (not illustrated) and receiving the reflected light with a sight line detection sensor (not illustrated).

The configurations of the focusing apparatus 100a and the image capturing apparatus 200a of this embodiment described with reference to FIGS. 21 and 22 are also common to the fifth embodiment and the sixth embodiment.

Figure 25:
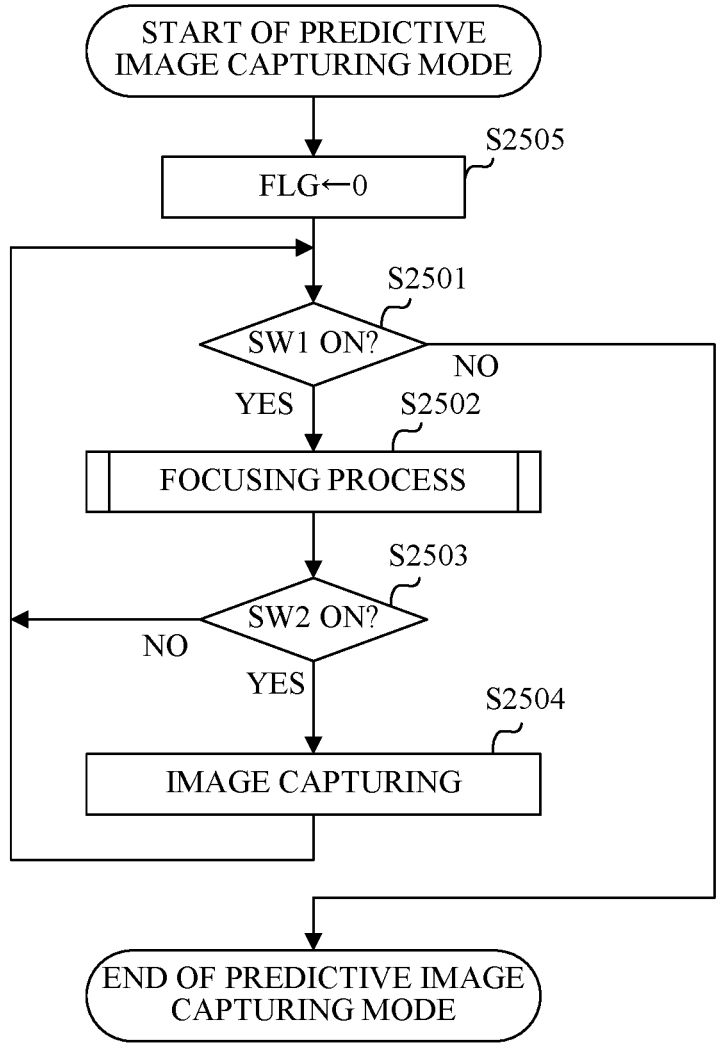
FIG. 25 is a flowchart of illustrating an image capturing process in each of the fourth to sixth embodiments.

Next, referring to FIG. 25, an image capturing process in this embodiment will be described. FIG. 25 is a flowchart of the image capturing process in this embodiment. The image capturing apparatus 200a has two modes of a mode (one-shot image capturing mode) in which the lens is driven with respect to an image plane of the object at a certain time and a mode (predictive image capturing mode) in which the lens is driven while the image plane of the object at a time later than the current time is predicted. In this embodiment, an operation when the image capturing apparatus 200a is set to be in the predictive image capturing mode will be described.

At step S2505, the microcomputer 221 substitutes 0 for the flag FLG. The flag FLG is information indicating whether the drive standby timer described below is being driven or not. Subsequently, at step S2501, the microcomputer 221 determines the state of the switch SW1. When the switch SW1 is on, the flow proceeds to step S2502. On the other hand, when the switch SW1 is off, the microcomputer 221 ends the predictive image capturing mode.

At step S2502, the microcomputer 221 performs focusing process. The details of the focusing process will be described below with reference to FIG. 26. Subsequently, at step S2503, the microcomputer 221 determines the state of the switch SW2. When the switch SW2 is off, the flow returns to step S2501. On the other hand, when the switch SW2 is on, the flow proceeds to step S2504. At step S2504, the microcomputer 221 raises the main mirror 205 and operates the focal plane shutter 211 to perform image capturing. Then, the flow returns to step S2501.

Figure 26:
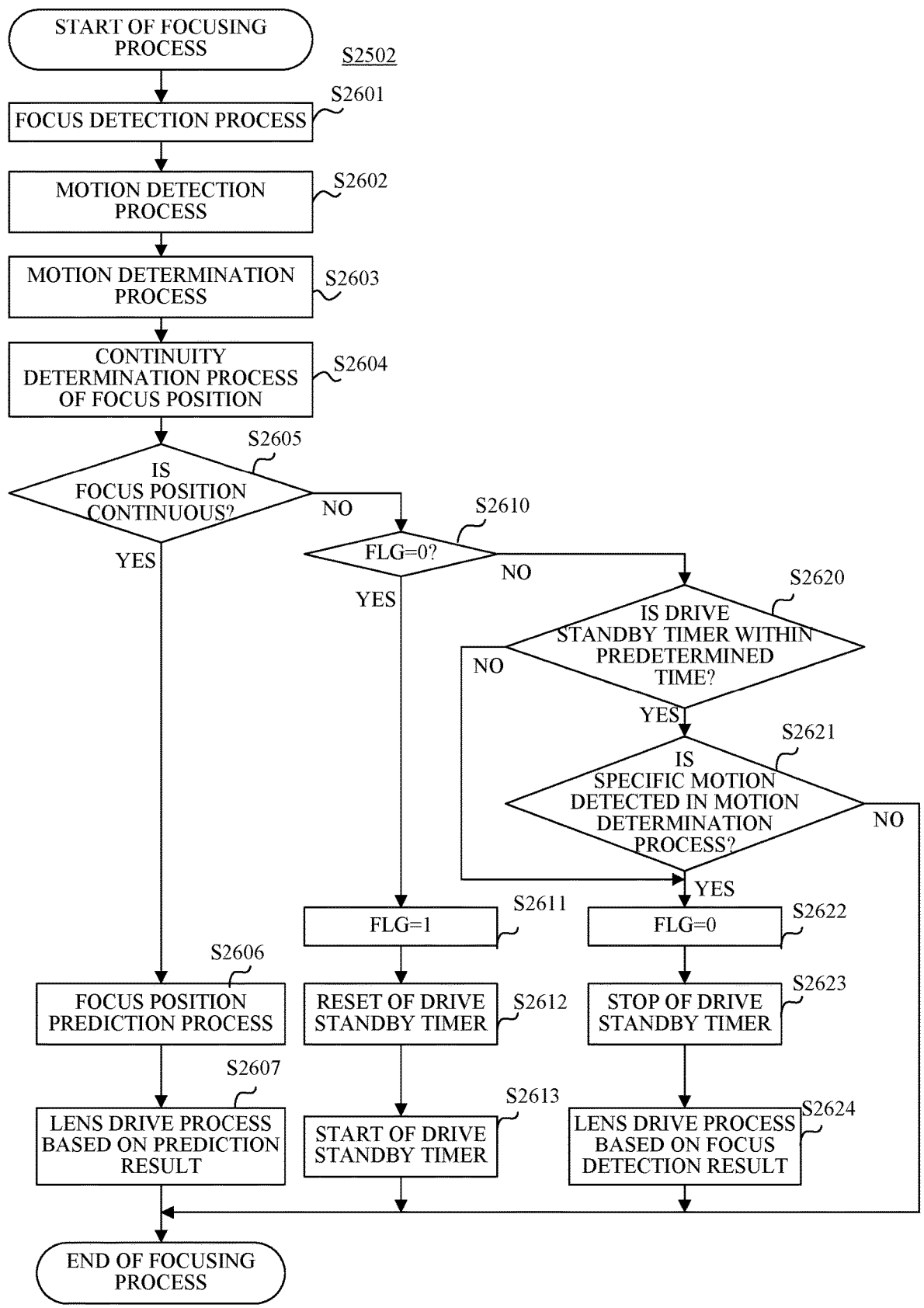
FIG. 26 is a flowchart of illustrating a focusing process in the fourth embodiment.

Next, referring to FIG. 26, focusing process (step S2502 in FIG. 25) in this embodiment will be described. FIG. 26 is a flowchart of the focusing process. First, at step S2601, the microcomputer 221 controls the focus detection circuit 210 to obtain the defocus amount. Further, the microcomputer 221 acquires the image plane position which is the position of the imaging lens 201 in which the object is in focus, based on the defocus amount and the current position of the imaging lens 201. Then, the microcomputer 221 stores the acquired image plane position, together with the detection time, in the memory 219.

Subsequently, at step S2602, the microcomputer 221 controls the motion detection circuit 240 to obtain the acceleration of the image capturing apparatus 200a. Then, the microcomputer 221 stores the obtained acceleration, together with the detection time, in the memory 219.

Subsequently, at step S2603, the microcomputer 221 determines, using a plurality of past accelerations stored in the memory 219 at step S2602, whether there is a specific motion with respect to the image capturing apparatus 200a. The specific motion will be described below.

Subsequently, at step S2604, the microcomputer 221 performs a continuity determination process of a focus position. That is, the microcomputer 221 determines the presence or absence of the continuity of the latest detected image plane position based on the plurality of past image plane positions stored in the memory 219 at step S2601. For example, the microcomputer 221 obtains a regression curve by a least squares method or the like with respect to a plurality of image plane positions in the past. Then, when the difference between the latest predicted image plane position predicted from the regression curve and the latest image plane position detected at step S2601 is within a threshold value, the microcomputer 221 determines that the focus position is continuous. On the other hand, when the difference between the predicted image plane position and the latest image plane position exceeds the threshold value, the microcomputer 221 determines that there is no continuity of the focus position. When there is no continuity of the focus position, the microcomputer 221 performs control so as not to use the latest image plane position and its detection time in the prediction process of the focus position used at step S2606 and the determination process of the continuity of the next focus position.

Subsequently, at step S2605, the microcomputer 221 evaluates the result of the continuity determination process of the focus position at step S2604. When it is determined at step S2604 that there is continuity of the latest image plane position, the flow proceeds to step S2606. On the other hand, when it is determined that there is no continuity of the latest image plane position, the flow proceeds to step S2610.

At step S2606, the microcomputer 221 performs a focus position prediction process. In other words, the microcomputer 221 predicts a future image plane position based on the plurality of image plane positions in the past and the latest image plane position stored in the memory 219 at step S2601. For example, as described at step S2604, the microcomputer 221 obtains the regression curve by the method of least squares or the like to predict the future image plane position.

Subsequently, at step S2607, the microcomputer 221 drives the lens based on the focus position prediction result. Since the future image plane position is obtained at step S2606, the microcomputer 221 performs communication via the lens communication circuit 232 in order to drive the focus lens based on the result.

At step S2610, the microcomputer 221 evaluates the value of the flag FLG. When the flag FLG is 0, the flow proceeds to step S2611. On the other hand, when the flag FLG is 1, the flow proceeds to step S2620. At step S2611, the microcomputer 221 substitutes 1 for the flag FLG. Subsequently, at step S2612, the microcomputer 221 resets the drive standby timer. Subsequently, at step S2613, the microcomputer 221 starts time measurement with the drive standby timer.

At step S2620, the microcomputer 221 determines whether the time measurement result of the drive standby timer is within a predetermined time. When the time measurement result of the drive standby timer is within the predetermined time, the flow proceeds to step S2621. On the other hand, when the time measurement result of the drive standby timer exceeds the predetermined time, the flow proceeds to step S2622.

At step S2621, the microcomputer 221 determines whether the specific motion is detected in the motion determination process performed at step S2603. When the specific motion is detected, the flow proceeds to step S2622. When the specific motion is not detected, the focusing process is ended.

At step S2622, the microcomputer 221 substitutes 0 for the flag FLG. Subsequently, at step S2623, the microcomputer 221 stops the time measurement by the drive standby timer. Subsequently, at step S2624, the microcomputer 221 drives the lens based on the image plane position detected most recently at step S2601. The microcomputer 221 performs communication via the lens communication circuit 232 in order to drive the focus lens.

In this flow, the flag FLG is information indicating whether the drive standby timer is in the process of the time measurement. When the drive standby timer is in the process of the time measurement and no specific motion is detected, the microcomputer 221 determines that it cannot follow the object appropriately, and therefore it does not perform a lens drive process. When the drive standby timer is in the process of the time measurement and the predetermined time has expired, the microcomputer 221 determines that a new object is aimed, and therefore it performs the lens drive process based on the latest image plane position. On the other hand, when the drive standby timer is in the process of the time measurement and the specific motion is detected, the microcomputer 221 determines that it has followed the new object, and therefore it performs the lens drive process based on the latest image plane position without waiting for the expiration of the drive standby timer.

Figure 23:
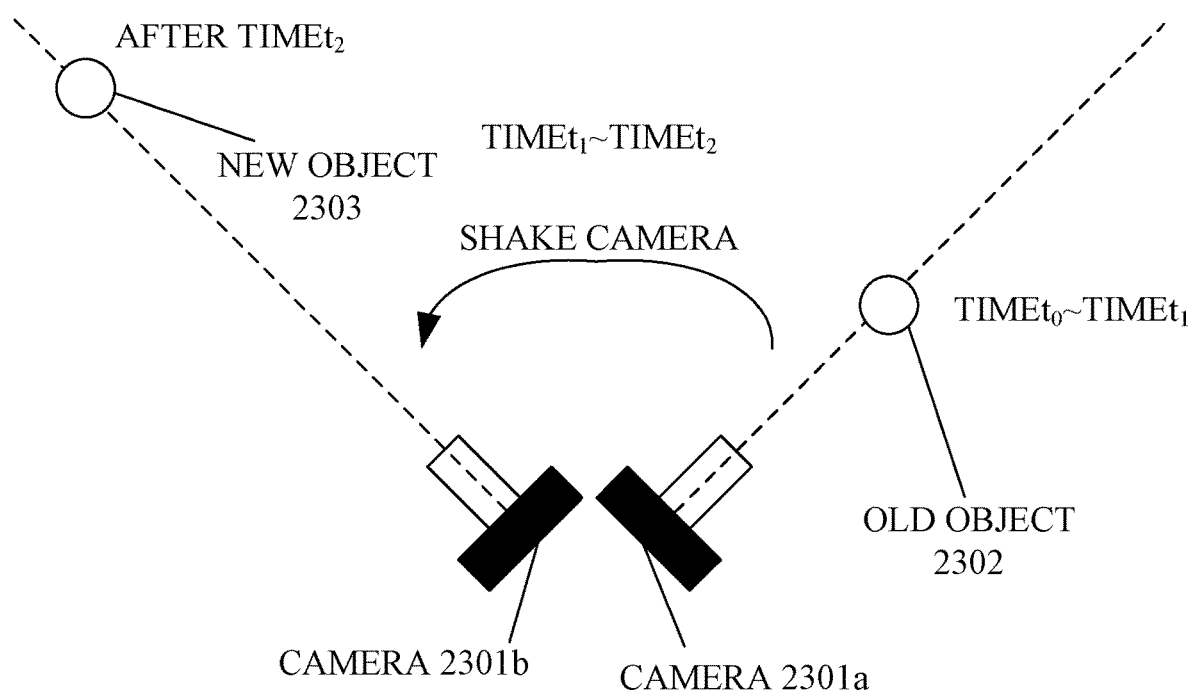
FIG. 23 is an explanatory diagram of a motion of the image capturing apparatus in each of the fourth to sixth embodiments.

Next, referring to FIG. 23, the operation of the image capturing apparatus 200a in this embodiment will be described. FIG. 23 is an explanatory diagram of the operation of the image capturing apparatus 200a (cameras 2301a and 2301b). At time t0, the user presses the switch SW1 with the camera 2301a facing an old object 2302, so that the camera 2301a is focused on the old object 2302. Thereafter, the user quickly performs panning of the camera in a leftward direction to aim a new object 2303 from time t1 to time t2 while the switch SW1 is pressed. After the time t2, the user faces the camera toward the new object 2303, and the relationship between the camera and the object at this time is indicated as the camera 2301b and the new object 2303. The cameras 2301a and 2301b indicate the same camera body (image capturing apparatus 200a).

Figure 24:
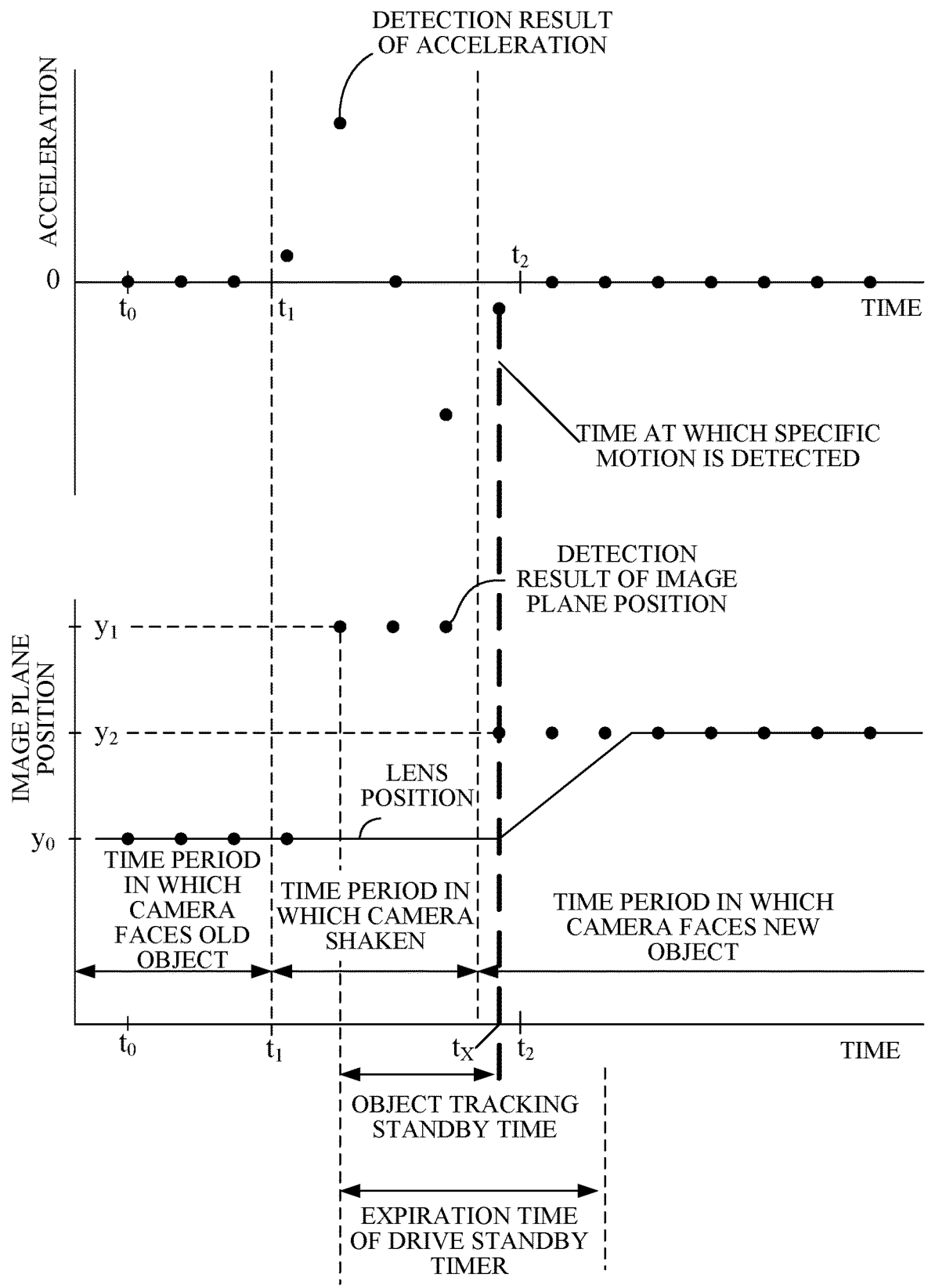
FIG. 24 is a diagram of illustrating a relationship between an acceleration corresponding to the motion of the image capturing apparatus and an image plane position of an object in each of the fourth to sixth embodiments.

Next, referring to FIG. 24, the image plane position and the acceleration detected by the image capturing apparatus 200a performing the operation of FIG. 23 will be described. FIG. 24 is a diagram of illustrating the relationship between the acceleration and the image plane position of the object corresponding to the operation of the image capturing apparatus 200a. The upper part of FIG. 24 illustrates the relationship between the time and the acceleration, and the lower part illustrates the relationship between the time, and the image plane position and the imaging position of the imaging lens 201. It is assumed that step S2502 is being performed at each timing at which the detection results of the image plane position and the acceleration in the graph are obtained. In FIG. 24, the horizontal axis represents the time and the vertical axis represents the acceleration or the image plane position.

Since the old object 2302 is focused at time t0, the image plane position is detected as y0. Since the image capturing apparatus 200a is stationary, the acceleration is zero. Since the old object 2032 is focused, the lens position is y0.

From the time t1 to the time t2, the user quickly performs the panning of the image capturing apparatus 200a in the leftward direction. At this time, since the image capturing apparatus 200a captures the background, the image plane position is detected as y1. The detected image plane position changes from y0 to y1, it is determined that there is no continuity of the focus position in the continuity determination process of the focus position at step S2604, and the lens position is controlled as y0. The expiration time of a drive standby timer is defined as a length illustrated in the lower part of FIG. 24.

In the case of panning the image capturing apparatus 200a, the image capturing apparatus 200a is accelerated in the leftward direction, and therefore the acceleration in the positive direction is detected by the motion detection circuit 240 immediately after the time t1. Thereafter, since the user captures the new object 2303, the user stops the panning and tries to stop the image capturing apparatus 200a. Accordingly, the acceleration in the negative direction, that is, deceleration is detected by the motion detection circuit 240.

Since the new object 2303 is captured at the time tX immediately before the time t2, the detected image plane position is detected as y2. At this time, since the user is about to stop the image capturing apparatus 200a, the magnitude of the negative acceleration is detected as a value close to 0. It is determined that a specific motion has been made at step S2603 by detecting rapid acceleration, sudden deceleration, and the decrease of the magnitude of acceleration, which are features of the detection result of the acceleration from time t1 to time tX. Although it is determined that there is no continuity of the focus position even when the image plane position y0 is changed to y2 in the process of determining the continuity of the focus position at step S2604, the lens position is controlled toward the image plane position y2 at steps S2621 and S2624.

Since the new object 2303 is captured after the time t2, the detected image plane position is detected as y2. Since the image capturing apparatus 200a is stopped, the acceleration is detected as 0.

In this embodiment, even when the focus position is not continuous and the drive standby timer of the lens is not expired yet, control based on the image plane position is performed by detecting the specific motion. As a result, it is possible to quickly focus on the object as compared with a case where the specific motion is not detected.

Fifth Embodiment

Next, referring to FIG. 27, a focusing process (step S2502 in FIG. 25) in a fifth embodiment will be described. In the fourth embodiment, an example in which control is performed based on the image plane position when a specific motion is detected is described. On the other hand, in this embodiment, an example in which the image plane position after detection of the specific motion is considered in addition to the detection of the specific motion will be described. In this embodiment, descriptions common to those of the fourth embodiment will be omitted.

Figure 27:
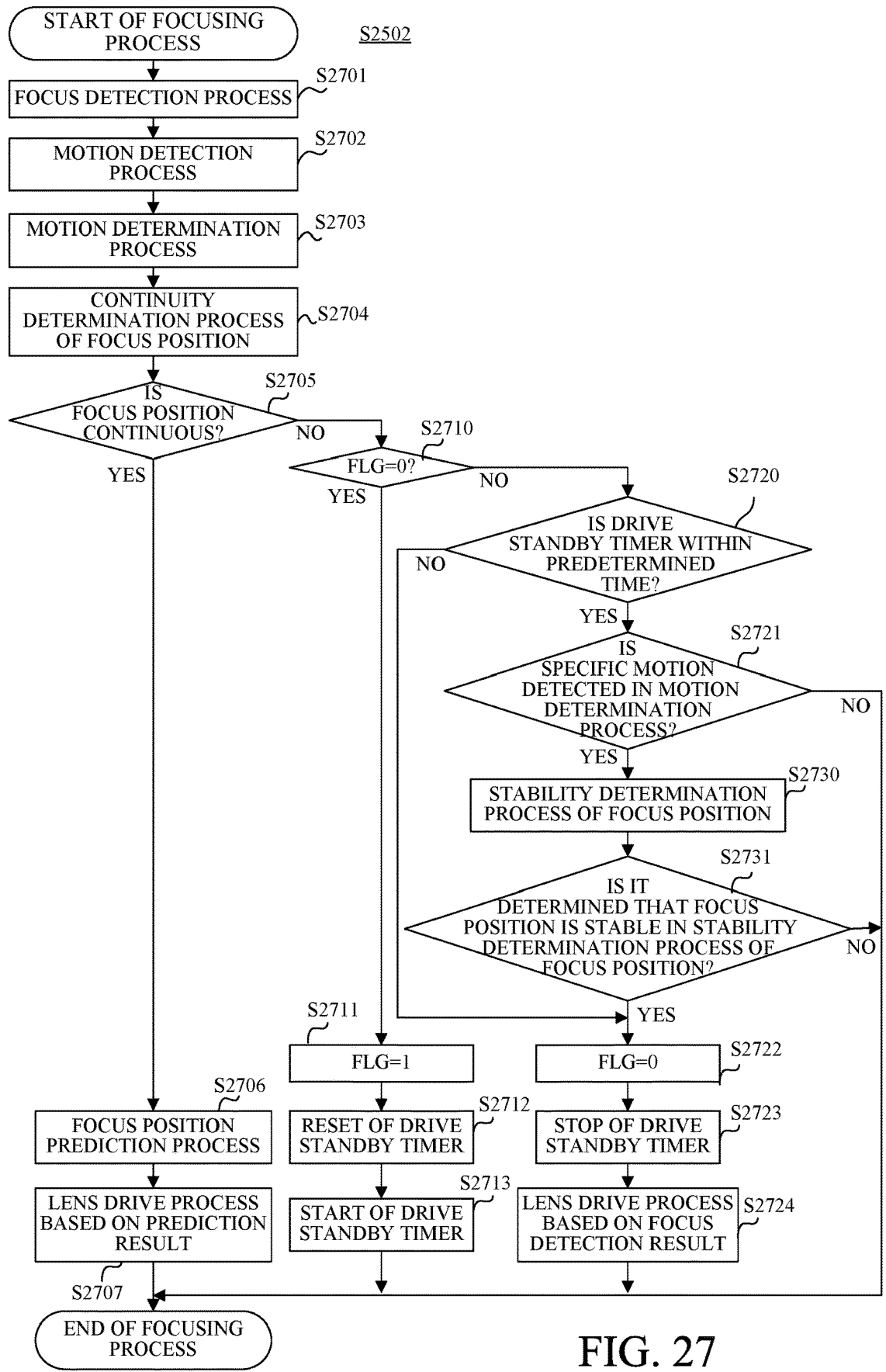
FIG. 27 is a flowchart of illustrating a focusing process in the fifth embodiment.

FIG. 27 is a flowchart of the focusing process in this embodiment. Steps S2701 to S2721 are the same as steps S2601 to S2621 of FIG. 26, respectively. When it is determined at step S2721 that the specific motion is detected in the motion determination process, the flow proceeds to step S2730. On the other hand, when it is determined that the specific motion is not detected, the focusing process is ended.

At step S2730, the microcomputer (stability determination unit) 221 performs a stability determination process of a focus position. That is, the microcomputer 221 determines the presence or absence of the stability of the most recently detected image plane position based on the plurality of past image plane positions stored in the memory 219 at step S2701. The difference from the process of determining the continuity of the focus position at step S2704 is whether or not the predicted image plane position is obtained. In the stability determination process of the focus position, when the image plane positions of the plurality of times in the past and the image plane position detected most recently are within a predetermined range, it is determined that the image plane position is stable. Further, from the image plane positions of a plurality of areas within the angle of field, the image plane position which is the most distant view may be obtained to determine the stability with respect to the image plane position in the close direction by a predetermined amount from the image plane position. This makes it possible to avoid recognizing that the image plane position is stabilized on the background.

Subsequently, at step S2731, the microcomputer 221 determines whether the focus position is stabilized in the stability determination process of the focus position performed at step S2730. When the focus position is stable, the flow proceeds to step S2722. On the other hand, when the focus position is not stable, the focusing process is ended. Subsequent steps S2722 to S2724 are the same as steps S2622 to S2624 of FIG. 26, respectively.

In this embodiment, control based on the image plane position is performed after the specific motion is detected and the focus position is stabilized. As a result, it is possible to focus on the object more accurately than when the stability of the focus position is not determined.

Sixth Embodiment

Next, referring to FIG. 28, the focusing process (step S2502 in FIG. 25) in a sixth embodiment will be described. In the fourth embodiment, the example in which control is performed based on the image plane position when the specific motion is detected is described. On the other hand, in this embodiment, an example in which a motion of a sight line is determined in addition to the detection of the specific motion will be described. In this embodiment, descriptions common to those of the fourth embodiment will be omitted.

Figure 28:
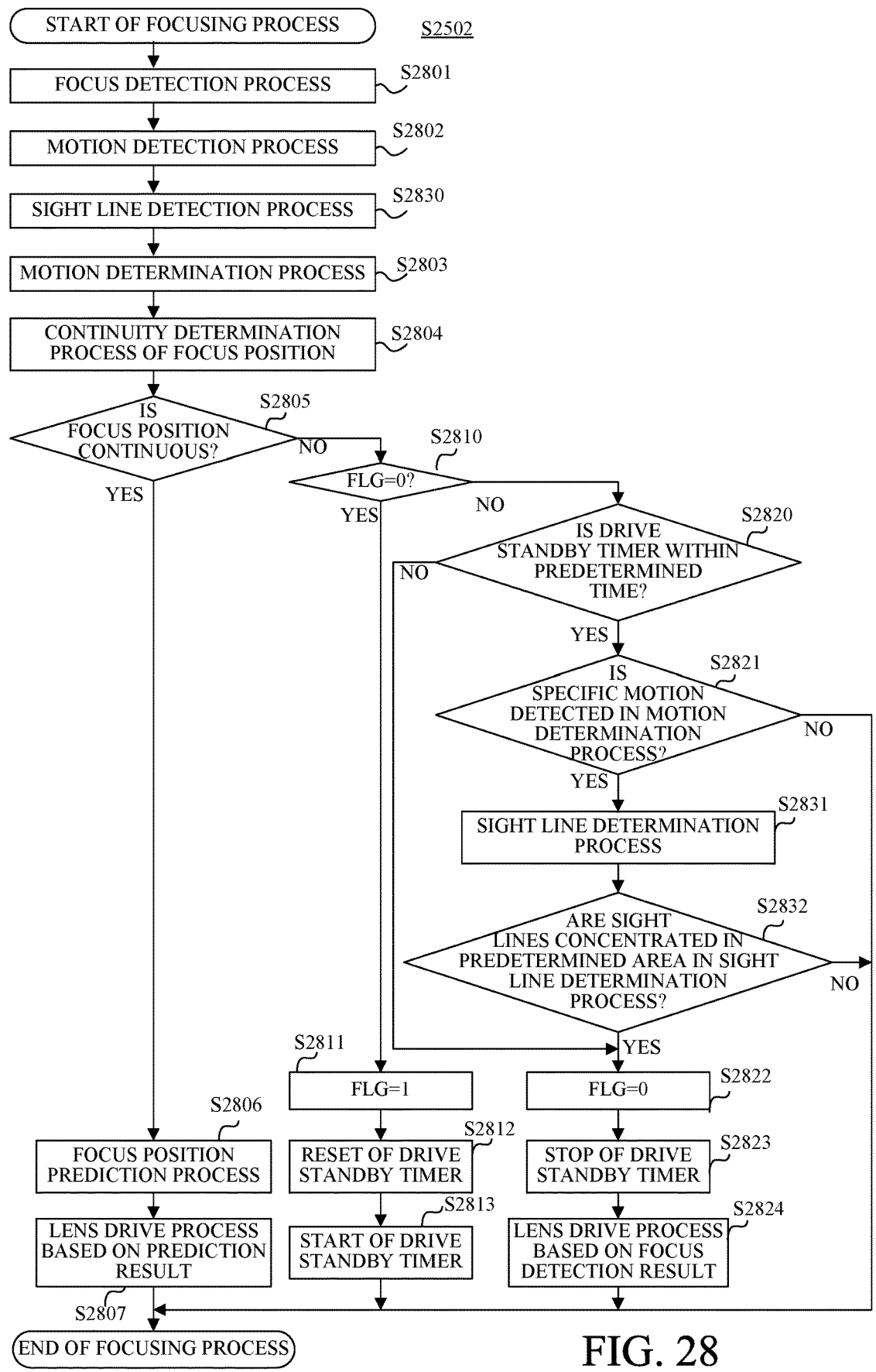
FIG. 28 is a flowchart of illustrating a focusing process in the sixth embodiment.

FIG. 28 is a flowchart of a focusing process in this embodiment. Steps S2801 to S2821 are the same as steps S2601 to S2621 of FIG. 26, respectively. At step S2830 between step S2802 and step S2803, the microcomputer 221 performs a sight line detection process. That is, the microcomputer 221 acquires a sight line position of the user detected by a sight line detection circuit 241. Then, the microcomputer 221 stores the combination of the detection time and the sight line position in the memory 219.

At step S2821, when it is determined that the specific motion is detected in the motion determination process, the flow proceeds to step S2831. On the other hand, when it is determined that the specific motion is not detected, the focusing process is ended. At step S2831, the microcomputer (sight line determination unit) 221 performs a sight line determination process. In other words, the microcomputer 221 determines whether the plurality of past sight line positions stored in the memory 219 at step S2830 are concentrated in a predetermined area.

Subsequently, at step S2832, the microcomputer 221 determines whether the sight line positions are concentrated in the predetermined area in the sight line determination process at step S2831. When the sight line positions are concentrated in the predetermined area, the flow proceeds to step S2822. On the other hand, when the sight line positions are not concentrated in the predetermined area, the focusing process is ended. When the image capturing apparatus 200a is panned and the user recognizes a new object, it is considered that the sight line gathers in the vicinity of the new object in order to face the sight line toward the new object. By the combination with the result of the motion determination process at step S2803, it can be determined that the user aims at the new object more appropriately. The predetermined area in the sight line determination process at step S2831 may coincide with the focusing area preset by the user. Subsequent steps S2822 to S2824 are the same as steps S2622 to S2624 of FIG. 26, respectively.

In this embodiment, control based on the image plane position is performed after the specific motion is detected and the concentration of the sight line positions to the specific area is determined. As a result, it is possible to focus on the object more accurately than when the concentration of the sight line positions is not determined.

Seventh Embodiment

Next, a seventh embodiment of the present invention will be described. In this embodiment, the term of "leaving time" corresponds to "drive standby timer" in the fourth to sixth embodiments. Similarly, the term of "start of leaving time count" corresponds to "start of drive standby timer". The term of "reset of leaving time" corresponds to "reset of drive standby timer" or "stop of drive standby timer". The term of "leaving time does not exceed the leaving completion time" corresponds to the "drive standby timer is within the predetermined time". The term of "in the leaving state" corresponds to "FLG=1". The term of "not in the leaving state" corresponds to "FLG=0". The term of "leaving determination process" corresponds to "continuity determination process".

Figure 29:
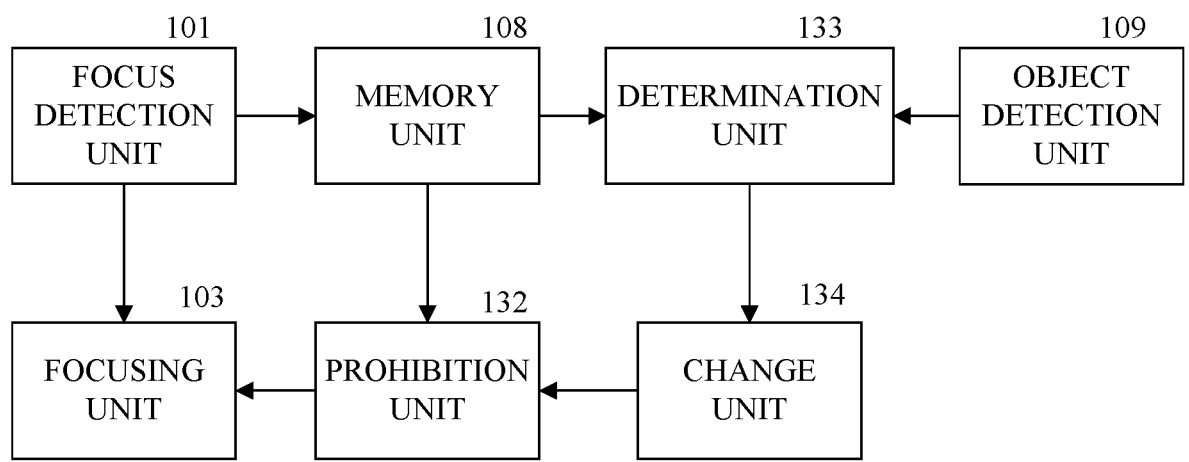
FIG. 29 is a block diagram of a focusing apparatus in a seventh embodiment.

First, referring to FIG. 29, a focusing apparatus in this embodiment will be described. FIG. 29 is a block diagram of the focusing apparatus (image capturing apparatus) 100b. Each part in FIG. 29 is realized by the cooperation of the hardware and software illustrated in FIG. 2 according to the control of the microcomputer 221.

A focus detection unit (focus detector) 101 acquires a pair of phase difference image signals generated by a focus detection circuit 210 in each of a plurality of focus detection areas provided in an imaging screen captured by an image sensor 213. Then, the focus detection unit 101 detects (calculates) a defocus amount (focal state) in each focus detection area based on the obtained phase difference image signal. A memory unit 108 stores the defocus amount detected by the focus detection unit 101 and an image plane position calculated from an imaging position of an imaging lens 201 at the detection time in the memory 219 over a plurality of past detection times. The focusing unit (focusing controller) 103 drives a focus lens of the imaging lens 201 based on the defocus amount detected by the focus detection unit 101.

A prohibiting unit (control unit) 132 prohibits the focusing unit 103 to drive the imaging lens 201 for a predetermined time based on the defocus amount detected by the focus detection unit 101. A determination unit (control unit) 133 determines whether the frequency of not capturing the object is high based on the plurality of past image plane positions stored in the memory unit 108. When it is determined that the frequency of not capturing the object by the determination unit 133 is high, a change unit (control unit) 134 sets the time for which the prohibition unit 132 prohibits driving of the imaging lens 201 to be longer than that in the case where it is determined that the frequency of not capturing the object is low. An object detection unit (control unit) 109 detects an object area in the imaging screen using luminance information received by a photometric circuit 226, and it stores the information on the detected object area in the memory 219.

In this embodiment, it is determined by the image capturing apparatus 200 including the microcomputer 221 having such a function, as described above, whether the frequency of not capturing the object is high based on the image plane positions of the plurality of times in the past. Then, when it is determined that the frequency of not capturing the object is high, the time for prohibiting the driving of the imaging lens 201 in the case where the object cannot be captured is set to be longer than that in the case where it is determined that the frequency of not capturing the object is low. As a result, while the user quickly performs the tracking operation in switching objects to be captured, he can easily keep capturing an object which is easily removed from the AF frame and has a high frequency of not capturing without losing the object.

Figure 30:
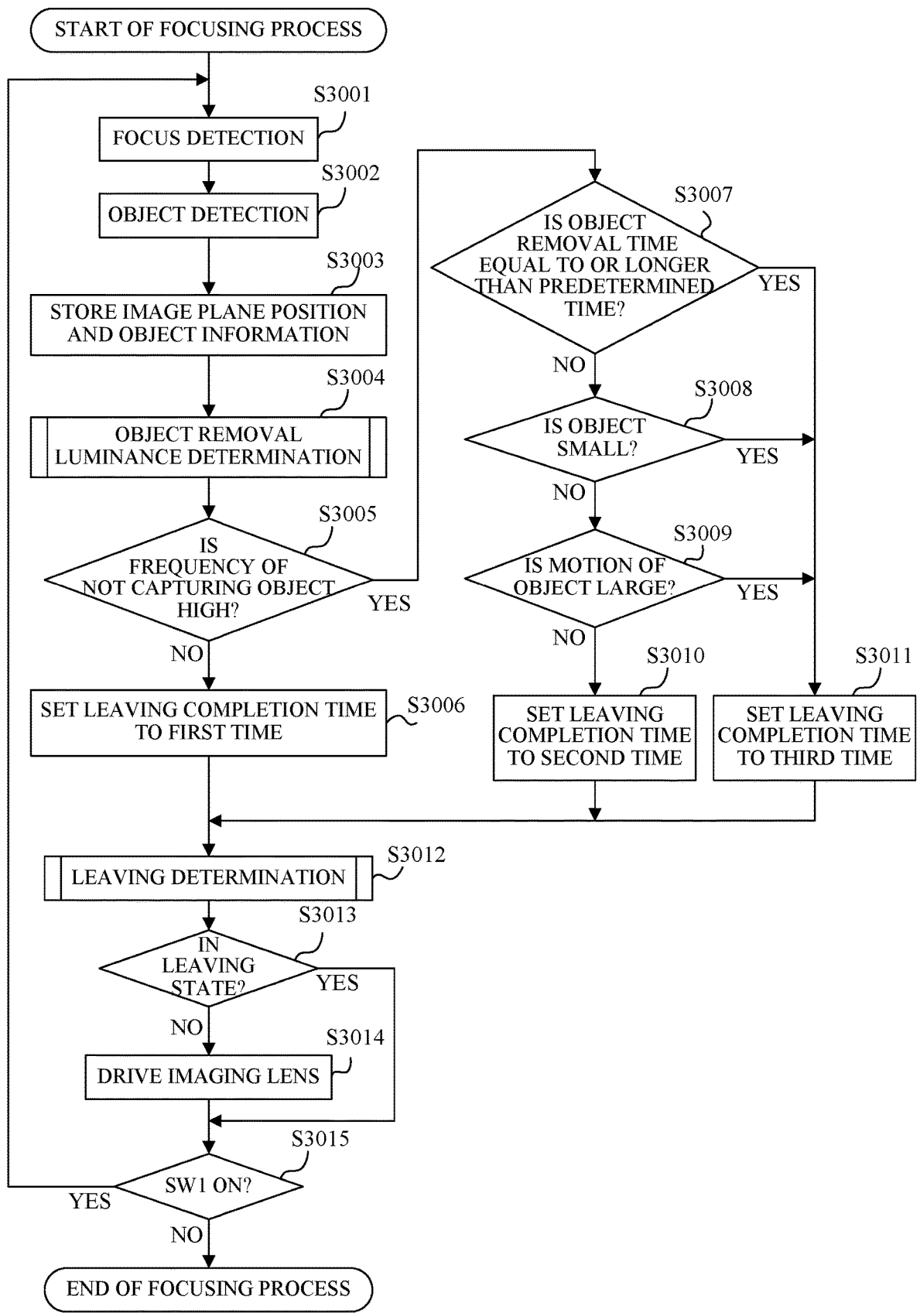
FIG. 30 is a flowchart of illustrating a focusing process in the seventh embodiment.

Next, referring to FIG. 30, a focusing process in this embodiment will be described. FIG. 30 is a flowchart of the focusing process. The focusing process of FIG. 30 is performed by the microcomputer 221 according to a focusing control program which is a computer program. When the switch SW1 is turned on by the user, at step S3001, the focus detection unit 101 of the microcomputer 221 calculates the defocus amount based on the pair of phase difference image signals generated in the focus detection area from the focus detection circuit 210.

Figure 31:
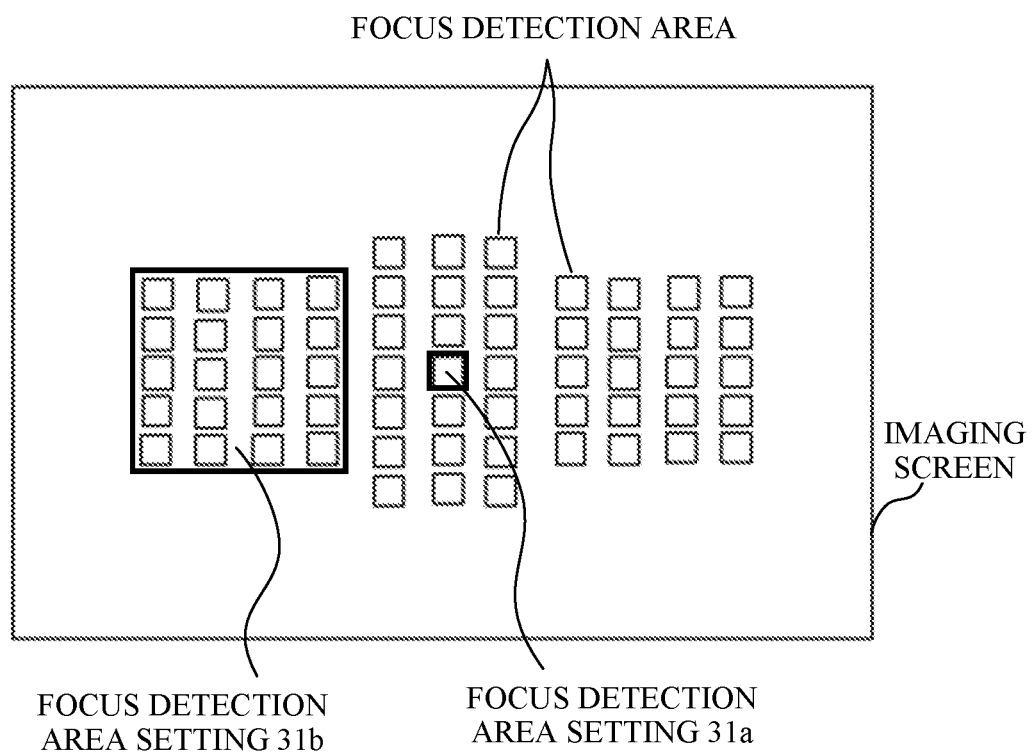
FIG. 31 is an explanatory diagram of a focus detection area in the seventh embodiment.

Here, referring to FIG. 31, the plurality of focus detection areas provided in the imaging screen will be described. FIG. 31 is an explanatory diagram of the plurality of focus detection areas. In FIG. 31, each small rectangular frame is a focus detection area. The defocus amount detected in each focus detection area is temporarily stored in the memory 219. Which focus detection area among the plurality of focus detection areas is used to detect the defocus amount is determined by a focus detection area setting selected by the user. For example, only one focus detection area is used in a focus detection area setting 31a, and 20 (5 rows×4 columns) focus detection areas are used in a focus detection area setting 31b.

Subsequently, at step S3002 of FIG. 30, the object detection unit 109 detects the object area in the photometric area in the imaging screen to determine the size and the coordinate position of the object. Subsequently, at step S3003, the memory unit 108 stores the image plane position calculated from the defocus amount detected at step S3001 and the imaging position of the imaging lens, and the size and the coordinate position of the object determined at step S3002.

Subsequently, at step S3004, the determination unit 133 determines the frequency of not capturing the object based on the plurality of past image plane positions stored in the memory unit 108. This object leaving determination process will be described below with reference to FIG. 32. Since sufficient image plane position data are not stored in the memory unit 108 immediately after the start of the focusing process or the like, it is preferred that the object leaving determination processing is performed after the sufficient image plane position data are stored in the memory unit 108.

Subsequently, at step S3005, the determination unit 133 determines whether the frequency of not capturing the object is high. When the microcomputer 221 (the determination unit 133) determines that the frequency of not capturing the object is high, the flow proceeds to step S3007. On the other hand, when it is determined that the frequency of not capturing the object is low, the flow proceeds to step S3006. At step S3006, the change unit 134 sets a leaving completion time in the case where the object cannot be captured to a predetermined first time. That is, at step S3006, it sets a set value to 0 (set value=0). Then, in response to the set value=0, it sets the leaving time to the first time.

At step S3007, the microcomputer 221 determines whether the object removal time is equal to or longer than a predetermined time. When the object removal time is equal to or longer than the predetermined time, the flow proceeds to step S3011. On the other hand, when the object removal time is less than the predetermined time, the flow proceeds to step S3008. Here, as the object removal time, for example, a total of the times at which object removal occurs can be used, but the present invention is not necessarily limited to this. For example, it is also possible to use an average removal time per object out of one object by dividing the sum of the times at which the object removal occurred by the number of removal times. Alternatively, the time in the case where the object is removed for the longest time may be used in one object removal. The number of the object removal and the object removal time will be described below with reference to FIG. 32.

At step S3008, the determination unit 133 determines whether the size of the object detected by the object detection unit 109 at step S3002 is smaller than a predetermined size. When the size of the object is smaller than the predetermined size, the flow proceeds to step S3011. On the other hand, when the size of the object is larger than the predetermined size, the flow proceeds to step S3009.

At step S3009, the determination unit 133 determines whether a change amount of the coordinate position of the object a plurality of past times stored in the memory unit 108 at step S3003 is larger than a predetermined motion threshold value. When the motion of the object is large, the flow proceeds to step S3011. On the other hand, when the motion of the object is not large, the flow proceeds to step S3010. The change amount of the coordinate position of the object can be calculated using Euclidean distance, Manhattan distance, or the like.

At step S3010, the change unit 134 sets the leaving completion time in the case where the object cannot be captured to a predetermined second time. That is, at step S3010, it sets the set value to −1. Then, in response to the set value=−1, the leaving time is set to the second time. The second time is longer than the first time at step S3006. At step S3011, the changing unit 134 sets the leaving completion time in the case where the object cannot be captured to a predetermined third time. That is, at step S3011, it sets the set value to −2 (set value=−2). Then, in response to the set value=−2, the leaving time is set to the third time. The third time is longer than the second time at step S3010. In this embodiment, as the set value is large (close to 0), the leaving completion time is short. The time relationship is "first time<the second time<the third time" as described in this embodiment.

Subsequently, at step S3012, the prohibition unit 132 determines whether the state is a leaving state (leaving determination process). The leaving determination process will be described below with reference to FIG. 33. Here, the leaving state is a state in which it is determined that the object cannot be captured and that driving of the imaging lens 201 should be prohibited.

Subsequently, at step S3013, the microcomputer 221 determines whether the prohibition unit 132 determines that the state is the leaving state at step S3012. When it is determined that it is in the leaving state, the flow proceeds to step S3015. On the other hand, when it is determined that it is not in the leaving state, the flow proceeds to step S3014. At step S3014, the focusing unit 103 drives the imaging lens 201 based on the defocus amount detected at step S3001. Subsequently, at step S3015, the microcomputer 221 determines whether the switch SW1 is in the ON state. When the switch SW1 is on, the flow returns to step S3001 to perform the focusing process again. On the other hand, when the switch SW1 is not turned on, the focusing process is ended.

Figure 32:
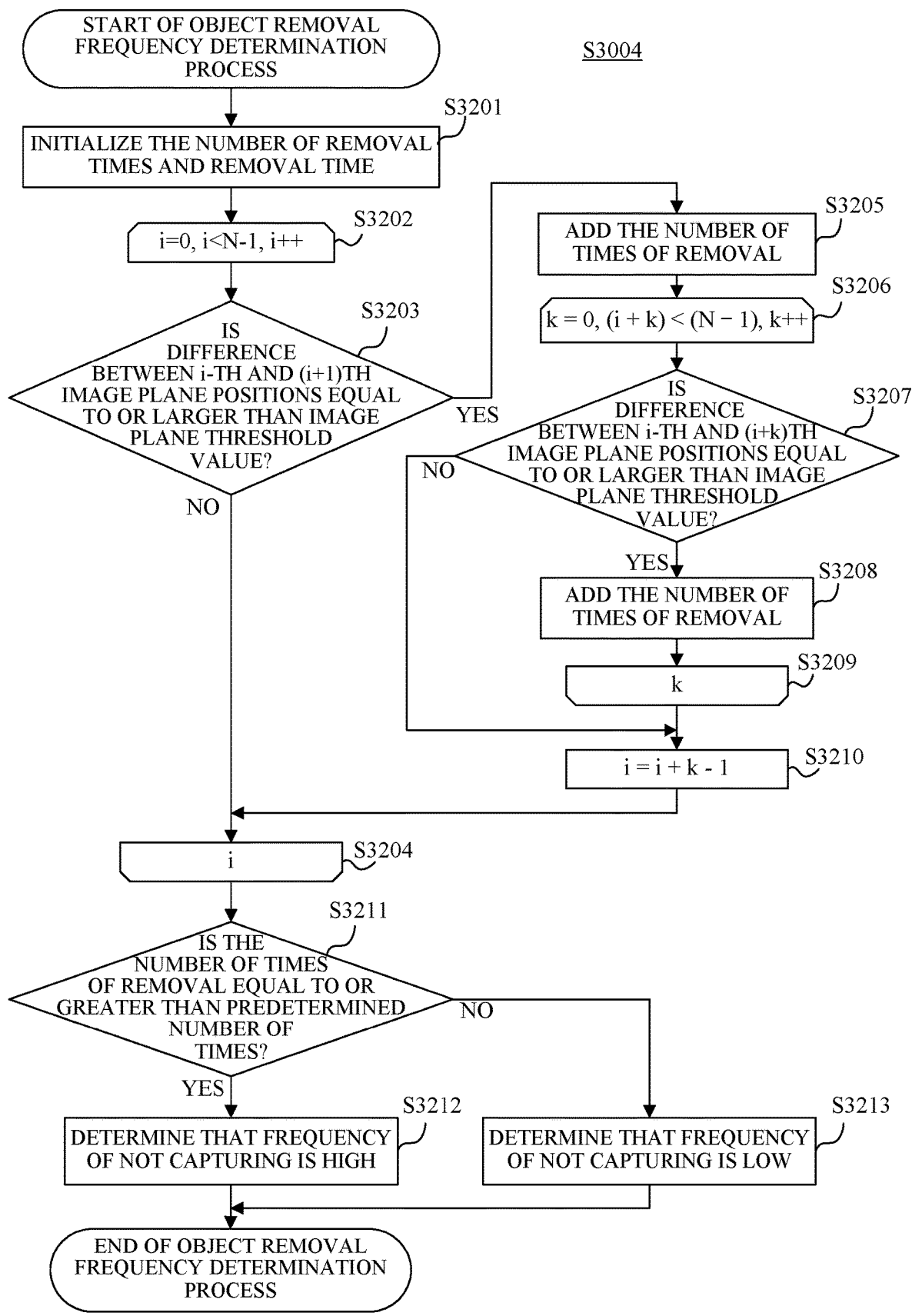
FIG. 32 is a flowchart of illustrating a frequency determination process of an object removal in the seventh embodiment.

Next, referring to FIG. 32, the object removal frequency determination process (step S3004 in FIG. 30) will be described. FIG. 32 is a flowchart of the object removal frequency determination process. The object removal frequency determination process in FIG. 32 is performed by the microcomputer 221 in accordance with a focusing control program which is a computer program.

First, at step S3201, the determination unit 133 of the microcomputer 221 initializes each of the number of removal times (the number of object removals) and the removal time (object removal time) to 0. Subsequently, at step S3202, the microcomputer 221 performs the setting for repeatedly performing the processes of steps S3203 to S3210 while "i", which has an initial value of 0, is less than the predetermined number of times (N−1).

Subsequently, at step S3203, the determination unit 133 determines whether the difference between the i-th and the (i+1)th image plane positions is equal to or larger than a predetermined image plane threshold value based on image plane positions a plurality of times in the past stored in the memory unit 108. When the difference between the image plane positions is equal to or larger than the image plane threshold value, the flow proceeds to step S3205. On the other hand, when the difference between the image plane positions is less than the image plane threshold value, the flow proceeds to step S3204. The difference between the image plane positions is equal to or larger than the threshold value when the image plane position of the background on the infinity side or the image plane position of an obstacle on the closest side exists. Here, both of them may be targeted, or for example, the image plane threshold may be set so as to target only the image plane position of the background on the infinity side.

At step S3204, the microcomputer 221 adds 1 to i. Then, the microcomputer 221 determines whether i is less than the predetermined number of times (N−1). When i is less than the predetermined number of times, the flow returns to step S3203. On the other hand, when i is equal to or greater than the predetermined number of times, the flow proceeds to step S3211.

At step S3205, the determination unit 133 adds 1 to the number of removal times. Subsequently, at step S3206, the microcomputer 221 performs setting for repeatedly performing the processes of steps S3207 and S3208 while (i+k), in which k has an initial value of 0, is less than the predetermined number of times (N−1).

Subsequently, at step S3207, the determination unit 133 determines whether the difference between the i-th and (i+k)th image plane positions is equal to or larger than the predetermined image plane threshold value based on the plurality of past image plane threshold values stored in the memory unit 108. When the difference between the image plane positions is equal to or larger than the image plane threshold value, the flow proceeds to step S3208. On the other hand, when the difference between the image plane positions is less than the image plane threshold value, the flow proceeds to step S3210.

At step S3208, the determination unit 133 adds 1 to the removal time. Here, although the removal time is counted as the number of image plane positions that are continuously equal to or larger than the image plane threshold value with respect to the i-th image plane position as a reference, the difference between the detection time of the i-th image plane position and the detection time of the (i+k)th image plane position may be used to apply milliseconds as a unit of the removal time. Subsequently, at step S3209, the microcomputer 221 adds 1 to k. Then, the microcomputer 221 determines whether (i+k) is less than the predetermined number of times (N−1). The number of (i+k) is less than the predetermined number of times, the flow proceeds to step S3207. On the other hand, when (i+k) is equal to or greater than the predetermined number of times, the flow proceeds to step S3210. At step S3210, the determination unit 133 substitutes (i+k−1) to i to updates the value.

Subsequently, at step S3211, the determination unit 133 determines whether the number of removal times is equal to or greater than a predetermined number of times. When the number of removal times is equal to or greater than the predetermined number of times, the flow proceeds to step S3212. On the other hand, when the number of removal times is less than the predetermined number of times, the flow proceeds to step S3213. At step S3212, the determination unit 133 determines that the frequency of not capturing the object is high, and then the object removal determination process is ended. At step S3213, the determination unit 133 determines that the frequency of not capturing the object is low, and then the object removal determination process is ended.

Figure 33:
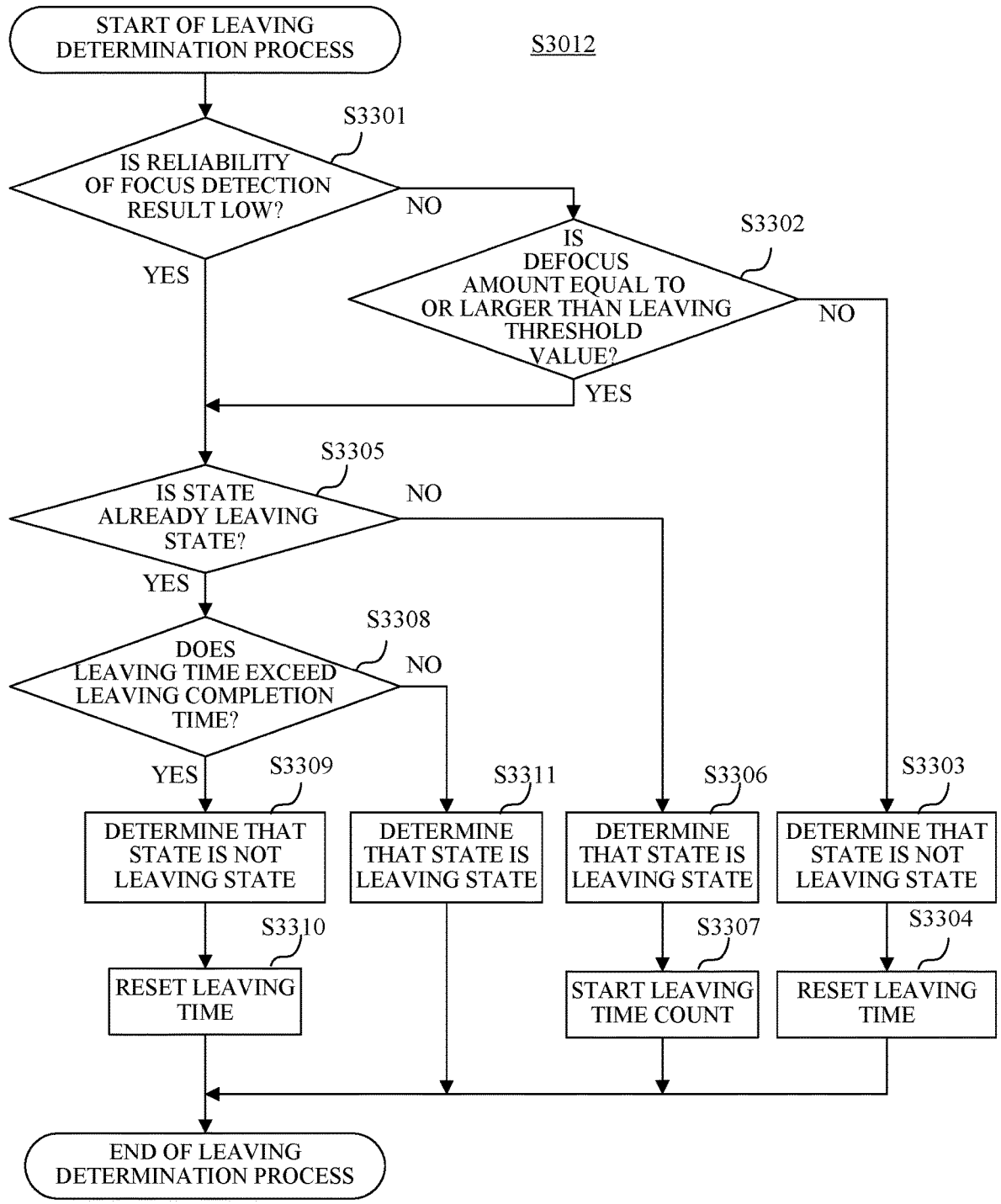
FIG. 33 is a flowchart of a leaving determination process in the seventh embodiment.

Next, referring to FIG. 33, the leaving determination process (step S3012 in FIG. 30) will be described. FIG. 33 is a flowchart of the leaving determination process. In the leaving determination process of FIG. 33, the microcomputer 221 is performed according to a focusing control program which is a computer program.

First, at step S3301, the prohibition unit 132 of the microcomputer 221 determines whether the reliability of the defocus amount detected by the focus detection section 101 is low. When the reliability of the defocus amount is not low (that is, the reliability is high), the flow proceeds to step S3302. On the other hand, when the reliability of the defocus amount is low, the flow proceeds to step S3305.

At step S3302, the microcomputer 221 determines whether the defocus amount detected by the focus detection unit 101 is equal to or larger than a leaving threshold value. When the defocus amount is not equal to or larger than the leaving threshold value, the flow proceeds to step S3303. On the other hand, when the defocus amount is equal to or larger than the leaving threshold value, the flow proceeds to step S3305. A large defocus amount is observed in a state in which the object is not in focus at all immediately after the switch SW1 is turned on and it is in a large blur state. Therefore, in this step, it is preferred that the defocus amount is determined not to be larger than the leaving threshold value, for example, by extremely increasing the leaving threshold value until a small defocus amount which can be determined to be in focus once, that is, the in-focus state can be observed.

At step S3303, the prohibition unit 132 determines that the state is not the leaving state. Subsequently, at step S3304, the prohibition unit 132 stops counting the leaving time and resets the leaving time, and then the leaving determination process is ended. The leaving time is the time to prohibit driving the focus lens of the imaging lens.

At step S3305, the microcomputer 221 determines whether the state is already the leaving state. When the state is not the leaving state yet, the flow proceeds to step S3306. On the other hand, when the state is already in the leaving state, the flow proceeds to step S3308.

At step S3306, the prohibition unit 132 determines that the state is the leaving state. Subsequently, at step S3307, the prohibition unit 132 starts counting the leaving time, and then the leaving determination process is ended.

At step S3308, the microcomputer 221 determines whether the leaving time exceeds a leaving completion time. When the leaving time exceeds the leaving completion time, the flow proceeds to step S3309. On the other hand, when the leaving time does not exceed the leaving completion time, the flow proceeds to step S3311. As the leaving completion time, the leaving completion time (first time, second time, or third time) set in any one of steps S3006, S3010, and S3011 in FIG. 30 is set according to the frequency of capturing the object and the state (situation) of the object.

At step S3309, the prohibition unit 132 determines that the state is not the leaving state. This means that the object is lost because the leaving state exceeds the predetermined leaving completion time. At step S3310, the prohibition unit 132 stops counting the leaving time and resets the leaving time, and then the leaving determination process is ended.

At step S3311, the prohibition unit 132 determines that the state is the leaving state. Then, the leaving determination process is ended. This means that the leaving state continues to capture the object since the leaving state is still equal to or less than the predetermined leaving completion time.

Figure 34A:
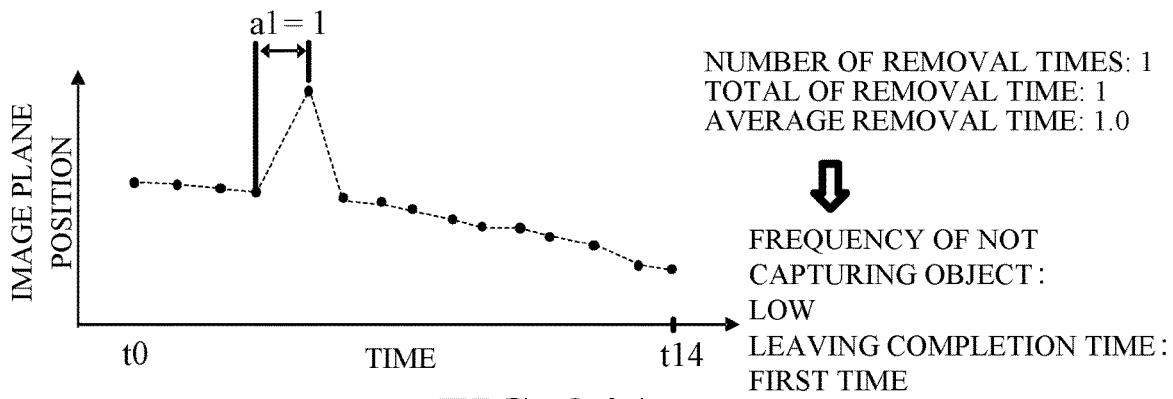
FIGS. 34A to 34C are explanatory diagrams of the object removal and the leaving completion time in the second embodiment.
Figure 34B:
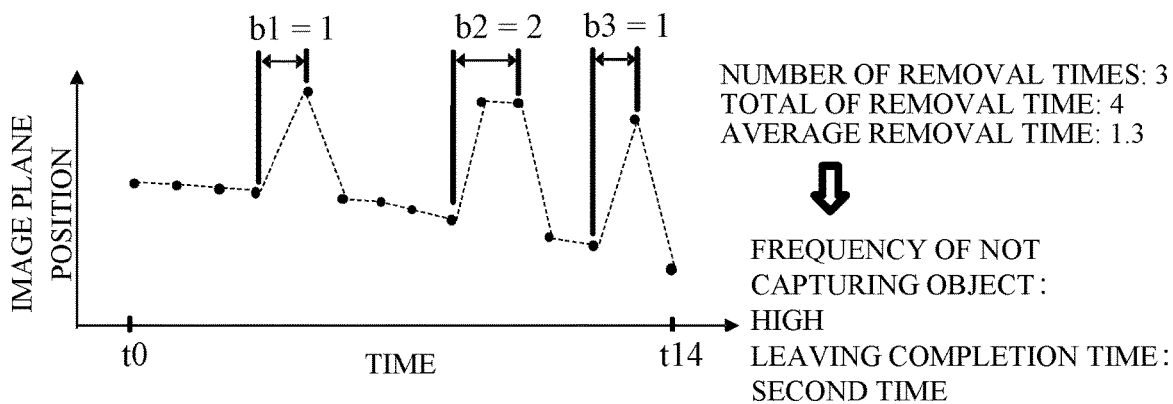
Figure 34C:
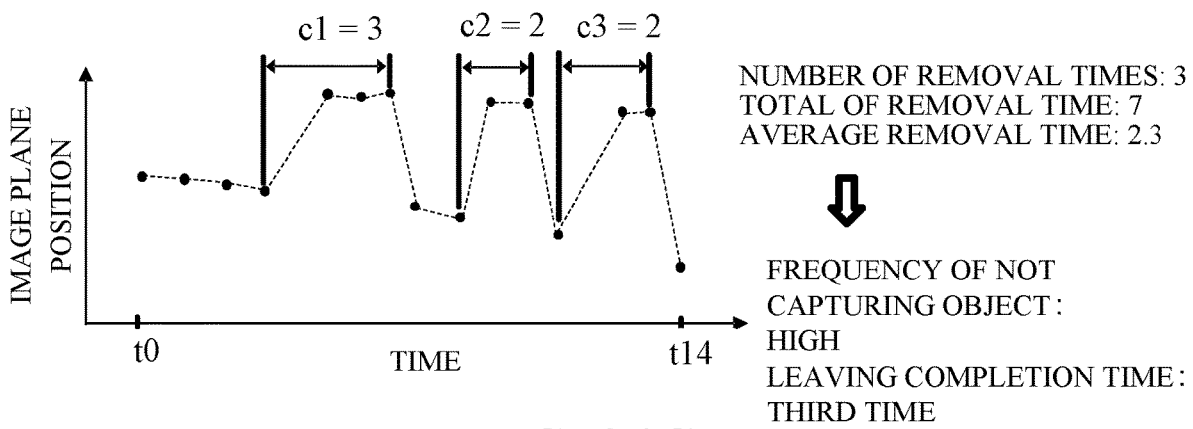

Next, referring to FIGS. 34A to 34C, in this embodiment, a method of determining the frequency of not capturing the object and the leaving completion time based on the number of times of removing the object and the removal time will be described. FIGS. 34A to 34C are explanatory diagrams of the object removal and the leaving completion time. In each of FIGS. 34A to 34C, the horizontal axis represents time and the vertical axis represents the past image plane position stored in the memory unit 108.

As illustrated in FIGS. 34A to 34C, the larger the image plane position is, the closer the focus position of the imaging lens 201 is in the infinite direction, whereas the smaller the image plane position, the closer the focus position is to the close direction. Here, the object removal determination is performed at the image plane position for the past 15 times (the section from t0 to t14 in the drawing), and it is determined that the frequency of not capturing the object is high when the number of removal times in the section is three times or more. Also, it is determined that the removal time is long when the average time per object removal (the sum of the removal times divided by the number of removal times) is 2.0 or more. Incidentally, as described at step S3208 in FIG. 32, the removal time is counted by the number of image plane positions which are equal to or larger than the image plane threshold value continuously with respect to the reference image plane position. For simplicity of explanation, in any of FIGS. 34A to 34C, it is assumed that the object is sufficiently large and the motion of the object is sufficiently small. Also, it is assumed that the distance to the object is sufficiently far.

In FIG. 34, the object removal occurs only once in a section a1. The number of times of the object removal is one, the sum of the object removal times is 1, and the average time per object removal is 1.0. Accordingly, it is determined that the frequency of not capturing the object is low, and the first time is set as the leaving completion time.

In FIG. 34B, a total of three object removals in sections b1, b2, and b3 occurs. The number of object removals is 3, the total of object removal time is 4, and the average time per object removal is 1.3 (rounding down to two decimal places). Accordingly, it is determined that the frequency of not capturing the object is high. Also, it is determined that the object removal time is not long, and the second time is set as the leaving completion time.

In FIG. 34C, a total of three object removals in sections c1, c2, and c3 occurs. The number of object removals is 3, the total of object removal time is 7, and the average time per object removal is 2.3 (rounding down to two decimal places). Accordingly, it is determined that the frequency of not capturing the object is high. Also, it is determined that the object removal time is long, and the third time is set as the leaving completion time.

When it is determined that the frequency of not capturing the object is high, that is, when the number of times that the imaging target cannot be captured by removing the AF frame from the object is large, the time required for completing the leaving state for prohibiting driving the imaging lens 201 is set to the second time that is longer than the normal first time. When the time for which the object cannot be captured is long, it is determined that the possibility of losing the object is high and the time is set to the third time that is longer than the second time. Also, even when it is considered that capturing of the object is difficult, such as when the size of the object is small, the motion of the object is large, the object distance is close, the third time is set. Thus, in a case where the frequency of not capturing the object is high according to the skill of the user and the difficulty of capturing the imaging target, by appropriately setting the drive prohibition time of the imaging lens, the image capturing apparatus can keep following the object without losing it.

In this embodiment, the process of determining the leaving completion time in accordance with the situation of the object is described at steps S3007 to S3011 in FIG. 30, but the present invention is not limited to this. For example, on the angle of view, even with the same size object or the same change amount of movement, it is difficult to capture the object in a narrow focus detection area like the focus detection area 31a in FIG. 31, and on the other hand, it is easy to capture the object in a wide focus detection area like the focus detection area 31b.

Figure 35:
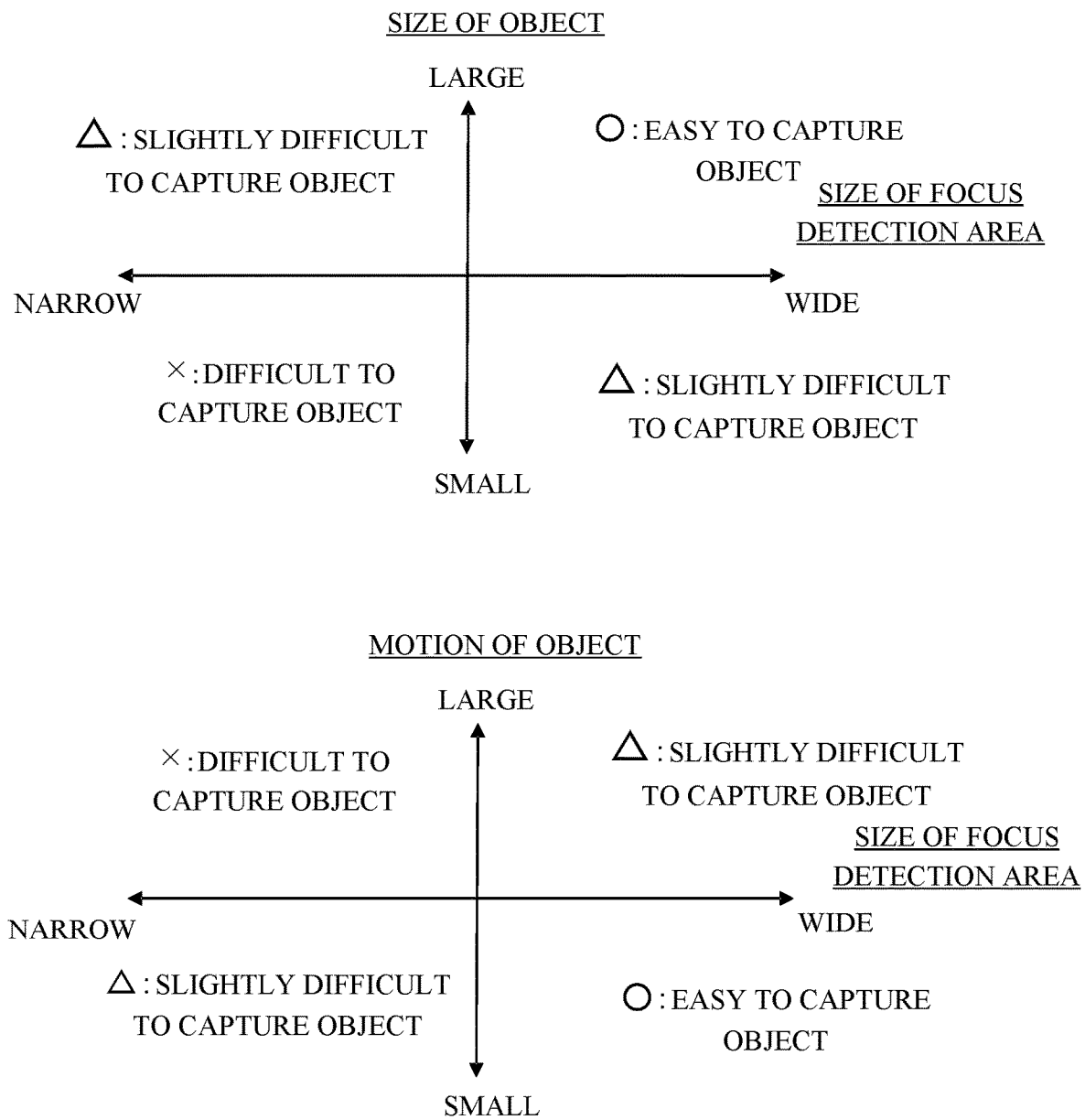
FIG. 35 is an explanatory diagram of a relationship between a size and a motion of an object with respect to a focus detection area in the seventh embodiment.

FIG. 35 is an explanatory diagram of the relationship between the size and the motion of the object with respect to the size of the focus detection area. Accordingly, it is preferred that a predetermined size to be compared with the size of the object at step S3008 of FIG. 30 and a motion threshold to be compared with the change amount of the coordinate position of the object at step S3009 are variable according to the size of the focus detection area. For example, since it is difficult to capture the object as the focus detection area is narrower, the motion threshold is decreased. On the other hand, as the focus detection area is wider, the object is easily captured, so that the motion threshold is increased.

In this embodiment, at steps S3007 to S3011 in FIG. 30, the leaving completion time is determined only by the result of each condition determination, but the present invention is not limited to this. For example, the results of the condition determination in each of steps S3007 to S3011 may be comprehensively determined to determine the leaving completion time. For example, a score may be determined in each condition determination and the leaving completion time may be determined based on the sum of the respective scores.

As in the first embodiment, immediately after the start of the focusing operation, the image plane positions of a sufficient number of objects are not stored and the number of times of object removal cannot be appropriately calculated. Therefore, it is preferred that an initial value is used while the sufficient number of image plane positions are not stored. For example, in a case where the frequency of not capturing the object in a certain focusing operation is high, in the subsequent focusing operation, based on the set value set in the past, the initial value of the object tracking characteristic for increasing the drive prohibition time of the imaging lens is set. Thus, it is possible to set the leaving completion time to a long time immediately after the start of the focusing operation, and to stably follow the object which is difficult to be captured.

As described above, in each embodiment, the control apparatus (focusing apparatus 100, 100a, or 100b) includes the focus detection unit 101, the control unit, and the focusing unit 103. The focus detection unit detects a defocus amount. The control unit automatically changes a parameter relating to a tracking operation during the tracking operation depending on an image capturing state (image capturing condition). The focusing unit preforms focusing based on the defocus amount and the parameter.

Preferably, the image capturing state is a motion of an object, a motion of an image capturing apparatus, or a relationship between the motion of the object and the motion of the image capturing apparatus. Preferably, the control unit changes the parameter during a half-press operation of a release button. Preferably, the control unit changes the parameter during focus detection by the focus detection unit. Preferably, the control unit changes the parameter in real time during the tracking operation.

Preferably, the control unit includes the setting unit 102 and a single mode selection unit 104. The setting unit sets, as the parameter, each of set values of a plurality of items relating to the tracking operation. The single mode selection unit can select one of an automatic mode in which each of the set values of the plurality of items relating to the tracking operation is automatically set or a manual mode in which each of the set values of the plurality of items is manually set. When the single mode selection unit selects the manual mode, the setting unit sets a predetermined set value corresponding to the manual mode as each of the set values of the plurality of items relating to the tracking operation. On the other hand, when the single mode selection unit selects the automatic mode, the setting unit automatically sets each of the set values of the plurality of items relating to the tracking operation. Preferably, the control unit includes the setting automation unit 105 that controls the setting unit so as to automatically set at least one set value of the plurality of items relating to the tracking operation. The setting unit automatically sets the at least one set value of the plurality of items relating to the tracking operation.

Preferably, the control unit includes the multiple mode selection unit 106 and the mode determination unit 107. The multiple mode selection unit selects M (2≤M≤N) operation modes from among N (2≤N) operation modes in which each of the set values of the plurality of items relating to the tracking operation is fixed to a predetermined set value. The mode determination unit determines an operation mode from among the M operation modes selected by the multiple mode selection unit based on each of the set values of the plurality of items automatically set by the setting unit. The setting unit sets, as each of the set values of the plurality of items relating to the tracking operation, a predetermined set value corresponding to the operation mode determined by the mode determination unit.

Preferably, when data relating to the image capturing state are insufficient, the control unit sets an initial value as the parameter. More preferably, the initial value is a predetermined value for each mode. Preferably, the initial value is determined based on a set value automatically set in a previous focusing operation. More preferably, the initial value is determined based on object distance information in a previous focusing operation.

Preferably, the control unit includes the continuity determination unit 121 and the motion determination unit 123. The continuity determination unit determines continuity of a plurality of previous focus detection results detected by the focus detection unit based on a history of the previous focus detection results. The motion detection unit detects a specific motion of an image capturing apparatus based on a motion of the image capturing apparatus detected by a motion detection unit. The control unit changes the parameter based on a determination result of the continuity determination unit or a determination result of the motion determination unit. More preferably, when the motion determination unit detects the specific motion, the focusing unit performs the focusing independently of the determination result of the continuity determination unit. Preferably, the control unit includes a stability determination unit that determines stability of a plurality of previous focus detection results detected by the focus detection unit based on a history of the previous focus detection results. When the motion determination unit detects the specific motion, the focusing unit performs the focusing based on a determination result of the stability determination unit independently of the determination result of the continuity determination unit. Preferably, the control unit includes the sight line determination unit that determines whether a plurality of previous sight line positions detected by the sight line detection unit (sight line detection circuit 241) for detecting a sight line position of a user are concentrated in a specific area. When the motion determination unit detects the specific motion, the focusing unit performs the focusing based on a determination result of the sight line determination unit independently of the determination result of the continuity determination unit.

Preferably, the control unit includes the prohibition unit 132, the determination unit 133, and the change unit 134. The prohibition unit prohibits the focusing by the focusing unit in a first time based on the defocus amount. The determination unit determines whether a frequency of not capturing an object is high based on past image plane positions. The change unit changes the first time to a second time that is longer than the first time when the determination unit determines that the frequency of not capturing the object is high. More preferably, when an object removal in which a difference between two image plane positions next to each other of the past image plane positions exceeds a predetermined image plane threshold value occurs not less than predetermined number of times, the determination unit determines that the frequency of not capturing the object is high. Preferably, when an average removal time of the object removals in which a difference between two image plane positions next to each other of the past image plane positions exceeds a predetermined image plane threshold value is longer than a predetermined time, the change unit changes the second time to a third time that is longer than the second time. Preferably, the control unit includes the object detection unit 109 that detects an object area from an area in an image. A size of the object area detected by the object detection unit in the image is smaller than a predetermined size, the change unit changes the second time to a third time that is longer than the second time. Preferably, when a change amount of past coordinate positions of the object is larger than a predetermined change amount, the change unit changes the second time to a third time that is longer than the second time.

Other Embodiments

It is possible to combine the seventh embodiment with any one of the fourth to sixth embodiments. That is, basically, in the seventh embodiment, after setting the leaving time corresponding to the set value of the "object tracking characteristic", the leaving time may be reset by the process described in the fourth to sixth embodiments as appropriate. Thus, while setting the leaving time, it is possible to more appropriately control the drive of the focus lens in consideration of the situation described in the fourth to sixth embodiments.

In this case, the changes occurring in FIGS. 30 and 33 of the seventh embodiment will be described. First, in FIG. 30, step S2602 (motion detection process) is performed after step S3002, and also the motion information detected in S2602 is stored at step S3003. Then, in FIG. 33, the process of steps S2603 and S2620 is performed between steps S3308 and S3311. When the result at step S2620 is "YES", the processes corresponding to "determine that the state is not the leaving state" and "reset of leaving time" are performed. When the result at step S2620 is "NO", the flow proceeds to step S3311 (that is, it is determined that the state is the leaving state).

Similarly to the case of considering the sight line as illustrated in FIG. 28, step S2830 (sight line detection process) is performed after step S3002, and at step S3003, the detection result of the sight line detected at step S2830 is also stored. Further, in FIG. 33, the process of steps S2831 and S2832 is performed between steps S3308 and S3311. When the result of step S2832 is "YES", the processes corresponding to "determine that the state is not the leaving state" and "reset of leaving time" are performed. When the result at step S2832 is "NO", the flow proceeds to step S3311 (that is, it is determined that the state is the leaving state).

The seventh embodiment describes setting the set value for adjusting the leaving time which is the time for prohibiting driving the focus lens of the imaging lens based on the result of the object removal frequency determination with reference to FIG. 30. The process of setting the set value of the "object tracking characteristic" that corresponds to FIGS. 9 and 10 corresponding to the process of the setting of the set value of the "transfer characteristic of the distance measuring point" or that corresponds to FIG. 16 corresponding to the process of the setting of the set values of the "tracking ability corresponding to velocity change" is steps S3001 to S3011 in FIG. 30. By replacing the process of setting the set value of the "object tracking characteristic" with (or by performing it in parallel with) the process of setting the set value of the "transfer characteristic of the distance measuring point" or "tracking ability corresponding to velocity change", the "object tracking characteristic" can be applied to the first to third embodiments.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

As described above, according to each of the embodiments, it is possible to automatically set a plurality of setting items relating to the tracking operation (tracking operation) in accordance with the change in the motion of the object during the tracking operation by the user. Therefore, according to each of the embodiments, it is possible to provide a control apparatus, an image capturing apparatus, and a non-transitory computer-readable storage medium capable of continuing to track the object appropriately during the tracking operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-136956, filed on Jul. 13, 2017, and Japanese Patent Application No. 2018-120078, filed on Jun. 25, 2018, which are hereby incorporated by reference herein in their entirety.

What is claimed is:

1. A control apparatus comprising:
one or more processors;
a memory including instructions that, when executed by the one or more processors, cause the control apparatus to function as:
 a selection unit configured to automatically select a focus detection area corresponding to an object;
 a focus detection unit configured to detect a defocus amount from the focus detection area;
 a focusing unit configured to perform focusing based on the defocus amount;
 a control unit configured to control selection of the focus detection area corresponding to the object, focus detection based on an area corresponding to the focus detection area, and a movement of a focus lens;
 a setting unit configured to set a parameter value of a parameter for the control of the control unit; and
 a displaying unit configured to display a first item and a plurality of second items, each corresponding to a different scene of a movement of the object,
wherein, when the first item is selected by a user, the parameter value automatically changes based on a condition corresponding to the movement of the object, and
wherein, when one of the plurality of second items is selected by the user, the parameter value corresponding to a scene corresponding to the selected second item is set.

2. The control apparatus according to claim 1, wherein the condition corresponding to the movement of the object depends on the motion of the object or a motion of an image capturing apparatus.

3. The control apparatus according to claim 1, wherein the control unit is further configured to change a parameter relating to a tracking operation in real time during the tracking operation.

4. The control apparatus according to claim 1, wherein each of a plurality of parameters is associated with each of the plurality of second items, and
wherein each associated parameter value and second item is different.

5. The control apparatus according to claim 4, wherein the setting unit is further configured to automatically set a parameter value for each of the plurality of parameters based on the condition corresponding to the movement of the object.

6. The control apparatus according to claim 1, wherein a parameter is of a first parameter relating to a sudden change of a focusing state.

7. The control apparatus according to claim 6, wherein the control unit is further configured to determine continuity of a plurality of previous focus detection results detected by the focus detection unit based on a history of the previous focus detection results,
wherein the control unit is further configured to stop moving the focus lens based on the detected defocus amount when the plurality of the previous focus detection results are not continuous,
wherein, when a first parameter value of a first parameter is different from a second value, a time length to stop moving the focus lens is longer, and
wherein the control unit is further configured to change the first parameter value of the first parameter automatically based on continuity of focus detection results.

8. The control apparatus according to claim 7, wherein the control unit is further configured to detect a specific motion of an image capturing apparatus based on a motion of the image capturing apparatus detected by a motion detection unit, and
wherein the control unit is further configured to detect the specific motion, and the focusing unit is further configured to perform the focusing independently of the determination result of the control unit.

9. The control apparatus according to claim 7, wherein:
the control unit includes a stability determination unit configured to determine stability of a plurality of previous focus detection results detected by the focus detection unit based on the history of the previous focus detection results, and
when the control unit detects a specific motion, the focusing unit is further configured to perform the focusing based on a determination result of the stability determination unit independently of the determination result of the control unit.

10. The control apparatus according to claim 7, wherein:
the control unit includes a sight line determination unit configured to determine whether a plurality of previous sight line positions detected by a sight line detection unit for detecting a sight line position of the user are concentrated in a specific area, and
when the control unit detects the specific motion, the focusing unit is further configured to perform the focusing based on a determination result of the sight line determination unit independently of the determination result of the control unit.

11. The control apparatus according to claim 6,
wherein the control unit is further configured to determine a difference between a detected defocus amount and an expected defocus amount,
wherein the control unit is further configured to stop moving the focus lens when the difference is larger than a predetermined threshold,
wherein, when a first parameter value of the second parameter is different from a second parameter value, the predetermined threshold is set to be increased,
wherein the control unit is further configured to automatically set the first parameter value when a focal plane changing speed is faster than the focal plane changing speed when the second parameter value is set, and
wherein a second parameter relates to a sudden change of a focal plane changing speed.

12. The control apparatus according to claim 6,
wherein the control unit is further configured to determine a motion vector,
wherein the control unit is further configured to change the focus detection area when the object moves in a direction orthogonal to an optical axis,
wherein, when a first parameter value of a third parameter is different from a second value, the focus detection area is more likely to be changed based on the same motion vector,
wherein the control unit is further configured to automatically set the first parameter value when the motion vector is increased when the second parameter value is set, and
wherein a third parameter relates to a tendency of change of the focus detection area.

13. The control apparatus according to claim 1, wherein the control unit includes
a prohibition unit configured to prohibit the focusing by the focusing unit in a first time based on the defocus amount;
a determination unit configured to determine whether a frequency of not capturing an object is high based on past image plane positions; and
a change unit configured to change the first time to a second time that is longer than the first time when the determination unit determines that the frequency of not capturing the object is high.

14. The control apparatus according to claim 13, wherein when an object removal in which a difference between two image plane positions next to each other of the past image plane positions exceeds a predetermined image plane threshold value occurs not less than predetermined number of times, the determination unit is configured to determine that the frequency of not capturing the object is high.

15. The control apparatus according to claim 13, wherein when an average removal time of object removals in which a difference between two image plane positions next to each other of the past image plane positions exceeds a predetermined image plane threshold value is longer than a predetermined time, the change unit is configured to change the second time to a third time that is longer than the second time.

16. The control apparatus according to claim 13, wherein:
the control unit includes an object detection unit configured to detect an object area from an area in an image, and
when a size of the object area detected by the object detection unit in the image is smaller than a predetermined size, the change unit is configured to change the second time to a third time that is longer than the second time.

17. The control apparatus according to claim 13, wherein:
the control unit includes an object detection unit configured to detect an object area from an area in an image, and
when a change amount of past coordinate positions of the object is larger than a predetermined change amount, the change unit is configured to change the second time to a third time that is longer than the second time.

18. The control apparatus according to claim 1,
wherein the first item and the second items are displayed side-by side.

19. A control method comprising:

automatically selecting a focus detection area corresponding to an object;

detecting a defocus amount from the focus detection area;

performing focusing based on the defocus amount;

controlling selection of the focus detection area corresponding to the object, focus detection based on an area corresponding to the focus detection area, and movement of a focus lens;

setting a parameter value of a parameter for the controlling; and displaying a first item and a plurality of second items each corresponding to a different scene of a movement of the object, wherein, when the first item is selected by a user, the parameter value automatically changes based on a condition corresponding to the movement of the object, and wherein, when one of the plurality of second items is selected by the user, the parameter value corresponding to a scene corresponding to the selected second item is set.

20. A non-transitory computer-readable storage medium storing a program which causes a computer to execute a process comprising:

automatically selecting a focus detection area corresponding to an object;

detecting a defocus amount from the focus detection area;

performing focusing based on the defocus amount;

controlling selection of the focus detection area corresponding to the object, focus detection based on an area corresponding to the focus detection area, and movement of a focus lens;

setting a parameter value of a parameter for the controlling; and displaying a first item and a plurality of second items each corresponding to different scene of a movement of the object, wherein, when the first item is selected by a user, the parameter value automatically changes based on a condition corresponding to the movement of the object, and wherein, when one of the second items is selected by the user, the parameter value corresponding to a scene corresponding to the selected second item is set.

* * * * *